US012073966B2

(12) United States Patent
Bayley et al.

(10) Patent No.: US 12,073,966 B2
(45) Date of Patent: *Aug. 27, 2024

(54) DROPLET ASSEMBLY METHOD

(71) Applicant: Oxford University Innovation Limited, Oxford (GB)

(72) Inventors: John Hagan Pryce Bayley, Oxford (GB); Kunwar Tanuj Sapra, Oxford (GB); Tobias Wauer, Munich (DE); Holger Gerlach, Neutraubling (DE); Shiksha Mantri, Indore (IN); Jamie Hill, Lancashire (GB)

(73) Assignee: Oxford University Innovation Limited, Oxford (GB)

( * ) Notice: Subject to any disclaimer, the term of this patent is extended or adjusted under 35 U.S.C. 154(b) by 592 days.

This patent is subject to a terminal disclaimer.

(21) Appl. No.: 17/165,252

(22) Filed: Feb. 2, 2021

(65) Prior Publication Data

US 2021/0296033 A1 Sep. 23, 2021

Related U.S. Application Data

(63) Continuation of application No. 14/437,340, filed as application No. PCT/GB2013/052796 on Oct. 25, 2013, now Pat. No. 10,950,376.

(30) Foreign Application Priority Data

Oct. 25, 2012 (GB) ..................................... 1219196

(51) Int. Cl.
*H01F 1/44* (2006.01)
*B01L 3/00* (2006.01)

(52) U.S. Cl.
CPC ........ *H01F 1/445* (2013.01); *B01L 3/502792* (2013.01); *B01L 2200/0673* (2013.01); *B01L 2400/043* (2013.01); *Y10T 137/0391* (2015.04)

(58) Field of Classification Search
CPC ................... B01L 3/502792; B01L 2200/0673
See application file for complete search history.

(56) References Cited

U.S. PATENT DOCUMENTS

| | | | |
|---|---|---|---|
| 4,812,856 | A | 3/1989 | Wallace |
| 4,934,564 | A | 6/1990 | Piatt |
| 5,464,629 | A | 11/1995 | Monshipuri et al. |
| 5,858,399 | A | 1/1999 | Lanza |
| 5,925,511 | A | 7/1999 | Fuhr et al. |
| 6,531,156 | B1 | 3/2003 | Clark et al. |
| 6,713,021 | B1 | 3/2004 | Shvets et al. |
| 6,962,747 | B1 | 11/2005 | Sasaki et al. |
| 6,995,024 | B2 | 2/2006 | Smith et al. |
| 7,217,410 | B2 | 5/2007 | Suslick et al. |
| 8,562,807 | B2 | 10/2013 | Srinivasan et al. |
| 8,784,929 | B2 | 7/2014 | Wallace et al. |
| 8,992,984 | B1 | 3/2015 | Brinker et al. |
| 9,223,317 | B2 | 12/2015 | Winger |
| 9,268,627 | B2 | 2/2016 | Kraipak et al. |
| 9,381,010 | B2 | 7/2016 | Hartoumbekis et al. |
| 10,548,852 | B2 | 2/2020 | Bayley et al. |
| 10,950,376 | B2 | 3/2021 | Bayley et al. |
| 10,978,218 | B2 | 4/2021 | Bayley et al. |
| 11,213,797 | B2 | 1/2022 | Bayley et al. |
| 11,406,603 | B2 | 8/2022 | Bayley et al. |
| 2002/0106308 | A1 | 8/2002 | Zweifel et al. |
| 2003/0035842 | A1 | 2/2003 | Kazakov et al. |
| 2003/0048341 | A1 | 3/2003 | Mutz et al. |
| 2003/0119193 | A1 | 6/2003 | Hess et al. |
| 2003/0128267 | A1 | 7/2003 | Teung et al. |
| 2004/0191518 | A1 | 9/2004 | Naito et al. |
| 2004/0237822 | A1 | 12/2004 | Boland et al. |
| 2005/0056713 | A1 | 3/2005 | Tisone et al. |
| 2006/0210443 | A1 | 9/2006 | Stearns et al. |
| 2007/0120280 | A1 | 5/2007 | Anchordoquy et al. |
| 2007/0243634 | A1 | 10/2007 | Pamula et al. |
| 2007/0248541 | A1 | 10/2007 | Tagawa et al. |
| 2007/0275415 | A1 | 11/2007 | Srinivasan et al. |
| 2007/0293449 | A1 | 12/2007 | Cui et al. |
| 2008/0017736 | A1 | 1/2008 | Lee et al. |
| 2008/0053205 | A1 | 3/2008 | Pollack et al. |
| 2008/0063794 | A1 | 3/2008 | Krotz et al. |
| 2008/0153150 | A1 | 6/2008 | Holden et al. |
| 2009/0074988 | A1 | 3/2009 | Faris et al. |
| 2009/0131543 | A1 | 5/2009 | Weitz et al. |
| 2009/0208466 | A1 | 8/2009 | Yoo et al. |
| 2009/0289213 | A1 | 11/2009 | Pipper et al. |

(Continued)

FOREIGN PATENT DOCUMENTS

| | | | |
|---|---|---|---|
| CA | 2 564 120 | A1 | 8/1998 |
| EP | 1 707 965 | A1 | 10/2006 |

(Continued)

OTHER PUBLICATIONS

Final Office Action U.S. Appl. No. 16/721,302 "Multisomes: Encapsulated Droplet Networks" dated Oct. 28, 2021.
Notice of Allowance for U.S. Application No. U.S. Appl. No. 14/649,394, "Droplet Assembly by 3D Printing" Aug. 17, 2021.
Notice of Allowance for U.S. Appl. No. 16/721,302 "Multisomes: Encapsulated Droplet Networks" dated Mar. 30, 2022.
Non-Final Office Action for U.S. Appl. No. 17/853,000, "Multisomes: Encapsulated Droplet Networks" dated Sep. 28, 2023.
U.S. Appl. No. 61/592,062, Multisomes: Encapsulated Droplet Networks, filed Jan. 30, 2012.
International Search Report and Written Opinion from International Application No. PCT/GB2013/052794; Filing Date: Oct. 25, 2013; Entitled: "Hydrogel Network"; Date of Mailing Jul. 1, 2014.

(Continued)

*Primary Examiner* — Natalia Levkovich
(74) *Attorney, Agent, or Firm* — Hamilton, Brook, Smith & Reynolds, P.C.

(57) ABSTRACT

The invention relates to a process for moving a droplet from a first location to a second location, which droplet comprises a magnetic material disposed in an aqueous medium. The invention also relates to a droplet assembly comprising a droplet, which droplet comprises a magnetic material disposed in an aqueous medium. Various uses of the droplet assembly are also described.

23 Claims, 19 Drawing Sheets

(56) References Cited

U.S. PATENT DOCUMENTS

| | | | |
|---|---|---|---|
| 2010/0032627 | A1 | 2/2010 | Bayley et al. |
| 2010/0147450 | A1 | 6/2010 | Takeuchi et al. |
| 2010/0173394 | A1 | 7/2010 | Colston, Jr. et al. |
| 2010/0316696 | A1 | 12/2010 | Wiggenhorn et al. |
| 2011/0041978 | A1 | 2/2011 | Wallace |
| 2011/0051334 | A1 | 3/2011 | Griffith et al. |
| 2011/0076734 | A1 | 3/2011 | Zhou et al. |
| 2011/0250688 | A1 | 10/2011 | Hasan |
| 2011/0306539 | A1 | 12/2011 | Shen et al. |
| 2012/0006681 | A1 | 1/2012 | Kaler et al. |
| 2012/0116568 | A1 | 5/2012 | Murphy et al. |
| 2012/0220481 | A1 | 8/2012 | Wallace et al. |
| 2012/0322162 | A1 | 12/2012 | Collier et al. |
| 2013/0017564 | A1 | 1/2013 | Guillemot et al. |
| 2013/0319861 | A1 | 12/2013 | Khandros et al. |
| 2014/0023697 | A1 | 1/2014 | Dimauro |
| 2014/0356289 | A1 | 12/2014 | Bayley et al. |
| 2015/0248949 | A1 | 9/2015 | Bayley et al. |
| 2015/0270043 | A1 | 9/2015 | Bayley et al. |
| 2016/0136888 | A1 | 5/2016 | Bayley et al. |
| 2020/0214988 | A1 | 7/2020 | Bayley et al. |
| 2022/0072497 | A1 | 3/2022 | Bayley et al. |
| 2023/0048266 | A1 | 2/2023 | Bayley et al. |

FOREIGN PATENT DOCUMENTS

| | | |
|---|---|---|
| EP | 2 253 378 | 11/2010 |
| GB | 1119032.9 | 7/1968 |
| JP | 2001-505224 | 4/2001 |
| JP | 2001-515853 | 9/2001 |
| JP | 2010536551 | 2/2010 |
| JP | 2010-503417 | 4/2010 |
| JP | 2010222282 | 10/2010 |
| JP | 2012/166159 | 9/2012 |
| KR | 20120038662 | 4/2012 |
| WO | WO 1991/00084 A1 | 1/1991 |
| WO | WO 98/33483 | 8/1998 |
| WO | WO 99/12523 | 3/1999 |
| WO | WO 2005/053643 A1 | 6/2005 |
| WO | WO 2006/009657 A1 | 1/2006 |
| WO | WO 2006/096571 A2 | 3/2006 |
| WO | WO 2007/010668 A1 | 1/2007 |
| WO | WO 2007/094739 A1 | 8/2007 |
| WO | WO 2007/0101174 A2 | 9/2007 |
| WO | WO 2008/012552 A1 | 1/2008 |
| WO | WO 2008/034180 A1 | 3/2008 |
| WO | WO 2009/024775 A1 | 2/2009 |
| WO | WO 2009/049089 A1 | 4/2009 |
| WO | WO 2009/148598 A1 | 12/2009 |
| WO | WO 2010/110471 A1 | 9/2010 |
| WO | WO 2011/015870 A1 | 2/2011 |
| WO | WO 2012/050359 A2 | 4/2012 |
| WO | WO 2013/041983 A1 | 3/2013 |
| WO | WO 2014/064459 A2 | 5/2014 |
| WO | WO 2014/064461 A1 | 5/2014 |
| WO | WO 2014/087175 A2 | 6/2014 |

OTHER PUBLICATIONS

International Preliminary Report on Patentability from International Application No. PCT/GB2013/052794; Filing Date: Oct. 25, 2013; Entitled: "Hydrogel Network", Date of Issuance of report: Apr. 28, 2015.

International Search Report and Written Opinion from International Application No. PCT/GB2013/052796; Filing Date: Oct. 25, 2013; Entitled: "Droplet Assembly Method", Date of Mailing: Jan. 28, 2014.

International Preliminary Report on Patentability from International Application No. PCT/GB2013/052796; Filing Date: Oct. 25, 2013; Entitled: "Droplet Assembly Method", Date of Issuance of report: Apr. 28, 2015.

International Search Report and Written Opinion from International Application No. PCT/GB2013/053229; Filing Date: Dec. 6, 2013; Entitled: "Droplet Assembly by 3D Printing," Date of mailing: Jun. 17, 2014.

International Preliminary Report on Patentability from International Application No. PCT/GB2013/053229; Filing Date: Dec. 6, 2013; Entitled: "Droplet Assembly by 3D Printing"; Date of Issuance of report: Jun. 9, 2015.

International Search Report and Written Opinion from International Application No. PCT/GB2012/052736, entitled: "Multisomes: Encapsulated Droplet Networks", Dated of mailing: Apr. 25, 2013.

International Preliminary Report on Patentability from International Application No. PCT/GB2012/052736, entitled: "Multisomes: Encapsulated Droplet Networks", Date of issuance of report: May 6, 2014.

Abbott, A., "Biology's new dimension", Nature, 424: 870-872 (Aug. 21, 2003).

Abramoff, M. D., et al., "Image processing with Image J", *Biophotonics International*, 11: 36-42 (2004).

Aghdaei, S., et al., "Formation of artificial lipid bilayers using droplet dielectrophoresis", *Lab Chip*, 8: 1617-1620 (2008).

Akashi, K., et al., "Preparation of Giant Liposomes in Physiological Conditions and Their Characterization Under an Optical Microscope", *Biophysical Journal*, 71: 3242-3250 (Dec. 1996).

Aronson, M. P. and Princen, H. M., "Contact angles associated with thin liquid-films in emulsions", *Nature*, 286: 370-372 (Jul. 24, 1980).

Astier, Y., et al., "Protein components for nanodevices", *Current Opinion in Chemical Biology* 9: 576-584 (2005).

Bai, Y. et al., "A double droplet trap system for studying mass transport across a droplet-droplet interface", Lab Chip, 10: 1281-1285 (2010).

Bayley, H. et al., "Droplet interface bilayers", *Molecular BioSystems*, 4(12): 1191-1208 (Dec. 2008).

Bodor, N. and Buchwald, P., "Soft Drug Design: General Principles and Recent Applications", *Med. Res. Rev.*, 20:58-101 (2000).

Boland, Thomas et al., "Application of inkjet printing to tissue engineering", *Biotechnology Journal*, 1: 910-917 (2006).

Bolinger, P.-Y. et al., "Integrated Nanoreactor Systems: Triggering the Release and Mixing of Compounds Inside Single Vesicles", *J. Am. Chem. Soc.*, 126(28): 8594-8595 (2004).

Boroske, E., and Elwenspoek, M., "Osmotic Shrinkage of Gian Egg-Lecithin Vesicles", *Biophys. J.*, 34: 95-109 (Apr. 1981).

Bowden, N., et al., "Molecule-Mimetic Chemistry and Mesoscale Self-Assembly", Acc. Chem. Res. 34(3): 231-238 (2001).

Bowden, N., et al., "*Self-Assembly of Mesoscale Objects into Ordered Two-Dimensional Arrays", Science*, 276: 233-235 (Apr. 11, 1997).

Channon, K., et al., "Synthetic biology through biomolecular design and engineering", *Current Opinion in Structural Biology*, 18: 491-498 (2008).

Cheley, S. et al., "Spontaneous oligomerization of a staphylococcal alpha-hemolysin conformationally constrained by removal of residues that form the transmembrane beta-barrel", *Protein Engineering*, 10: 1433-1443 (1997).

Chiarabelli, C. et al., "Chemical approaches to synthetic biology", *Current Opinion in Biotechnology*, 20: 492-497 (2009).

Choi, I. S. et al., "Macroscopic Hierarchial, Two-Dimensional Self-Assembly", *Angew. Chem. Int. Ed*, 38(20): 3078-3081 (1999).

Chu, C.-J. et al., "Efficiency of Cytoplasmic Delivery by pH-Sensitive Liposomes to Cells in Culture", *Pharmaceutical Research*, 7(8): 824-834 (1990).

Chu, L.-Y. et al., "Controllable Monodisperse Multiple Emulsions", *Angew. Chem. Int. Edit.*, 46: 8970-8974 (2007).

Clancy, K. and Voigt, C. A., Programming cells: towards an automated 'Genetic Compiler', *Current Opinion in Biotechnology*, 21: 572-581 (2010).

Clavel, F. and Hance, A. J., "Medical Progress HIV Drug Resistance", *New England Journal of Medicine*, 350(10): 1023-1035 (Mar. 4, 2004).

Cukierman, E. et al., "Cell interactions with three-dimensional matrices", *Current Opinion in Cell Biology*, 14: 633-639 (2002).

Cukierman, E. et al., "Taking Cell-Matrix Adhesions to the Third Dimension", *Science*, 294: 1708-1712 (Nov. 23, 2001).

(56) References Cited

OTHER PUBLICATIONS

Devine, D. V., et al., "Liposome-complement interactions in rat serum: implications for liposome survival studies", *Biochim. Biophys. Acta*, 1191: 43-51 (1994).
Dixit, S. S., et al., "Droplet Shape Analysis and Permeability Studies in Droplet Lipid Bilayers", *Langmuir*, 28: 7442-7451 (2012).
Dixit, S. S., et al., "Light-Driven Formation and Rupture of Droplet Bilayers", Langmuir 26(9): 6193-6200 (2010).
Drummond, D. C. et al., "Current status of pH-sensitive liposomes in drug delivery", *Progress in Lipid Research*, 39: 409-460 (2000).
Du, Y., et al., "Directed assembly of Cell-laden microgels for fabrication of 3D tissue constructs", *Proc. Natl. Acad. Sci.* (*PNAS*), 105(28): 9522-9527 (2008).
Evans, E., "Probing the Relation Between Force-Lifetime-and Chemistry in Single Molecular Bonds," *Annu. Rev. Biophys. Biomol. Struct.*, 30:105-128 (2001).
Forterre, Y., et al., "How the Venus Flytrap Snaps," *Nature*, 43:421-425 (2005).
Funakoshi, et al., "Lipid Bilayer Formation by Contacting Monolayers in a Microfluidic Device for Membrane Protein Analysis," *Anal. Chem.*, 78(24): 8169-8174 (2006).
Gibson, D. G. et al., "Creation of a Bacterial Cell Controlled by a Chemically Synthesized Genome," *Science*, 329:52-56 (2010).
Gijs, M. A., et al., "Microfluidic Applications of Magnetic Particles for Biological Analysis and Catalysis," *Chem. Rev.*, 110:1518-1563 (2010).
Gross, L.C., et al., "Determining Membrane Capacitance by Dynamic Control of Droplet Interface Bilayer Area," *Langmuir*, 27:14335-14342 (2011).
Gu, L. Q., et al., "Stochastic Sensing of Organic Analytes by a Pore-Forming Protein Containing a Molecular Adapter," *Nature*, 398:686-690 (1999).
Gu, L. Q., et al., "Interaction of the noncovalent molecular adapter, betacyclodextrin, with the staphylococcal alpha-hemolysin pore," *Biophys. J.*, 79: 1967-1975 (2000).
Hamer, W. J., et al., "Osmotic Coefficients and Mean Activity Coefficients of Uni-Univalent Electrolytes in Water at 25° C.," *J. Phys. Chem. Ref. Data*, 1:1047-1100 (1972).
Hamilton, J. A., et al., "Transfer of Oleic Acid Between Albumin and Phosphholipid Vesicles," *Proc. Natl Acad. Sci. USA*, 83:82-86 (1986).
Harada, A., et al., "Macroscopic Self-Assembly Through Molecular Recognition," *Nat. Chem.* 3:34-37 (2011).
Harada, et al., "Bubble wrap of cell-like aggregates", *Nature*, 471:172-175 (2011).
Harriss, L. M., et al., "Imaging Multiple Conductance States in an Alamethicin Pore," *J. Am. Chem. Soc.*, 133:14507-14509 (2011).
Heron, A .J., et al., "Direct detection of membrane channels from gels using water-in-oil droplet bilayers," *J. Am. Chem. Soc.*, 129:16042-16047 (2007).
Heron, A. J., et al., "Simultaneous measurement of ionic current and fluorescence from single protein pores," *J. Am. Chem. Soc.*, 131:1652-1653 (2009).
Holden, M. A., et al., "Functional bionetworks from nanoliter water drops," *J. Am. Chem. Soc.*, 129:8650-8655 (2007).
Hu, Z. B., et al., "Synthesis and Application of Modulated Polymer Gels," *Science*, 269: 525-527 (1995).
Huang, J., et al., "Direct Quantitation of Peptide-Mediated Protein Transport across a Droplet-Interface Bilayer," *JACS*, 133:15818-15821 (2011).
Humphrey, W., et al., "VMD: Visual Molecular Dynamics," *J. Molec. Graphics*, 14:33-38 (1996).
Hwang, W. L., et al., "Electrical Behavior of Droplet Interface Bilayer Networks: Experimental Analysis and Modeling," *JACS*, 129:11854-11864 (2007).
Jeong, B., et al., "Lessons from Nature: Stim uli-Responsive Polymers and their Biomedical Applications," *Trends Biotechnol.*, 20:305-311 (2002).
Johnson, J. D., "Intracellular EDTA mimics parvalbumin in the promotion of skeletal muscle relaxation", *Biophys. J.* 76:1514-1522 (1999).
Kankare, J. et al., "Kinetics of Langmuirian Adsorption onto Planar, Spherical, and Cylindrical Surfaces," Langmuir, 15:5591-5599 (1999).
Kim, J., et al., "Designing Responsive Buckled Surfaces by Halftone Gel Lithography," Science,335:1201-1205 (2012).
Klein, Y., et al., "Shaping of Elastic Sheets by Prescription of Non-Euclidean Metrics," Science,315:1116-1120 (2007).
Korlach, J. et al., "Characterization of lipid bilayer phases by confocal microscopy and fluorescence correlation spectroscopy", *Proc. Natl. Acad. Sci. USA*, 96, 8461-8466 (1999).
Lahann, J., et al., "A Reversibly Switching Surface," *Science*, 299:371-374 (2003).
Lehmann, et al., "Two-dimensional magnetic manipulation of microdroplets on a chip as a platform for bioanalytical application," *Sensors and Actuators B*, 2(117):457-463 (2006).
Leptihn, S., et al., "In Vitro Reconstitution of Eukaryotic Ion Channels Using Droplet Interface Bilayers," *J. Am. Chem. Soc.*, 133:9370-9375 (2011).
Leunissen, M. E. et al., "Switchable Self-Protected Attractions in DNA-Functionalized Colloids," *Nat. Mater*, 8:590-595 (2009).
Levental, I., et al., "Soft Biological Materials and Their Impact on Cell Function," *Soft Matter*, 3:299-306 (2007).
Liang, H. Y., et al., "Growth, Geometry, and Mechanics of a Blooming Lily," *Proc. Natl. Acad. Sci. USA*, 108:5516-5521 (2011).
Lichtenberg, D. et al., "Effect of surface curvature on stability, thermodynamic behavior, and osmotic activity of dipalmitoylphosphatidylcholine single lamellarvesicles," *Biochemistry* (*Mosc.*), 20:3462-3467 (1981).
Lindsey, H., et al., "Physicochemical characterization of 1,2-diphytanoyl-sn-glycero-3-phosphocholine in model membrane systems," *Biochim. Biophys. Acta*, 555:147-167 (1979).
Maglia, G. et al., "Analysis of single nucleic acid molecules with protein nanopores," *Method. Enzymol.* 475:591-623 (2010).
Maglia, G. et al., "Droplet networks with incorporated protein diodes show collective properties," *Nat. Nanotechn*,1(4):437-440 (2009).
Maglia, M. et al., "DNA strands from denatured duplexes are translocated through engineered protein nanopores at alkaline pH.," *Nano Lett.*, 9:3831-3836 (2009).
Mills, J. K., et al., "Lysolipid incorporation in dipalmitoylphosphatidylcholine bilayer membranes enhances the ion permeability and drug release rates at the membrane phase transition," *BBA-Biomembranes*, 1716:77-96 (2005).
Morisaku, T., et al., "Development of a new experimental system for monitoring biomembrade reactions: combinatin of laser spectroscopic techniques and biomembrane models formed at an oil/water interfacez," *Anal. Sci.*,20:1605-1608 (2004).
Nakagawa, S., et al., "Structural and functional studies of gap junction channels," *Curr. Opin. Struc. Biol.*, 20:423-430 (2010).
Naraghi, M., "T-jump study of calcium binding kinetics of calcium chelators," *Cell Calcium*, 22:255-268 (1997).
Nath, U., et al., "Genetic Control of Surface Curvature," *Science*, 299:1404-1407 (2003).
Needham, D. , et al., "The development and testing of a new temperature-sensitive drug delivery system for the treatment of solid tumors," *Adv. Drug Deliver. Rev.*, 53:285-305 (2001).
Niculescu-Duvaz, I., et al., "Antibody-directed enzyme prodrug therapy (ADEPT): a review," *Adv. Drug Deliver. Rev.*, 26:151-172 (1997).
Noireaux, V., et al., "A Vesicle Bioreactor as a sStep Toward an Artificial Cell Assembly," Proc. Natl. Acad. Sci. USA, 101:17669-17674 (2004).
Noireaux, V., et al., "Development of an Artificial Cell, from Self-Organization to Computation and Self-Reproduction," *Proc. Natl. Acad. Sci., USA*, 108:3473-3480 (2011).
Okushima, S., et al., "Controlled production of monodisperse double emulsions by two-step droplet breakup in microfluidic devices," *Langmuir*, 20:9905-9908 (2004).
Payne, G. F., "Biopolymer-Based Materials: The Nanoscale Components and their Hierarchical Assembly," *Curr. Opin. Chem. Biol.*, 11:214-219 (2007).

(56) References Cited

OTHER PUBLICATIONS

Poulin et al., "Influence of the Alkyl Surfactant Tail on the Adhesion Between Emulsion Drops," J. Phys. Chem. B, 103(25)5157-5159 (1999).
Poulin, P., et al.,"Adhesion of Water Droplets in Organic Solvent," Langmuir, 14: 6341-6343 (1998).
Poulos, J. L., et al., "Electrowetting on Dielectric-Based Microfluids for Integrated Lipid Bilayer Formation and Measurement," Appl. Phys. Lett., 95:013706 (2009).
Pouponneau, P., et al., "Co-encapsulation of magnetic nanoparticles and doxorubicin into biodegradable microcarriers for deep tissue targeting by vascular MRI navigation," *Biomaterials*, 32:3481-3486 (2011).
Rautio, J. et al., "Prodrugs: design and clinical applications," *Nat. Rev. Drug Discov.*, 7: 255-270 (2008).
Raychaudhuri, P., et al., "Fluorinated Amphiphiles Control the Insertion of α-Hemolysin Pores into Lipid Bilayers," *Biochemistry* 50:1599-1606 (2011).
Ringeisen, B. R., et al., "Jet-based methods to print living cells", *Biotechnology Journal*, 1:930-948 (2006).
Russew, M.-M., et al., "Photoswitches: From Molecules to Materials," *Adv. Mater*, 22: 3348-3360 (2010).
Sacanna, S., et al., Lock and Key Colloids, *Nature*, 464:575-578 (2010).
Sanjana, N. E., et al., "A fast flexible ink-jet printing method for patterning dissociated neurons in culture," *Journal of Neuroscience Methods*, 136(2):151-163 (2004).
Sapra, K. T., et al., "Lipid-coated hydrogel shapes as components of electrical circuits and mechanical devices," *Scientific Reports*,2(848):1-9 (2012).
Sapra, K. T., et al., "Three dimensional construction of bilayer networks using shape encoded hydrogel," *Biophysical Journal*, 100(3):502a (2011).
Sarles, S. A., et al., "Bilayer Formation between Lipid-Encased Hydrogels Contained in Solid Substrates," *ACS Applied Materials & Interfaces*, 2(12):3654-3663 (2010).
Sarles, S. A., et al., "Biomolecular material systems with encapsulated interface bilayers," *MRS Proceedings*, 1301, (2011).
Sarles, S. A., et al., "Cell-inspired electroactive polymer materials incorporating biomolecular materials" *Proceedings of SPIE*, 7976:797626-1-797626-9 (2011).
Schrum, J. P., et al., "The Origins of Cellular Life," Cold Spring Harb Perspect Biol 2, pp. 1-16 (2010).
Schwille, P., "Bottom-Up Synthetic Biology: Engineering in a Tinkerer's World," Science, 333: 1252-1254 (2011).
Seo, M. et al., "Microfluidic consecutive flow-focusing droplet generators," *Soft Matter* 3:986-992 (2007).
Sharon, E., et al., "Buckling Cascades in Free Sheets," *Nature*, 419: 579-579 (Oct. 10, 2002).
Sharon, E., et al., "Geometrically Driven Wrinkling Observed in Free Plastic Sheets and Leaves," *Phys. Rev. E*, 75, 7 pages (2007).
Shum, H. C. et al., "Multicompartment Polymersomes from Double Emulsions" *Angew. Chem. Int. Edit.*, 50: 1648-1651 (2011).
Sidorenko, A., et al., Reversible Switching of Hydrogel-Acutated Nanostructures into Complex Micropatterns, *Science*, 315: 487-490 (Jan. 26, 2007).
Skotheim, J. M. & Mahadevan, L., "Physical Limits and Design Principles for Plant and Fungal Movements," *Science*, 308: 1308-1310 (May 27, 2005).
Small, D. M., et al., "The Ionization Behavior of Fatty Acids and Bile Acids in Micelles and Membranes," *Hepatology*, 4: 77S-79S (1984).
Solé, R. V. et al., "Synthetic Protocell Biology: From Reproduction to Computation", *Philos. T. R. Soc. B*, 362: 1727-1739 (2007).
Stanley, C.E. et al., "*A Microfluidic Approach for High-Throughput Droplet Interface Bilayer (DIB) Formation,*" *Chem Commun*, 46: 1620-1622 (2010).
Stoddart, D. et al., "Single-Nucleotide Discrimination in Immobilized DNA Oligonucleotides with a Biological Nanopore," *Proc. Natl. Acad. Sci. USA*, 106: 7702-7707 (May 12, 2009).
Strambio-De-Castillia, C. et al., "The Nuclear Pore Complex: Bridging Nuclear Transport and Gene Regulation," *Nat. Rev. Mol. Cell Bio.*, 11: 490-501 (Jul. 2010).
Syeda, R. et al., "Screening Blockers Against a Potassium Channel with a Droplet Interface Bilayer Array", *J. Am. Chem. Soc.*, 130: 15543-15548 (2008).
Synytska, A. et al., "Simple and Fast Method for the Fabrication of Switchable Bicomponent Micropatterned Polymer Surfaces," *Langmuir*, 23: 5205-5209 (2007).
Szostak, J.W., et al., "Synthesizing Life," *Nature*, 409: 387-390 (Jan. 18, 2001).
Tamaddoni, N. J. et al., "Fabricating Neuromast-Inspired Gel Structures for Membrane-Based Hair Cell Sensing," *Proceedings of SPIE*, vol. 8339: 833908-1-833908-11 (Apr. 3, 2012).
Theberge, A.B. et al., "Microdroplets in Microfluidics: An Evolving Platform for Discoveries in Chemistry and Biology," *Angew Chem. Int. Ed.*, 49: 5846-5868 (2010).
Tokarev, I. & Minko, S., "Stimuli-Responsive Porous Hydrogels at Interfaces for Molecular Filtration, Separation, Controlled Release, and Gating in Capsules and Membranes," *Adv. Mater*, 22: 3446-3462 (2010).
Torchilin, V. P., "Recent Advances with Liposomes as Pharmaceutical Carriers," *Nat. Rev. Drug Discov.*, 4: 145-160 (Feb. 2005).
Tsuchiya et al., "On-Chip Polymerase Chain Reaction Microdevice Employing a Magnetic Droplet-Manipulation System," *Sensors and Actuators B*, 130(2): 583-588 (2008).
Tuteja, A. et al., "Robust Omniphobic Surfaces," *Proc. Natl. Acad. Sci.*, 105: 18200-18205 (Nov. 25, 2008).
Ueno, M., et al., "Characteristics of the Membrane Permeability of Temperature-Sensitive Liposome," *Bull. Chem. Soc. Jpn.*, 64: 1588-1593 (1991).
Velev, O. D., et al., "On-Chip Manipulation of Free Droplets," *Nature*, 426: 515-516 (2003).
Villar, G., et al., "Formation of Droplet Networks that Function in Aqueous Environments," *Nat. Nanotechnol.*, 6: 803-808 (2011).
Walsh, C., "Molecular Mechanisms that Confer Antibacterial Drug Resistance," *Nature*, 406: 775-781 (Aug. 17, 2000).
Wang et al., "Controllable Microfluidic Production of Multicomponent Multiple Emulsions," RSC, *Lab Chip*, 11, 7 pages (2011).
Weibel, D. B. & Whitesides, G.M., "Applications of Microfluidics in Chemical Biology," *Curr. Opin. Chem. Biol.*, 10: 584-591 (2006).
Wheeldon, I., et al., "Nanoscale Tissue Engineering: Spatial Control over Cell-Materials Interactions," *Nanotechnology*, 22: 212001, 16 pages (2011).
White, N. "Antimalarial Drug Resistance and Combination Chemotherapy," *Phil. Trans. R. Soc. Lond. B*, 354: 739-749 (1999).
Whitesides, G. M., "The Origins and the Future of Microfluidics," *Nature*, 442: 368-373 (Jul. 27, 2006).
Williamson, A. J., et al.,, "Templated Self-Assembly of Patchy Particles," *Soft Matter*, 7: 3423-3431 (2011).
Woolfson, D. N. & Bromley, E. H. C., "Synthetic Biology: A Bit of Rebranding, or Something New and Inspiring?" *Biochemist e-volution*, 33(1): 19-25 (Feb. 2011).
Wu, L.-Q. & Payne, G.F., *Biofabrication: Using Biological Materials and Biocatalysts to Construct Nanostructured Assemblies, Trends Biotechnol.*, 22(11): 593-599 (Nov. 2004).
Xu, G. & McLeod, H. L., "Strategies for Enzyme/Prodrug Cancer Therapy," *Clin. Cancer Res.*, 7: 3314-3324 (Nov. 2001).
Xu, J., et al., "Synthetic Protocells to Mimic and Test Cell Function," *Adv. Mater.* 22: 120-127 (2010).
Yamada, K. M. & Cukierman, E., "Modeling Tissue Morphogenesis and Cancer in 3D," *Cell*, 130: 601-610 (2007).
Yoo, J.-W. & Mitragotri, S., "Polymer Particles that Switch Shape in Response to a Stimulus," *Proc. Natl. Acad. Sci.*, 107(25): 11205-11210 (Jun. 22, 2010).
Yue, B. Y. et al., "Phospholipid Monolayers at Non-Polar Oil/Water Interfaces. Part 1—Phase Transitions in Distearoyl-lecithin Films at the n-Heptane Aqueous Sodium Chloride Interface," *J. Chem. Soc. Farad. T.*, 1(72): 2685-2693 (1976).
Zagnoni, M. et al., "A Microdroplet-Based Shift Register," *Lab Chip*, 10: 3069-3073 (2010).

(56) References Cited

OTHER PUBLICATIONS

Zelikin, A. N. et al., "Poly(Methacrylic Acid) Polymer Hydrogel Capsules: Drug Carriers, Sub-Compartmentalized Microreactors, Artificial Organelles," *Small*, 6(20): 2201-2207 (2010).
Zhu, J. & Marchant, R.E., "Design Properties of Hydrogel Tissue-Engineering Scaffolds," *Expert Rev. Med. Devices*, 8: 607-626 (2011).
Zimmerberg, J. & Kozlov, M. M., How Proteins Produce Cellular Membrane Curvature,: *Nat. Rev. Mol. Cell Bio*, 7: 9-19 (Jan. 2006).
Pays, K., et al., "Coalescence in Surfactant-Stabilized Double Emulsions", *Langmuir*, 17: 7758-7769 (2001).
Rojas, E., et al., "Temperature-Induced Protein Release from Water-in-Oil-in-Water", *Langmuir*, 24: 7154-7160 (2008).
Wang et al., "Liposomes in Double-Emulsion Globules," *Langmuir*, 26(5): 3225-3231 (2010).
European Search Report for European Patent Application No. 13 805 487.9, "Droplet Assembly by 3D Printing", Date of Completion: Jun. 21, 2016.
Non-Final Office Action for U.S. Appl. No. 14/354,706, "Multisomes: Encapsulated Droplet Networks" dated: Sep. 9, 2016.
Non-Final Office Action for U.S. Appl. No. 14/438,345, "Hydrogel Network" dated: Nov. 30, 2016 .
Kim, S., et al., "Preparation of Multivesicular Liposomes", Biochimica et Biophysica Acta., 728(1983): 339-348.
Office Action for U.S. Appl. No. 14/354,706, "Multisomes: Encapsulated Droplet Networks " dated: Jul. 12, 2018.
Final Office Action for U.S. Appl. No. 14/649,394, "Droplet Assembly By 3D Printing " dated: Jun. 29, 2018.
Office Action for U.S. Appl. No. 14/354,706, "Multisomes: Encapsulated Droplet Networks " dated: May 1, 2019.
Office Action for U.S. Appl. No. 14/649,394, "Droplet Assembly by 3D Printing", dated May 6, 2019.
Office Action for U.S. Appl. No. 15/788,441, "Hydrogel Network", dated May 14, 2019.
Lee, S., et al., Sensitivity of cationic surfactant templates to specific anions in liquid interface crystallization, Journal of Colloid and Interface Science, vol. 376, p. 152-159 Mar. 11, 2012.
Notice of Allowance for U.S. Appl. No. 14/354,706, "Multisomes: Encapsulated Droplet Networks", dated Sep. 18, 2019.
Final Office Action for U.S. Appl. No. 15/788,441, "Hydrogel Network", dated Nov. 15, 2019.
Final Office Action for U.S. Appl. No. 14/649,394, "Droplet Assembly by 3D Printing", dated Nov. 21, 2019.
Office Action for U.S. Appl. No. 15/788,441, "Hydrogel Network", dated May 27, 2020.
Office Action for U.S. Appl. No. 14/437,340, "Droplet Assembly Method," dated Nov. 4, 2016.
Final Office Action for U.S. Appl. No. 14/437,340, "Droplet Assembly Method," dated Dec. 6, 2017.
Office Action for U.S. Appl. No. 14/437,340, "Droplet Assembly Method," dated Sep. 10, 2018.
Final Office Action for U.S. Appl. No. 14/437,340, "Droplet Assembly Method," dated Apr. 5, 2019.
Office Action for U.S. Appl. No. 14/437,340, "Droplet Assembly Method," dated Oct. 22, 2019.
Final Office Action for U.S. Appl. No. 14/437,340, "Droplet Assembly Method," dated Apr. 30, 2020.
Final Office Action for U.S. Appl. No. 14/437,340, "Droplet Assembly Method," dated Oct. 14, 2020.
Notice of Allowance for U.S. Appl. No. 14/437,340, "Droplet Assembly Method," dated Nov. 3, 2020.
Notice of Allowance for U.S. Appl. No. 15/788,441, "Hydrogel Network" Dec. 9, 2020.
Supplemental Notice of Allowability for U.S. Appl. No. 15/788,441, "Hydrogel Network" Jan. 13, 2021.
Office Action for U.S. Appl. No. 14/649,394 "Droplet Assembly by 3D Printing" dated Dec. 10, 2020.
Office Action for U.S. Appl. No. 16/721,302 "Multisomes: Encapsulated Droplet Networks" dated Mar. 3, 2021.

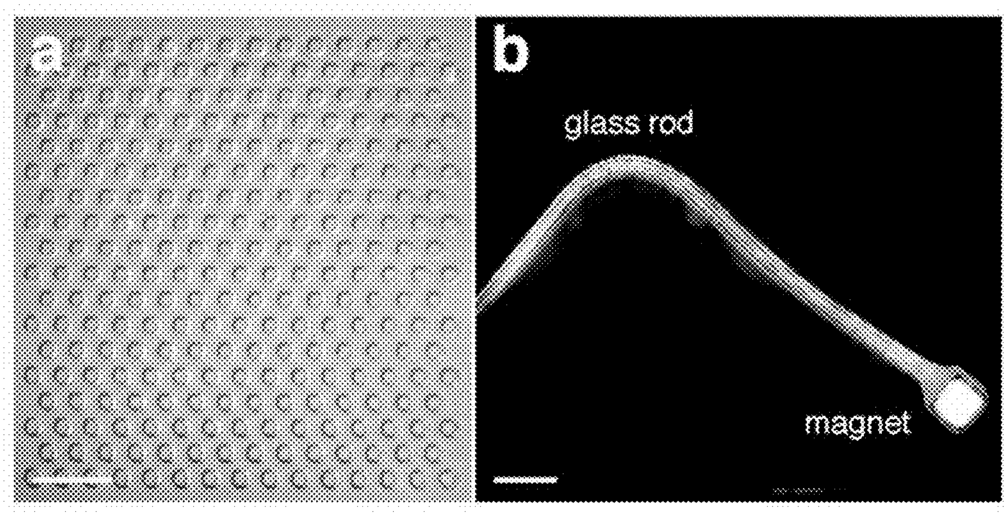
FIG. 2A FIG. 2B
FIG. 3A FIG. 3B FIG. 3C
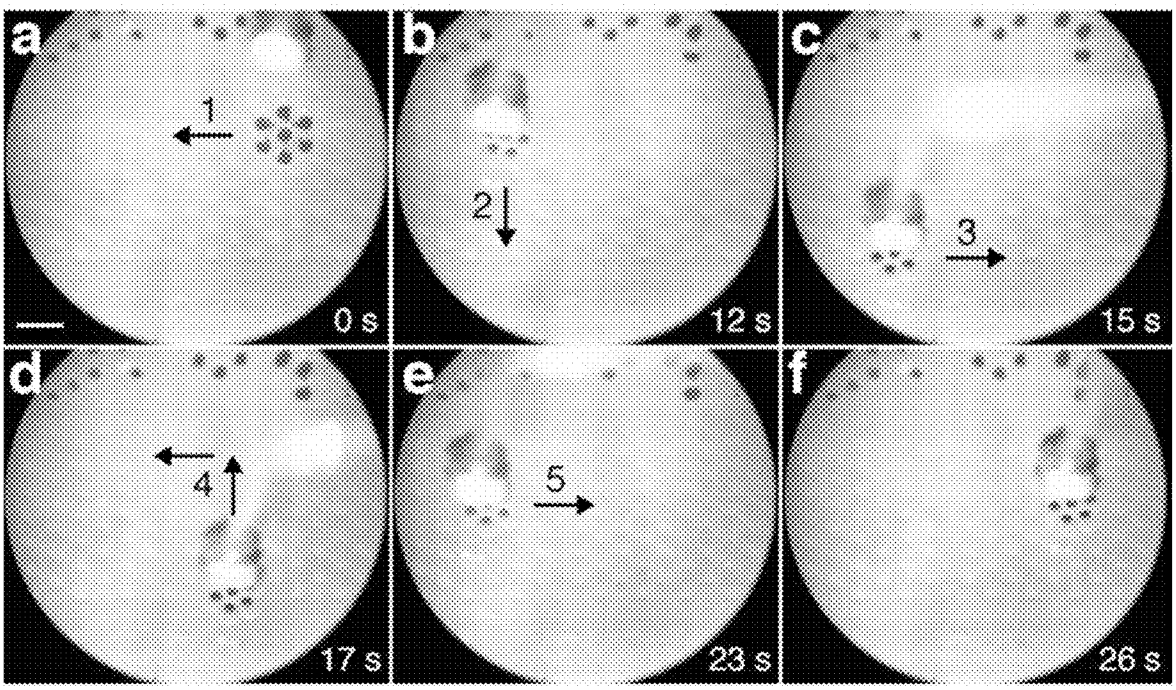
FIG. 3D FIG. 3E FIG. 3F FIG. 4A FIG. 4B FIG. 4C FIG. 4D
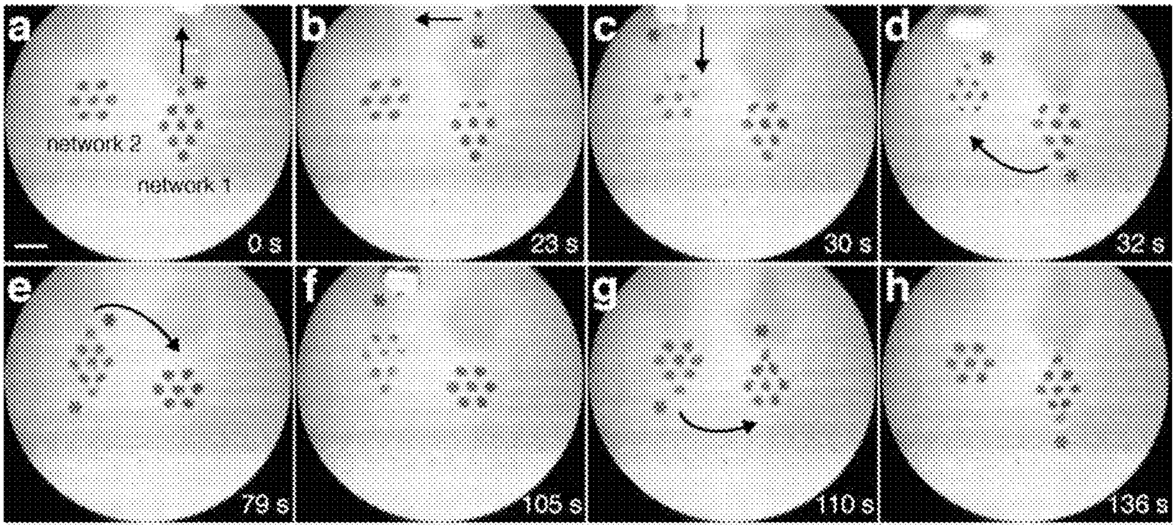
FIG. 4E FIG. 4F FIG. 4G FIG. 4H
FIG. 5A FIG. 5B FIG. 5C FIG. 5D FIG. 5E
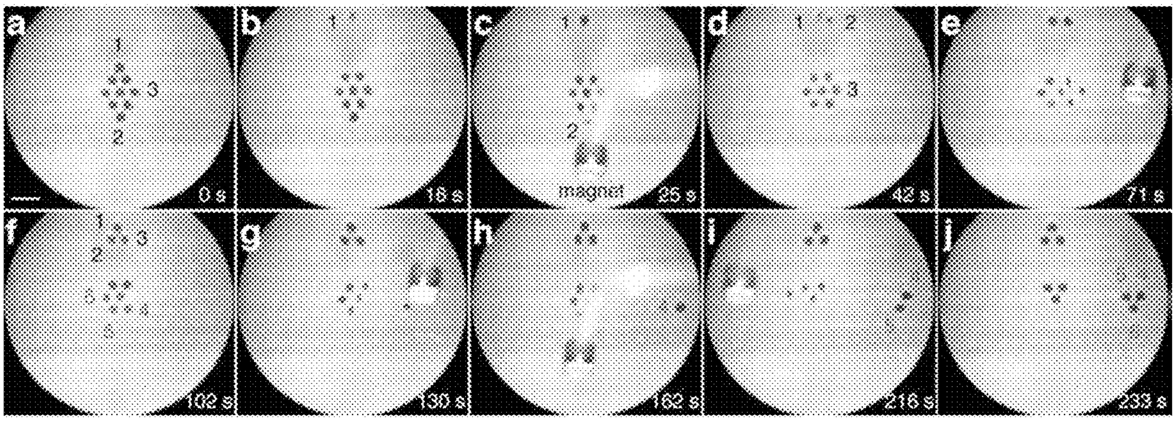
FIG. 5F FIG. 5G FIG. 5H FIG. 5I FIG. 5J FIG. 8A FIG. 8B FIG. 8C FIG. 8D FIG. 8E
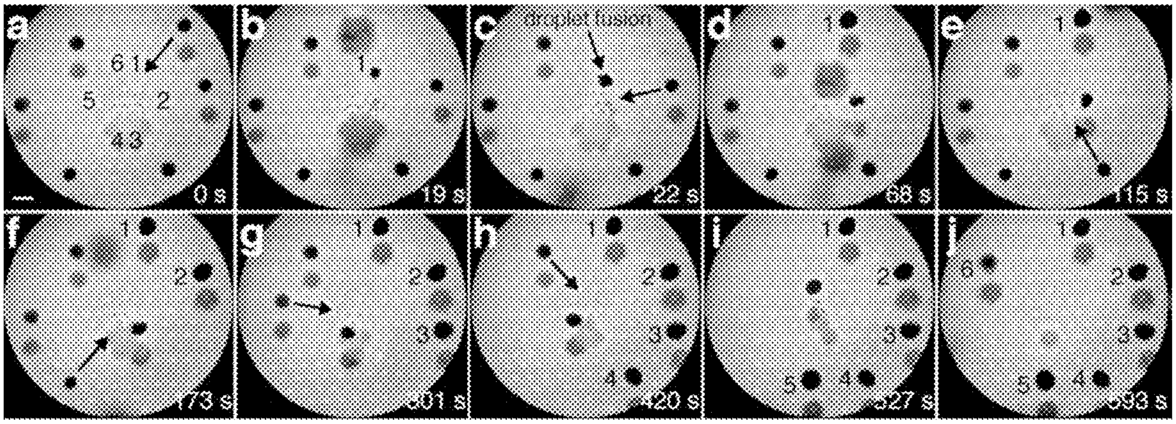
FIG. 8F FIG. 8G FIG. 8H FIG. 8I FIG. 8J
FIG. 9A FIG. 9B FIG. 9C FIG. 9D
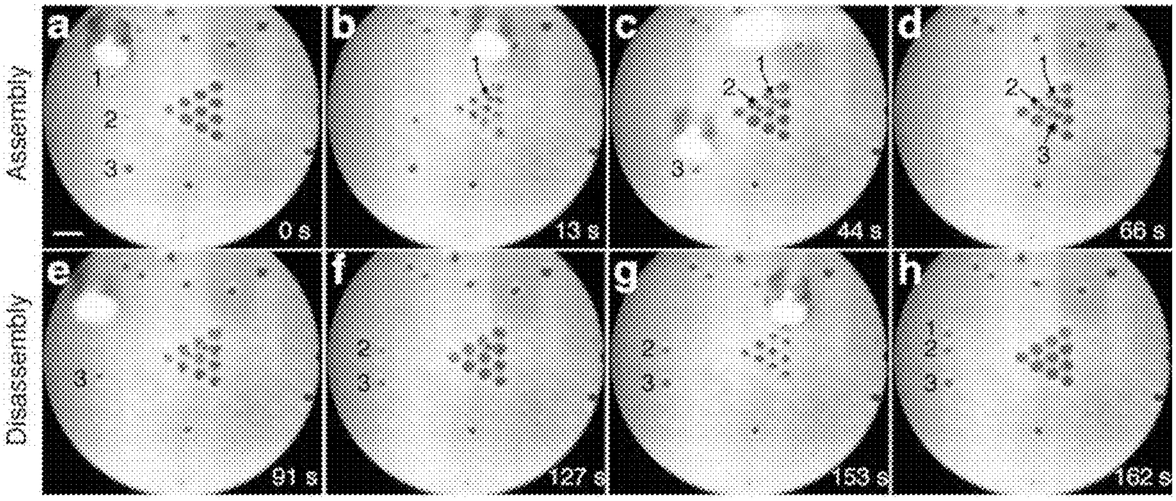
FIG. 9E FIG. 9F FIG. 9G FIG. 9H FIG. 10A FIG. 10B FIG. 10C FIG. 10D
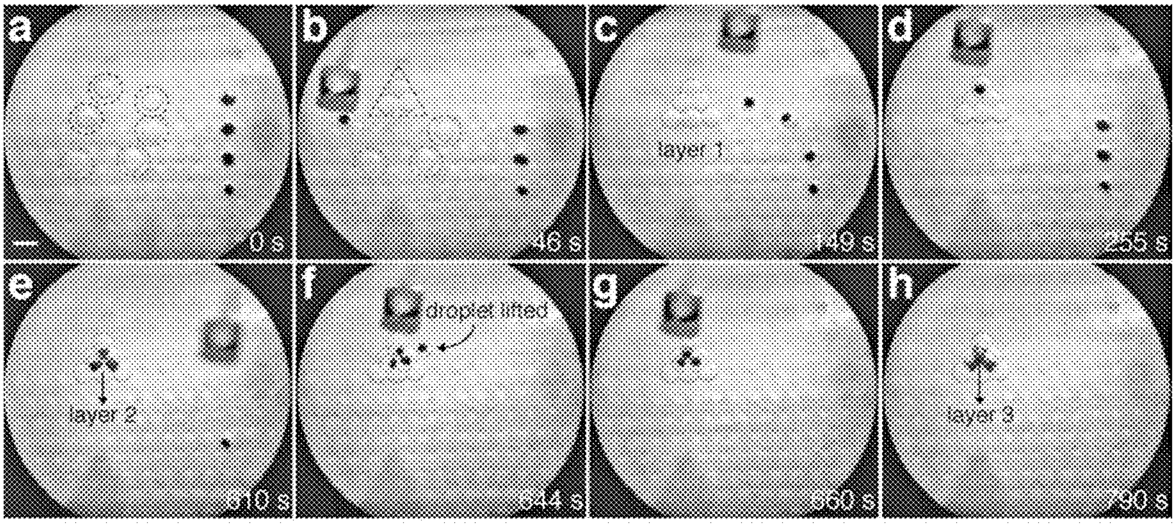
FIG. 10E FIG. 10F FIG. 10G FIG. 10H
FIG. 11A FIG. 11B FIG. 11C FIG. 11D
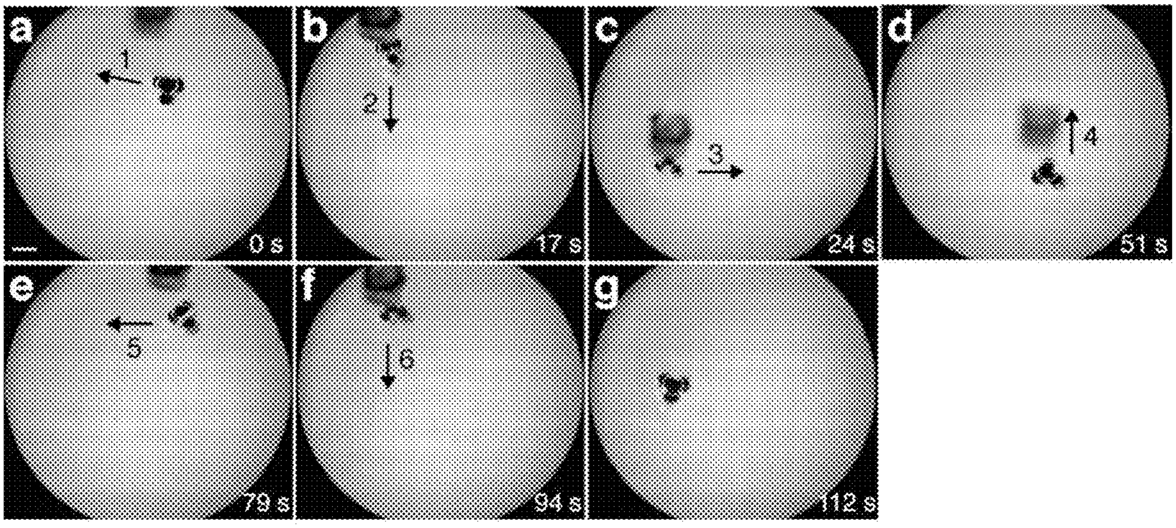
FIG. 11E FIG. 11F FIG. 11G

DROPLET ASSEMBLY METHOD

RELATED APPLICATION

This application is a continuation of U.S. application Ser. No. 14/437,340, which is the U.S. National Stage of International Application No. PCT/GB2013/052796, filed Oct. 25, 2013, which designates the U.S., published in English, and claims priority under 35 U.S.C. § 119 or 365(c) to Great Britain Application No. 1219196.1, filed Oct. 25, 2012. The entire teachings of the above applications are incorporated herein by reference.

FIELD OF THE INVENTION

The invention relates to a process for moving a droplet from a first location to a second location, which droplet comprises a magnetic material disposed in an aqueous medium. The invention also relates to a droplet assembly comprising a droplet, which droplet comprises a magnetic material disposed in an aqueous medium. Various uses of the droplet assembly are also described.

BACKGROUND TO THE INVENTION

Droplets that communicate through interface bilayers are promising components of synthetic minimal tissues (Bayley, H. et al. Mol Biosys 4, 1191-1208 (2008) and Woolfson, D. N. & Bromley, E. H. C. The Biochemist 33, 19-25 (2011)). The inventors have reported the manual assembly of lipid-coated aqueous droplets in oil to form two-dimensional networks (2D) (Holden, M. A., et al, J Am Chem Soc 129, 8650-8655 (2007)) and the manual encapsulation of simple droplet networks so they can function in an aqueous environment (Villar, G., et al, Nat Nanotechnol 6, 803-808 (2011)).

A principal goal of synthetic biology is to reprogram cells or build them from scratch (Woolfson, D. N. & Bromley, E. H. C. The Biochemist 33, 19-25 (2011), Channon, K., et al, Curr Opin Struct Biol 18, 491-498 (2008) and Schwille, P. Science 333, 1252-1254 (2011)). Work on reprogramming is focused on reconstructed and synthetic genomes (Gibson, D. G. et al. Science 329, 52-56 (2010) and Clancy, K. & Voigt, C. A. Curr Opin Biotechnol 21 (2010)). An alternative, bottom-up, approach is to build cells from parts, with the goals of mimicking and complementing the properties of biological cells, and even understanding the origin of life (Noireaux, V. & Libchaber, A. Proc Natl Acad Sci USA 101, 17669-17674 (2004) and Schrum, J. P., et al, Cold Spring Harb Perspect Biol 2, a002212 (2010)). These synthetic minimal cells, or protocells, are expected to perform various actions, such as energy storage and utilization, linear and rotary motion, sensing and signal transduction, the uptake, transformation and release of small molecules, and computation (Astier, Y., et al, Curr Opin Chem Biol 9, 576-584 (2005)). Far less work has been done on assemblies of minimal cells, minimal tissues or prototissues, which might be better able to carry out these tasks and, further, produce emergent properties that cannot be achieved by individual cells (Maglia, G. et al. Nat Nanotechnol 4, 437-440 (2009)).

The inventors' approach to minimal tissues has been to assemble networks of communicating droplets (Holden, M. A., et al, J Am Chem Soc 129, 8650-8655 (2007)). The inventors have shown that aqueous droplets in oil can be connected by lipid bilayers through which they can communicate by means of ion channels and pores (Bayley, H. et al. Mol Biosys 4, 1191-1208 (2008)). 2D droplet networks have been constructed that function as light sensors, batteries and simple electronic circuits (Holden, M. A., et al, J Am Chem Soc 129, 8650-8655 (2007) and Maglia, G. et al. Nat Nanotechnol 4, 437-440 (2009)).

SUMMARY OF THE INVENTION

The inventors have now provided a process for moving a droplet from a first location to a second location which allows the droplet to be moved in a precisely controlled manner.

By inserting a magnetic material in a droplet, the inventors have been able to utilize magnetic manipulation as an extremely effective method of moving an individual droplet and thus also a method of assembling droplet assemblies. The movement of an individual droplet may be controlled, precisely, by the attraction of the droplet to a magnet. By using the process of the invention, droplets can be manipulated with submillimeter precision by a magnet to form 2D and 3D droplet networks. This level of precision was not possible using existing techniques. In particular, the assembly of a 3D droplet network with the level of precision demonstrated by the inventors for this invention would not have been possible using existing techniques.

An important application area for these droplets is synthetic biology. The magnetic material in the droplet may be a biocompatible magnetic material. Thus the use of a magnetic material does not limit the application areas. Rather, as more complex structures may be formed using this technique, the present invention opens up new areas of application.

The inventors have found two main methods of moving a droplet to be particularly effective, the carrier method and the levitation method.

In the carrier method, a first droplet comprising a magnetic bead is attracted to a magnet. The movement of the first droplet is controlled by the movement of the magnet. When the first droplet is brought into contact with a second droplet a bilayer of amphipathic molecules simultaneously forms at the interface of the first and second droplets, which bilayer couples the droplets together. Moving the droplet comprising the magnetic material also moves the second droplet, even though the second droplet does not necessarily comprise a magnetic material. The movement of the second droplet is therefore also controlled by the movement of the magnet. Once the second droplet has been relocated, it can be decoupled from the first droplet. Two or more droplets can be coupled together and moved simultaneously. The carrier method may therefore be used to build up an assembly of droplets.

In the levitation method, a droplet may be lifted up towards the magnet, allowing the droplet to be moved over obstacles and/or placed above other droplets. This method thus makes the controlled assembly of 3-dimensional droplet assemblies possible.

The different methods may be used in isolation or in conjunction with each other.

The inventors have also found that when two droplets are pushed together, the droplets can be made to fuse. Fusing of droplets can, for example, be useful in the disassembly of a droplet assembly. Fusion of droplets may be important for fusing a small droplet comprising cargo, such as a dye, a therapeutic agent or a diagnostic agent, with a specific droplet in the assembly. This is a very convenient way of introducing further materials into existing droplet assemblies.

The methods of magnetic manipulation may be used to assembly, disassemble or rearrange a droplet assembly. Importantly, the addition of a droplet to a droplet assembly and the removal of a droplet to a droplet assembly can be achieved without compromising the structural integrity of the droplet assembly as a whole.

The droplet assembly may be functionalised, for instance, by the addition of membrane proteins to a bilayer between contacting droplets or by the addition of a substance or material, such as a dye, a therapeutic agent or a diagnostic agent, to the aqueous medium of the droplet. Individual droplets may also be arranged precisely in the droplet assembly. The present invention therefore enables complex, functionalised, assemblies to be created. The assemblies may be 2D or 3D structures. The droplets in the assembly may, for instance, be placed in such as way as to create pathways through the assembly through which information may be transferred. Similarly, there may be other pathways in the same assembly through which the transfer of information is purposefully prevented. For example, by placing protein pores in the bilayers between constituent droplets, the inventors have been able to define electrical and chemical communication pathways in a 3D pyramidal assembly.

Droplet assemblies produced using the process of the invention may be incorporated into a droplet encapsulate. The droplet encapsulate, or "multisome", can communicate with the external environment through membrane proteins. In addition, membrane proteins allow hydrogel objects within the same multisome to communicate with each other. This in principle allows multisomes to sense their environment, process information, and contingently deliver materials to the surroundings.

The ability to pick and place droplets in 3D structures is an important step towards the programmed and automated manufacture of synthetic minimal tissues ("prototissues").

Accordingly, the invention provides, a process for moving a droplet from a first location to a second location, which process comprises:

(i) exposing a droplet which is situated at a first location, which droplet comprises (a) an aqueous medium, (b) an outer layer of amphipathic molecules on at least part of the surface of the aqueous medium, and (c) a magnetic material disposed in the aqueous medium, to a magnetic field of a magnet, and thereby causing the droplet to be attracted to said magnet by magnetic attraction;

(ii) moving the magnet relative to the first location whilst maintaining said magnetic attraction, and thereby causing the droplet to move away from said first location and towards a second location; and (iii) disposing the droplet at said second location.

The invention further provides, a droplet assembly comprising a plurality of droplets wherein each droplet comprises an aqueous medium and an outer layer of amphipathic molecules around the surface of the aqueous medium, and wherein at least one of the plurality of droplets comprises a magnetic material disposed in the aqueous medium. The magnetic material may for instance comprise a magnetic bead.

Also provided by the invention is the use of a droplet assembly as defined herein in synthetic biology.

In a further aspect, the invention provides the use of a droplet assembly as defined herein in preparing a protocell or an aggregate of protocells.

In yet another aspect, the invention provides the use of a droplet assembly as defined herein as a communication network or as part of a communication network.

The invention further provides, the use of a droplet assembly as defined herein to store energy.

BRIEF DESCRIPTION OF THE FIGURES

FIG. 1A is a schematic illustration showing the formation of 2D and 3D droplet networks, which were formed by moving droplets with a magnet. Droplets containing lipids and magnetic beads were formed by injection into oil. A Nd magnet glued to the end of a glass capillary was used to move the droplets in the oil. The capillary is attached to a xyz micromanipulator. A droplet is levitated by bringing the magnet close to the oil surface (step 1). The droplet does not cross the oil/air interface owing to the surface tension. The levitated droplet is moved laterally (step 2), and finally placed to form a 2D network by lifting the magnet back to its original height (step 3). Similarly, placing droplets on a 2D network gives a 3D network. FIG. 1B shows aqueous droplets (400 nL) containing both DPhPC liposomes (1 mg $mL^{-1}$ in 1 M KCl, 10 mM Tris·HCl, pH 7.0) and magnetic beads strewn in a PDMS chamber with a surface patterned with pillars. The chamber was filled with DPhPC in hexadecane (1 mg $mL^{-1}$). FIGS. 1C-1G demonstrates the use of a Nd magnet to assemble the droplets into small construction modules (COM 1, COM 2, COM 3) by using the levitating droplet technique. As shown in FIGS. 1H, 1I, the three modules were brought together to complete a 2D network. The assembly was stable for at least 1 h. The elapsed time in seconds is shown. The scale bar in FIG. 1B represents 2 mm and all panels are at the same scale.

FIGS. 2A and 2B show the materials used for droplet array formation. FIG. 2A shows a hexagonally patterned PDMS container. PMMA chips patterned with pillars were micromachined on a CNC machine. The chips were used as templates to mold PDMS containers. FIG. 2B shows a glass capillary (O.D.=0.5 mm) bent at an angle by heating, and a Nd magnet (1.2 mm×1.2 mm×1.2 mm) glued at its end. The scale bars represent 2 mm.

FIGS. 3A-3F show a hexagonal 2D network made of 400 nL droplets that was moved in hexadecane by lifting the network over a PDMS surface patterned with pillars, using a Nd magnet. The aqueous droplets contained DPhPC in 1 M KCl, 10 mM Tris·HCl, pH 7.0 (1 mg $mL^{-1}$). The hexadecane also contained DPhPC (1 mg $mL^{-1}$). The arrows denote the movement of the assembly. The elapsed time in seconds is shown. The scale bar in FIG. 3A represents 2 mm and all panels are at the same scale.

FIGS. 4A-4H demonstrate the switching of droplets between 2D assemblies containing magnetic beads. FIGS. 4A-4C show two networks, a hexagon-shaped network and a parallelogram-shaped network, constructed with 400 nL droplets on a patterned PDMS surface. A droplet (shown by an asterisk) was moved by using a magnet from network 1 to network 2. FIGS. 4D, 4E show that subsequently another droplet (shown by a second asterisk) was moved from network 1 to network 2. As shown in FIGS. 4F-4H, the two droplets were moved back to network 1. The DPhPC concentration in the droplets (1 M KCl, 10 mM Tris·HCl, pH 7.0) and hexadecane was 1 mg $mL^{-1}$. The elapsed time in seconds is shown. The scale bar in FIG. 4A represents 2 mm and all panels are at the same scale.

FIGS. 5A-5J illustrate the disassembly of a 2D network of droplets containing magnetic beads. FIG. 5A shows a parallelogram-shaped 2D network that was made of 400 nL droplets containing magnetic beads on a patterned PDMS surface. As shown in FIGS. 5B-5J, the network was disassembled by peeling off droplets from the edges moving inwards, to yield three triangular CoMs. The aqueous and the oil phases (see previous experiments) contained DPhPC (1 mg $mL^{-1}$). The elapsed time in seconds is shown. The scale bar in FIG. 5A represents 2 mm and all panels are at the same scale).

FIG. 7A is a schematic illustration of how the 2D droplet network was assembled on a polystyrene Petri dish by the carrier droplet method (see Examples). FIGS. 7B, 7C demonstrate the carrier droplet (loaded with magnetic beads) being moved to an empty droplet to form a droplet interface bilayer (DIB). FIGS. 7D, 7E show that a linear chain of three empty droplets was formed as the first construction module (CoM 1). The bilayer between the carrier droplet and the linear droplet chain was strong enough to withstand the drag on the attached droplets while they were moved. FIG. 7F shows that the carrier droplet was then detached from the linear droplet chain by moving the magnet quickly (FIGS. 21A-21C), and used to form another module (CoM 2) with a triangular pattern (FIG. 7G). In FIGS. 7H, 7I it is shown that CoM 1 and CoM 2 were connected to form a 6-droplet triangle. FIGS. 7J-7M show that the carrier droplet was used to pull the complete assembly around the dish. All droplets were 400 nL in volume, and contained DPhPC liposomes (1 mg $mL^{-1}$) in 1 M KCl, 10 mM Tris·HCl, pH 7.0. The oil phase was a 1:1 (v/v) mixture of hexadecane/silicone oil containing DPhPC (1 mg $mL^{-1}$). The black spots are the shadows of the droplets. False shading was added to the shapes, using Adobe Photoshop, to enhance clarity. The elapsed time in seconds is shown. The scale bar in FIG. 7A represent 2 mm and all panels are at the same scale.

FIGS. 8A-8J demonstrate the disassembling a 2D network made of empty droplets. FIG. 8A shows a 2D 7-droplet hexagon of empty 400 nL droplets (labelled 1-6, centre droplet not labelled) constructed on a patterned PDMS surface. FIGS. 8B-8D show that a magnetic carrier droplet was fused to empty droplet 1 and the droplet was peeled off the assembly by moving the magnet away. The inventors were unable to remove droplets from a 7-droplet hexagon network by the carrier droplet method, owing to the resistance experienced by the first droplet to be removed (three bilayers) and by the subsequent droplets (two bilayers). FIGS. 8E-8J show that the network was disassembled by sequentially removing the remaining empty droplets in a similar fashion. To facilitate fusion between the magnetic carrier droplets and the empty network droplets, the DPhPC concentration in hexadecane was reduced to 0.5 mg $mL^{-1}$, and no lipids were present in the magnetic droplet, enabling fusion in 3 s to 69 s (n=6). The concentration of DPhPC in the empty buffer droplets (1 M KCl, 10 mM Tris·HCl, pH 7.0) was 1 mg $mL^{-1}$. Decreasing the lipid concentration in hexadecane did not compromise the stability of the droplet network. False shading was added to the shapes, using Adobe Photoshop, to enhance clarity. Black shadows of the droplets can be seen. The elapsed time in seconds is shown. The scale bar in FIG. 8A represent 1 mm and all panels are at the same scale.

FIGS. 9A-9H demonstrate the assembly and disassembly of a 3D droplet network. FIG. 9A shows a triangular 2D network of ten 400 nL droplets containing magnetic beads was constructed in hexadecane by the levitation technique. In FIGS. 9B-9D it is shown that a second layer of three droplets (250 nL each) was assembled on top of the initial network. The droplets were magnetically levitated and positioned one-by-one. FIGS. 9E-9H show that the disassembly of the network was accomplished by removing the second droplet layer. The droplets were levitated and placed on the patterned surface without disturbing the droplets in the bottom layer. The droplets and hexadecane contained DPhPC (1 mg $mL^{-1}$). The elapsed time in seconds is shown. The scale bar in FIG. 9A represents 2 mm and all panels are at the same scale.

FIGS. 10A-10H illustrate 3D network construction. A 3D assembly consisting of three droplet layers was constructed on a patterned PDMS surface. As shown in FIGS. 10A-10C the bottom layer (layer 1) was assembled by pushing individual droplets with a carrier droplet to form a 6-droplet triangle. FIGS. 10D, 10E show that droplets loaded with magnetic beads were placed by levitation on layer 1 to form the 3-droplet layer 2. FIGS. 10F-10H show that a final droplet was lifted and placed (layer 3) on the second layer to finish the pyramidal assembly. The elapsed time in seconds is shown. The scale bar in FIG. 10A represents 1 mm and all panels are at the same scale. Droplets from the two upper layers could be removed by magnetic levitation and placed back on the patterned surface, leaving behind a 2D assembly (FIGS. 9A-9H).

FIGS. 11A-11G illustrate the moving of a 3D assembly. As shown in FIGS. 11A-11G, four droplets (400 nL) containing DPhPC (1 mg $mL^{-1}$) and magnetic beads were assembled in a 3D pyramidal network in a 1:1 (v/v) hexadecane/silicone oil AR20 mixture containing DPhPC (1 mg $mL^{-1}$). Because of the higher stability of interface bilayers in this mixture (compared to pure hexadecane), the 3D assembly could be moved (not levitated) without displacing the top droplet. The arrows show the direction of movement of the assembly. The elapsed time in seconds is shown. The scale bar in FIG. 11A represents 1 mm and all panels are at the same scale.

FIG. 12A shows a 2D 4-droplet network that was assembled with three empty droplets and one magnetic droplet in hexadecane containing DPhPC (1 mg $mL^{-1}$). Both the empty and magnetic droplets contained DPhPC (1 mg $mL^{-1}$). The assembly was switched from 2D to 3D by lifting and dropping the droplet containing magnetic beads. As shown in FIGS. 12B-12D, lifting the magnetic droplet pulled the two adjacent empty droplets (shown by black arrows) into the empty space forming a pyramidal 3D assembly. Switching the assembly changed the number of interface bilayers from five to six. Assuming that each bilayer contained the same number of pores, the equivalent resistance of the circuit would decrease from R to R/2. The circuit diagrams of the droplet networks are shown in the top panel. For clarity, the membrane capacitors are not drawn. The resistance calculation was made by assuming that the electrodes were in droplets 1 and 3. The elapsed time in seconds is shown. The scale bar in FIG. 12A represents 1 mm and all panels are at the same scale). A soft-matter system, such as this, might be used to construct a switchable device that changes its properties after manipulation of one of the components. Analogously, the behavioral characteristics of cells vary depending on whether the cells are in a 2D or a 3D environment (Cukierman, E. et al, Science 294, 1708-1712 (2001) and Abbott, A. Nature 424, 870-872 (2003).) e.g., signaling pathways differ depending on whether cells are in 2D or 3D landscapes (Cukierman, E. et al, Curr Opin Cell Biol 14, 633-639 (2002) and Yamada, K. M. & Cukierman, E. Cell 130, 601-610 (2007)).

FIG. 13A shows aqueous droplets in a three-layered network forming a pyramid (face-centered cubic). The layer 1 and the apex contained 5-carboxytetramethylrhodamine (5-cTAMRA) and layer 2 contained fluorescein. FIG. 13B demonstrates that droplets could be arranged in other lattice orientations (100) and (c) hexagonal close packing (111) on a patterned surface. Here, some droplets contained 10 mM pyranine (light droplets) or 100 mM xylene cyanol (dark droplets). Whether two droplets formed an interface bilayer could be controlled by changing the droplet size, e.g., if the droplets on a higher layer were smaller than those below, they did not touch each other but only communicated with the bottom droplets. The DPhPC concentration (in a, b) both inside and outside the droplets was 1 mg $mL^{-1}$; lipid concentrations in c varied for individual droplets (see FIGS. 20A-20F). The scale bars represent 200 μm.

FIG. 14A shows a Ag/AgCl electrode (cis) that was inserted in the apical droplet after assembling the network. Two droplets (α, dark grey and β, light grey, to the left hand side of the droplet assembly in FIG. 14A) contained αHL, ~830 ng $mL^{-1}$ and ~83 ng $mL^{-1}$, respectively. A third droplet (light grey, in the droplet assembly in FIG. 14A) contained γCD (36 μM), a blocker of αHL from the barrel side. Droplet β, suspended at the end of a Ag/AgCl electrode (trans), was used as a 'probe' droplet to determine the path of ions through the network droplets measured as electrical signals (lower panel). As shown in FIGS. 14B, 14C, upon connecting droplets containing αHL with one intervening empty droplet, the insertion of αHL pores was observed (upper panel, b, c; lower panel, corresponding current trace for b). A representative trace from b is shown for both b and c (as they are similar cases). The values in the current traces (between dotted lines) denote the magnitude of the open pore current. FIG. 14D shows that, when the αHL-containing droplets were connected through two empty droplets, there was no electrical connection as denoted by the absence of any observable pore insertion steps. In contrast, FIG. 14E shows that, when the probe droplet was connected again to droplet α through a different intervening empty droplet at the vertex of the assembly, an electrical connection was re-established. FIG. 14F shows that, when the probe droplet was connected directly to droplet α, which contained a high concentration of αHL, a rapid increase in the current was observed instead of discrete insertion steps. As shown in FIG. 14G, the probe droplet was then connected to droplet α through the apex droplet as the intervening droplet. An ionic path was established but with a lower frequency of αHL pore insertions. In FIG. 14H, the electrical signal was interrupted by γCD blockades. White arrows indicate open ionic paths, whereas lines indicate blocked ionic paths. The progressive decrease in the current amplitude with each insertion of αHL is expected, and its physical origin explained in FIGS. 15A-15D.

FIG. 15A shows that the droplets were arranged in a pyramid-shape. Droplets a and β contained ~830 ng $mL^{-1}$ and ~83 ng $mL^{-1}$ concentrations of αHL heptamer, respectively; droplets X and T contained no protein (see FIGS. 14A-14H). As shown in FIG. 15B, droplet β was used to form a bilayer with droplet X, and an electrical path (shown by white arrows) formed between droplets T and β. FIG. 15C shows the equivalent electrical circuit of the droplet interface bilayers in series when an electrical potential is applied between the apical droplet T and the probe droplet β. As shown in FIG. 15D, as expected, lower open pore current values were measured with an increasing number of pore insertions in the bilayer between β and X due to the bilayers between α and X, and between α and T acting as resistors. The inventors determined the number of αHL pores inserted in the bilayers of droplet α, and the resistance of a single pore. They assumed that each αHL pore has the same resistance, R, and that the number of pores ($N_\alpha$) inserted in both the bilayers of droplet α (formed between α and X, and between α and T) was the same. $N_\beta$ was the number of pores inserted in the bilayer between droplet X and droplet β determined experimentally by single-channel recording (12 αHL pore insertions occurred as shown in d). Fitting the plot of G (1/R) as a function of Na to the equation, $$G=(N_\alpha \times N_\beta)[(R \times N_\alpha)+(2R \times N_\beta)],$$

revealed that approximately 35 αHL pores (Na) were already inserted in each bilayer of droplet α prior to forming a bilayer between droplet β and droplet X. The value of R obtained for a single αHL pore from a fit to the above equation was 1.1 GΩ, in good agreement with the reported value of 1.2 GΩ under similar conditions (Holden, M. A., Needham, D. & Bayley, H. J Am Chem Soc 129, 8650-8655 (2007) and Gu, L.-Q. et al, Nature 398, 686-690 (1999)).

Figures 16A, 16B, 16C, 16D, 16E, 16F, 16G, 16H:
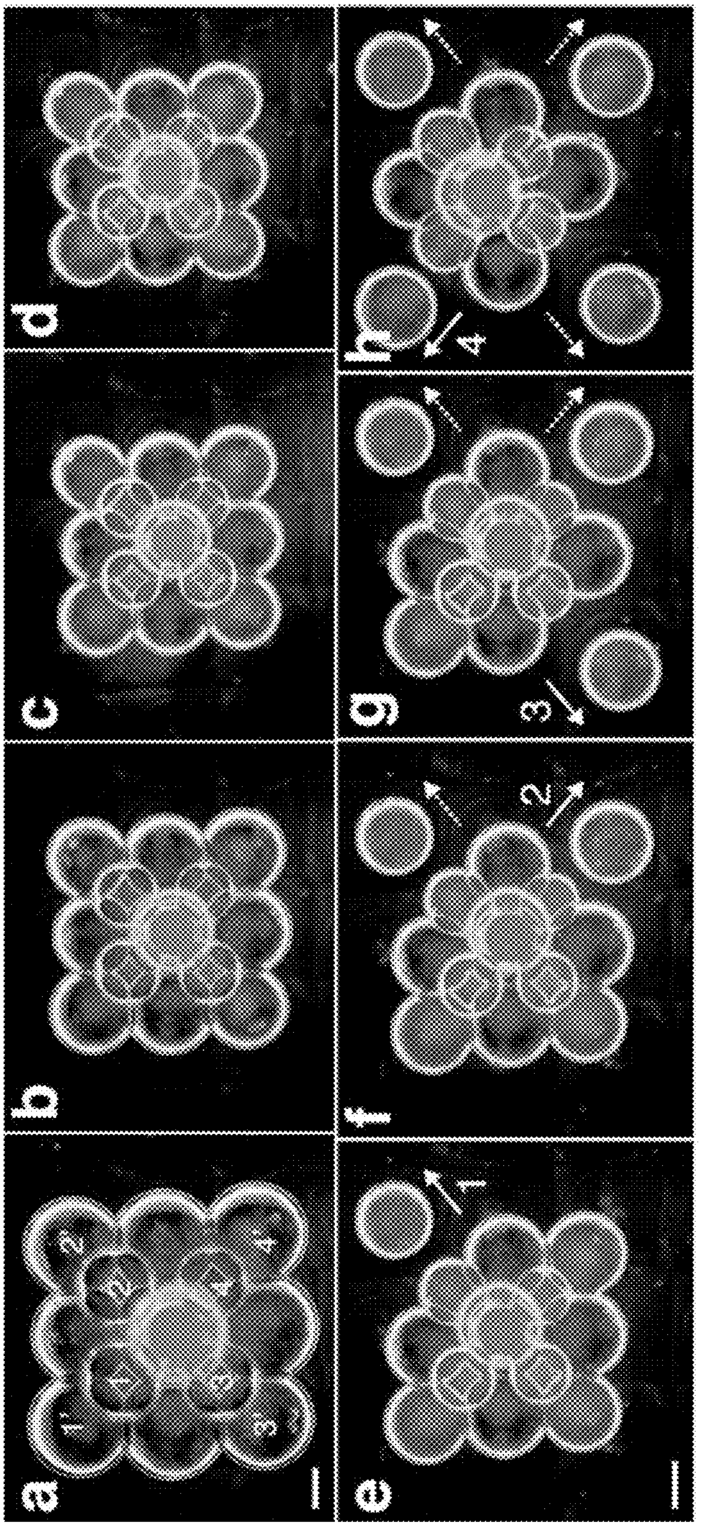

FIGS. 16A-16H illustrate specific communication paths defined by αHL pores in a 3D droplet network. FIG. 16A shows a 9-droplet square array containing 1 M KCl, 10 mM Tris·HCl, pH 7.0, which formed the bottom layer. The four droplets at the vertices (1', 2', 3', 4') contained αHL heptamer (~83 μg $mL^{-1}$). Four droplets (1, 2, 3, 4) containing αHL heptamer (~83 μg $mL^{-1}$) were placed on the bottom layer to form a second layer, and finally a droplet containing pyranine (10 mM in 1 M KCl, 10 mM Tris·HCl, pH 7.0) was placed on top of the assembly without the help of a magnet. FIG. 16B shows that, after 4 days, a colour change was observed in all the droplets of the second layer. As shown in FIG. 16C, after an additional ~12 h, the a colour change was observed in the four vertex droplets of the base layer. The colour of the four vertex droplets turned darker after another 12 h (i.e. 1 day). This demonstrates the transfer for pyranine through the droplet assembly. FIGS. 16E-16H show that the vertex droplets could be removed one-by-one without compromising the structural integrity of the assembly. All the droplets contained DPhPC (1 mg $mL^{-1}$), and were assembled in a 1:1 (v/v) mixture of hexadecane/silicone oil AR20 containing DPhPC (2 mg $mL^{-1}$). The scale bars in FIGS. 16A, 16E represent 200 μm. The scale bars in FIGS.

16B-16D are the same scale as FIG. 16A and the scale bars in FIGS. 16F-16H are the same scale as FIG. 16E.

Figure 17A:
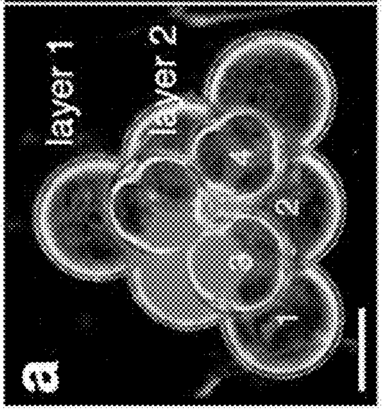
Figure 17B:
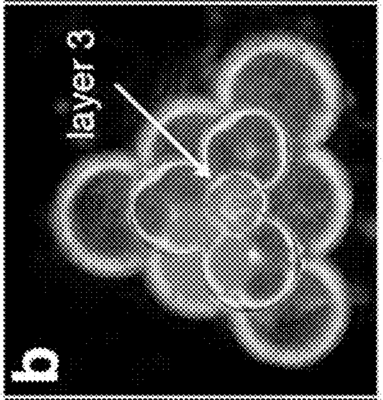
Figure 17C:
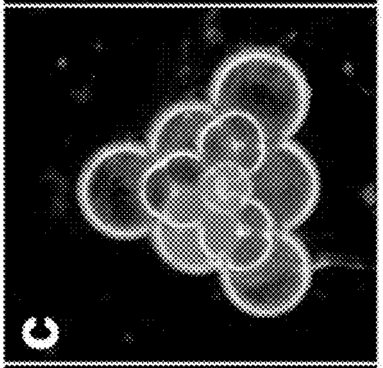
Figure 17D:
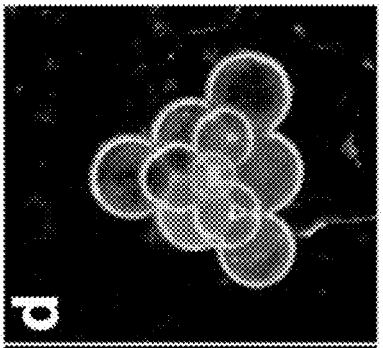

FIGS. 17A-17D demonstrate pyranine diffusion in a droplet pyramid. A three-layered droplet pyramid was assembled by injecting droplets without any magnetic beads into a 1:1 (v/v) mixture of hexadecane/silicone oil AR20 containing DPhPC (2 mg $mL^{-1}$). No magnetic beads were used for easy visualization of dye diffusion. All the droplets contained DPhPC (1 mg $mL^{-1}$) in 1 M KCl, 10 mM Tris·HCl, pH 7.0. FIG. 17A shows layer 1, that was constructed by assembling six droplets, one containing 10 mM pyranine (shaded light grey, on the left-hand side of the figure, on the bottom layer of the droplet assembly), two (labelled 1 and 2) containing αHL heptamer (~83 μg $mL^{-1}$), and three empty droplets. Layer 2 was assembled with three droplets (incubated in the oil/lipid mixture for ~30 min and then placed on layer 1 using a pipette), two droplets (labeled 3 and 4) containing αHL (~83 μg $mL^{-1}$), and one empty droplet. FIG. 17B shows the apex of the pyramid (layer 3) formed by placing a droplet containing 10 mM pyranine on top of layer 2. As shown in FIG. 17C, after ~70 h, the droplets containing αHL turned green (light grey in the figure provided), indicating the presence of pyranine in the droplet. As shown in FIG. 17D, after a further interval of ~23 h, the droplets became darker. The images were taken through a stereomicroscope (Olympus SZX10). Although the 3D droplet network was stable for four days, a ~50% reduction in the size was observed due to the loss of water into the oil mixture. The scale bar in FIG. 17A represents 200 μm and all panels are at the same scale.

Figures 18A, 18B, 18C, 18D:
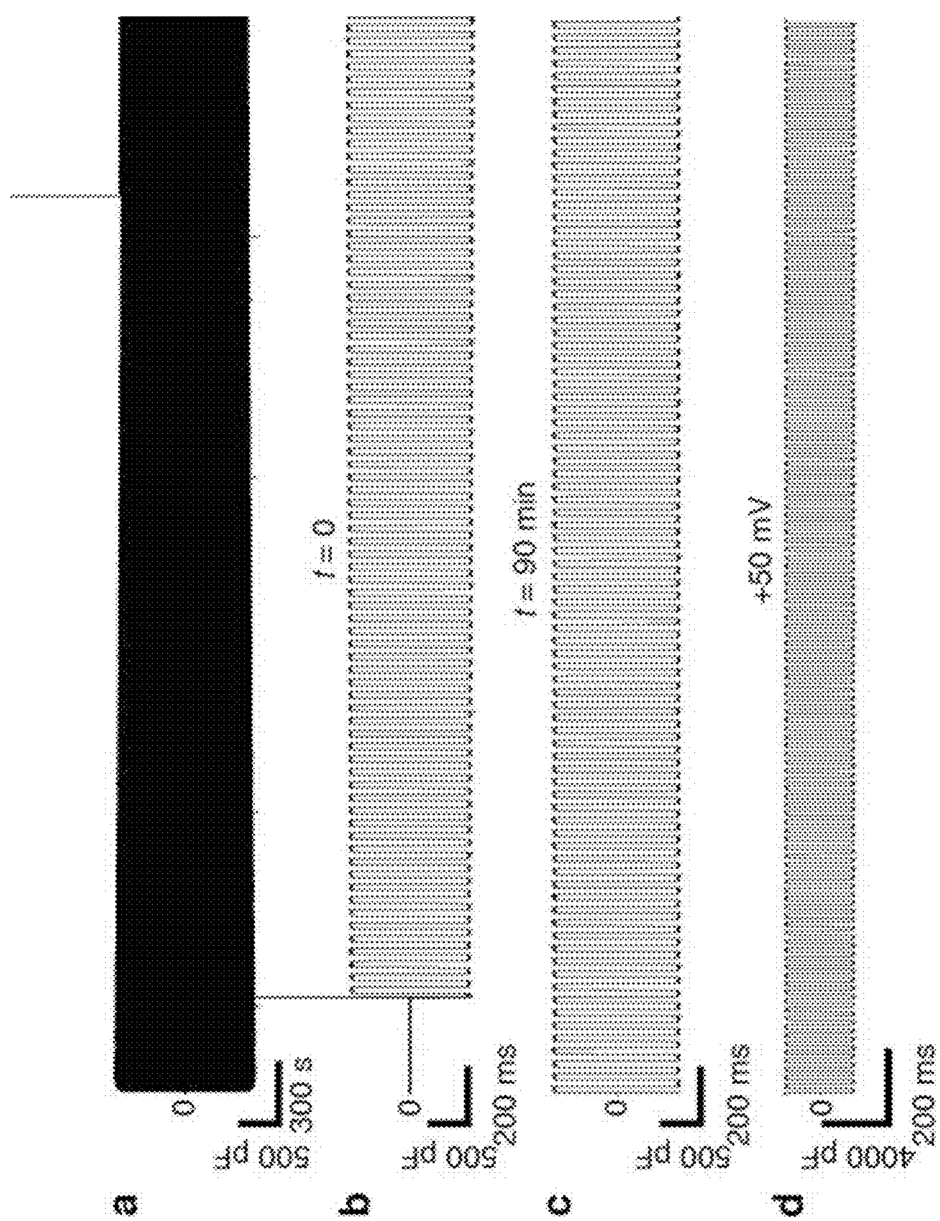

FIGS. 18A-18D demonstrate bilayer formation by droplets containing pyranine. To ensure that pyranine did not compromise the lipid bilayer stability causing it to diffuse through the bilayer, the stability of bilayers formed by droplets containing pyranine was tested electrically. A droplet containing pyranine (10 mM) and DPhPC (1 mg $mL^{-1}$) in 1 M KCl, 10 mM Tris·HCl, pH 7.0, was used to form a bilayer with another droplet containing DPhPC (1 mg $mL^{-1}$) but no pyranine in the same buffer. The droplets were incubated in a mixture of hexadecane/silicone oil AR20 (1:1 v/v) containing DPhPC (1 mg $mL^{-1}$). As shown in FIG. 18A, the bilayer was stable for at least 90 min as determined by monitoring the capacitance. FIGS. 18B, 18C show the bilayer capacitance measurements, which demonstrate that the bilayer did not become leaky after 90 min. As shown in FIG. 18D, an applied potential (+50 mV) did not compromise the bilayer stability.

Figure 19B:
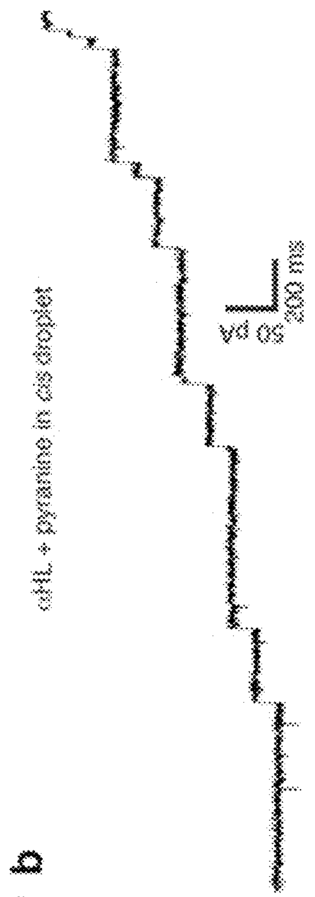
Figure 19A:
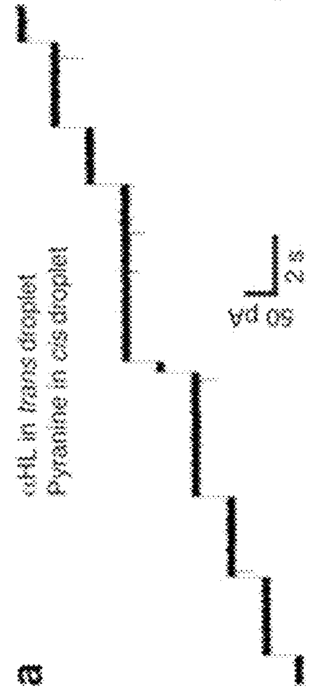

FIGS. 19A-19B illustrate αHL heptamer pore insertion events in the presence of pyranine. To determine whether αHL is functional in the presence of pyranine, the inventors measured individual αHL pore insertion events. FIG. 19A shows that a bilayer was formed between a cis droplet (1 M KCl, 10 mM Tris·HCl, pH 7.0) containing pyranine (10 mM) and a trans droplet containing αHL (~83 ng $mL^{-1}$ in the same buffer) in a mixture of hexadecane/silicone oil AR20 (1:1 v/v) containing DPhPC (1 mg $mL^{-1}$). Both droplets contained DPhPC (1 mg $mL^{-1}$). The open pore current was of the expected amplitude (51.1±1.2 pA, average±S.D., n=12) at +50 mV. FIG. 19B provides the results of a second experiment, in which pyranine (10 mM) and αHL (~830 ng·$ml^{-1}$) were in the cis droplet (containing 1 mg $mL^{-1}$ DPhPC), and the trans droplet contained only DPhPC (1 mg $mL^{-1}$). The measured open pore current was as expected (21.9±1.6 pA, n=19) at +20 mV. The unitary conductance values were in accordance with reported values (Holden, M. A., Needham, D. & Bayley, H. J Am Chem Soc 129, 8650-8655 (2007) and Gu, L.-Q. et al, Nature 398, 686-690 (1999)). The current traces were recorded at a sampling frequency of 5 kHz, filtered with a low-pass Bessel filter (80 dB/decade) with a corner frequency of 1 kHz. Post-acquisition, the data were filtered again at 200 Hz.

Figures 20A, 20B, 20C, 20D, 20E, 20F:
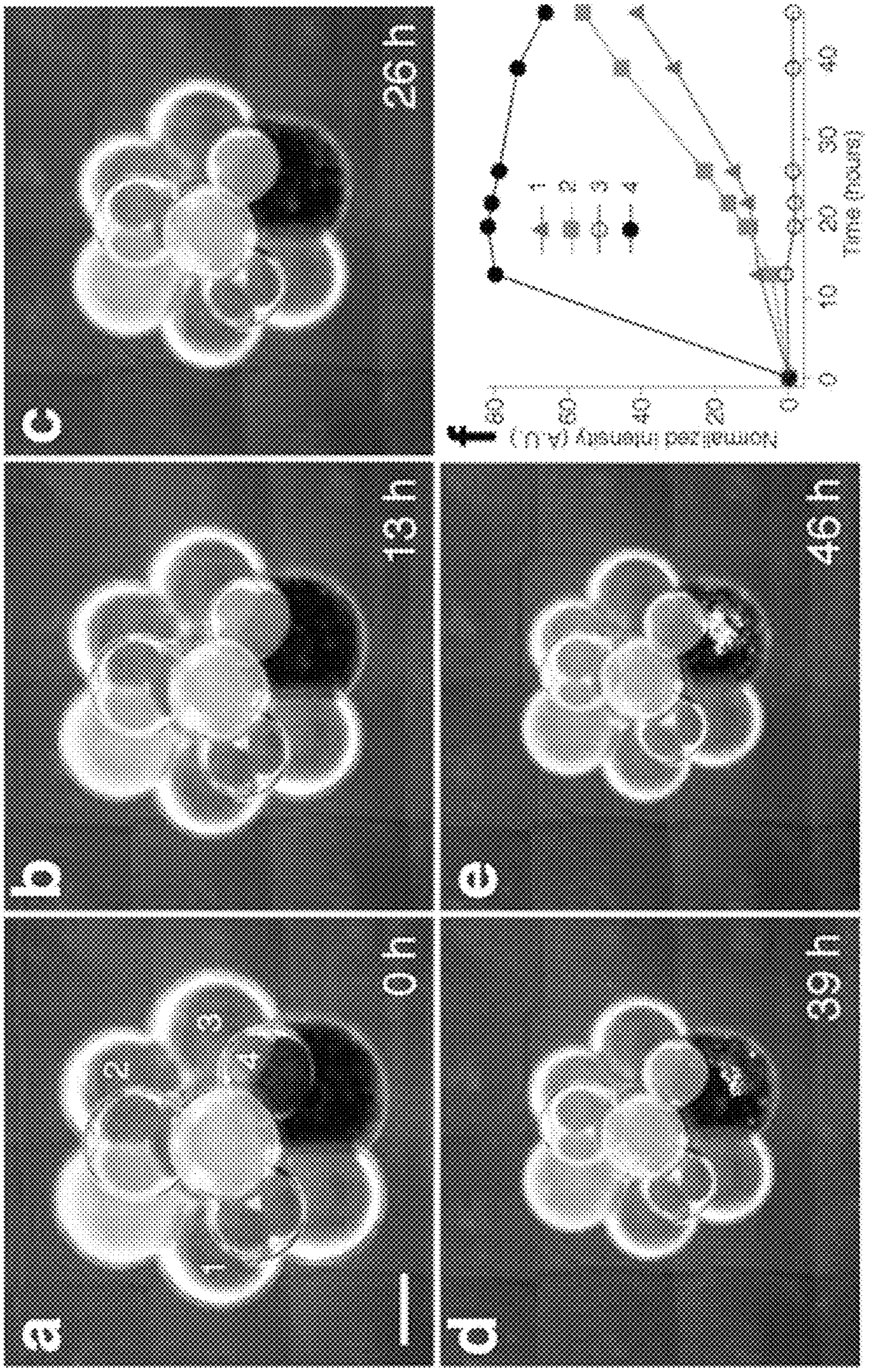

FIGS. 20A-20F demonstrate differential dye diffusion through αHL pores in a 3D network. FIG. 20A shows a 10-droplet 3D network that was constructed without any magnetic beads. The droplets (1 M KCl, 10 mM Tris·HCl, pH 7.0) were injected into a 1:1 (v/v) mixture of hexadecane/silicone oil AR20 containing 1 mg $mL^{-1}$ DPhPC. A hexagonal base layer consisted of two droplets, one containing pyranine (10 mM) and the other xylene cyanol (100 mM), both containing ~83 μg $mL^{-1}$ αHL heptamer. The other four droplets were empty (three labelled 1, 2, 3 and one unlabelled). The second layer was made of three droplets, one containing ~83 μg $mL^{-1}$ αHL (labelled 4) (1 mg $mL^{-1}$ DPhPC), and the other two were empty. The apical droplet contained pyranine (10 mM) and ~8 μg $mL^{-1}$ αHL in 1 mg $mL^{-1}$ DPhPC. All droplets contained 2.5 mg $mL^{-1}$ DPhPC, unless stated otherwise. As shown in FIG. 20B, droplet 4 showed the fastest influx (≤13 h) of pyranine most probably owing to the high concentration of αHL pores in its bilayer interface with the apical droplet (both droplet 4 and the apical droplet contained αHL). FIGS. 20C-20E demonstrate that droplets 1 and 2 showed a slower increase in colour intensity owing to a lower concentration of αHL in their bilayer interfaces with the pyranine droplet (no αHL). No transfer of xylene cyanol was observed across any of its bilayers (droplet 3). The graph in FIG. 20F provides analysis of seven images of each droplet obtained to monitor the increase in color intensity over a period of 2 days. The y-axis provides the normalised intensity and the x-axis provides the time in hours. The images were analyzed using ImageJ. The scale bar in FIG. 20A represents 250 μm and all panels are at the same scale.

Figures 21A, 21B, 21C:
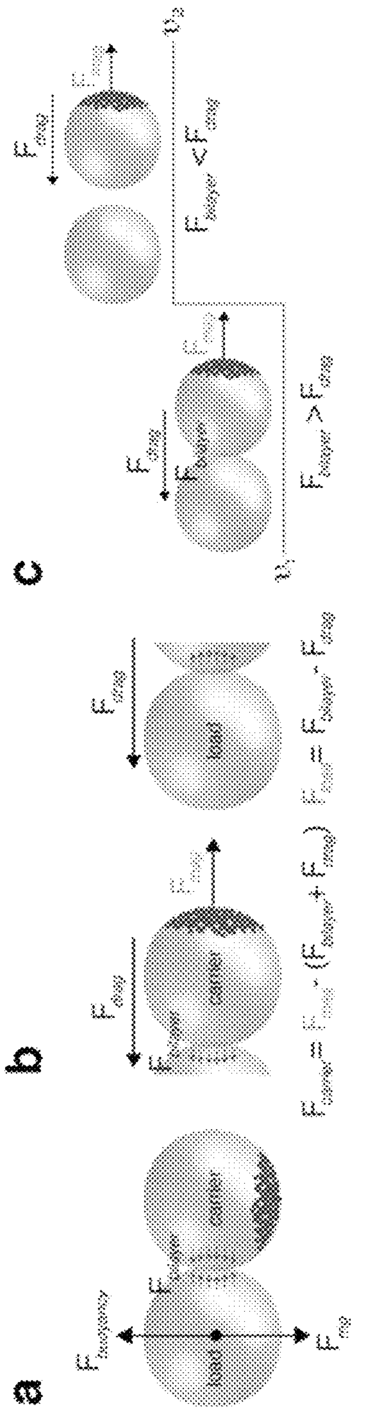

FIGS. 21A-21C provide a schematic that discusses why the carrier droplet detaches at high velocities. FIG. 21A shows the forces acting on the carrier (right-hand droplet, with magnetic beads) and load droplets (left-hand droplet, without any magnetic beads) when stationary. $F_{buoyancy}$ and $F_{mg}$ denote buoyant and gravitational forces acting on both the droplets (forces acting on only one are shown). $F_{bilayer}$ is the bilayer strength (i.e., the interaction strength between two monolayers). FIG. 21B shows the force acting on the carrier droplet under a magnetic field, $F_{mag}$, and the resulting drag on the carrier and load droplets, $F_{drag}$. A carrier droplet was able to pull a droplet chain when a magnet moved the carrier droplet slowly. However, at a higher velocity the carrier droplet detached from the chain. The forces required to pull the carrier droplet, $F_{carrier}$, and the load droplets, $F_{load}$, can be expressed as:

$$F_{carrier}=F_{mag}-(F_{bilayer}+F_{drag})$$

$$F_{load}=F_{bilayer}-F_{drag}$$

As illustrated in FIG. 20C, under low loading rates ($v_1$), $F_{bilayer}>F_{drag}$. To detach the carrier droplet from the load droplet, the carrier droplet was moved fast ($v_2>v_1$). At high loading rates ($v_2$), the interaction strength between the lipid monolayers is decreased owing to a reduction in the height of the activation barrier (assuming a simple two-state energy profile, bilayer →monolayers) (Evans, E. Annu Rev Biophys Biomol Struct 30, 105-128 (2001)). Also, because $F_{drag}\propto v$ (for a small object), $F_{drag}$ increases at higher velocities. Therefore, when the carrier droplet is moved fast, $F_{bilayer}<F_{drag}$, detaching the carrier droplet from the trailing chain.

DETAILED DESCRIPTION OF THE INVENTION

The present invention relates to a process for moving a droplet from a first location to a second location, which process comprises:

(i) exposing a droplet which is situated at a first location, which droplet comprises (a) an aqueous medium, (b) an outer layer of amphipathic molecules on at least part of the surface of the aqueous medium, and (c) a magnetic material disposed in the aqueous medium, to a magnetic field of a magnet, and thereby causing the droplet to be attracted to said magnet by magnetic attraction;

(ii) moving the magnet relative to the first location whilst maintaining said magnetic attraction, and thereby causing the droplet to move away from said first location and towards a second location; and (iii) disposing the droplet at said second location.

The inventors have found that the use of a droplet comprising magnetic material disposed in the aqueous medium is an effective way of moving a droplet from a first location to a second location. The process of the invention has the advantage that it allows the movement of the droplet to be controlled precisely.

The aqueous medium may be any suitable aqueous medium. For instance, the aqueous medium may be pure water, or an aqueous buffer solution, or an aqueous solution of one or more salts. Alternatively, the aqueous medium may comprise a hydrogel. When the aqueous medium may comprise a hydrogel, the aqueous medium may, for instance, comprise agarose and water. The concentration of the agarose in water is typically less than or equal to 10% w/v agarose. For instance, the concentration of the agarose in said water may be from 0.25 to 5% w/v agarose. Hydrogels other than agarose may also be used. For instance the aqueous medium may comprise methylcellulose, polyethylene glycol diacrylate, polyacrylamide, matrigel, hyaluronan, polyethylene oxide, polyAMPS (poly(2-acrylamido-2-methyl-1-propanesulfonic acid)), polyvinylpyrrolidone, polyvinyl alcohol, sodium polyacrylate, acrylate polymers or poly(N-isopropylacrylamide). Alternatively, the aqueous medium may comprise a silicone hydrogel or LB (Luria broth) agar.

One important property of the aqueous medium is pH and this can be varied over a wide range. In some embodiments, for instance, the pH of the aqueous medium within the aqueous droplet or droplets may be in the range of from 5 to 9 (or for instance in the range of from 6 to 8) although higher and lower pHs are also possible. The aqueous medium may therefore be an aqueous buffer solution. Any suitable buffer can be employed, depending on the desired pH. The buffer solution may for instance comprise Tris HCl and KCl. In some embodiments the pH of the aqueous buffer solution is from 5 to 9, or for instance from 6 to 8. The nature and concentration of the solutes can be varied to vary the properties of the solution.

The droplet may be produced by any suitable method. For instance, the droplet may be produced by injecting or pipetting a composition comprising the aqueous medium into a suitable medium, such as a hydrophobic medium. In some embodiments, the droplet is produced using a microfluidic device. Techniques such as soft-lithography may be used to produce a droplet. A droplet may, for instance, be molded. In some embodiments PMMA molds may be used to produce a droplet. Soft-lithography may, for instance, be used to produce a droplet comprising a hydrogel. Alternatively, a droplet may be produced using photolithograph. A photomask may, for instance, be used to define a pattern through which the light (such as UV light) can pass. Photolithography may, for instance, be used to produce a droplet comprising a photocurable polymer. For instance, photolithography may be used to produce a droplet comprising a hydrogel.

The amphipathic molecules are usually as herein defined.

In some embodiments, the droplet comprises an outer layer of amphipathic molecules around the surface of the aqueous medium.

The magnet may be any suitable magnetic material. Usually, the magnetic material is a permanent magnet, for instance, a ferromagnet or a ferrimagnet. Alternatively, the magnet may be an electromagnet.

Typically, the magnet comprises a transition metal, such as nickel, iron or cobalt, or a rare earth metal, such as neodymium or samarium. More typically, the magnet comprises neodymium.

The size of the magnet will depend on a number of factors such as the magnetic material in the droplets and the distance over which a magnetic attraction is required. The magnet may, for instance, have a volume of from 0.5 $mm^3$ to 10 $mm^3$. Typically, the magnet has a volume of from 1 $mm^3$ to 5 $mm^3$, for instance, of from 1 $mm^3$ to 2 $mm^3$. Usually, the magnet is a cube with dimensions of from 1 to 2 mm, for instance a cube with dimensions of approximately 1.2 mm.

Typically, the magnetic material disposed in the aqueous medium of the droplet(s) comprises a paramagnetic or a superparamagnetic material, for instance a paramagnetic or a superparamagnetic metal, such as iron.

In some embodiments, the magnetic material disposed in the aqueous medium of the droplet(s) comprises a magnetic bead. The magnetic bead may, for instance, comprise magnetic particles.

Usually, the magnetic material disposed in the aqueous medium of the droplet(s) comprises a biocompatible magnetic material, such as a biocompatible magnetic bead.

Any suitable magnetic bead may be used. For instance, magnetic beads commercially available from, for instance, Clontech, Promega, Invitrogen and NEB, may be used.

In some embodiments, the magnetic bead comprises magnetic particles with an organic group such as a metal-chelating group, such as nitrilotriacetic acid (NTA), attached. The organic component may, for instance, comprise a group selected from $-C(=O)O-$, $-C-O-C-$, $-C(=O)$, $-NH-$, $-C(=O)-NH$, $-C(=O)-CH_2-I$, $-S(=O)_2-$ and $-S-$. The organic component may comprise a metal chelating group, such as NTA (nitrilotriacetic acid). Usually, a metal such as nickel or cobalt is also attached to the metal-chelating group. Magnetic beads of this sort are commonly used for capturing His-tagged proteins, but are also suitable for use in the process and the produce of the present invention.

Thus, in some embodiments, the magnetic bead may further comprise Ni-NTA or Co-NTA, for instance, a Ni-NTA magnetic bead may be used, or a Co-NTA magnetic bead.

As the skilled person will appreciate, moving the magnet relative to the first location may comprise: (a) moving the magnet towards the droplet whilst keeping the droplet stationary; (b) moving the droplet towards the magnet whilst keeping the magnet stationary; or (c) moving the magnet towards the droplet and moving the droplet towards the magnet.

The magnet may be positioned and controlled using any suitable method. Typically, the magnet is connected to a rod, for instance, a glass rod.

Moving the droplet typically comprises moving the rod. For instance, the rod may be moved by a micromanipulator.

The movement of the magnet may be automated. For instance, when the magnet is an electromagnet, the movement of the magnet may be automated.

The droplet is typically disposed in a hydrophobic medium.

Moving the droplet may comprise moving the hydrophobic medium. As the hydrophobic medium is usually contained in a container, this usually comprises moving a container containing the hydrophobic medium. The hydrophobic medium may, for instance, be as defined herein.

In the step of (ii) moving the magnet relative to the first location whilst maintaining said magnetic attraction there must be a magnetic attraction between the droplet and the magnet throughout the step. However, the magnitude of the magnetic attraction may vary. For instance, the distance between the droplet and the magnet may be reduced, thus increasing the magnetic force. Alternatively, the distance between the droplet and the magnet may be increased, thus decreasing the magnetic force.

Typically, the step of (ii) moving the magnet relative to the first location moves the magnet in a direction away from the first location whilst maintaining said magnetic attraction, and thereby causing the droplet to move away from said first location and towards a second location. Provided that the magnetic attraction is maintained and the droplet is moved away from said first location and towards a second location, the magnet may be moved in any direction away from the first location.

The magnetic material may be any suitable magnetic material. Usually, the magnetic material is a permanent magnet, for instance, a ferromagnet or a ferrimagnet. Typically, the magnet comprises a transition metal, such as nickel, iron or cobalt, or a rare earth metal, such as neodymium or samarium. More typically, the magnet comprises neodymium.

Alternatively, the magnet may be an electromagnet. When the magnet is an electromagnet, the process typically further comprises a step of switching on the electromagnet by allowing a current to flow through the wires of the electromagnet.

As illustrated in the examples, the inventors have found two broad methods, both of which utilise the droplet comprising a magnetic material disposed in the aqueous medium, to be particularly effective for moving a droplet. The methods have been termed the levitation method and the carrier method. Schematic illustrations of processes according to the invention that use the levitation method and the carrier method are shown in FIGS. 1A-1I and 7A-7M respectively.

The two methods have several overlapping features but there are differences between them.

In the carrier method, a first droplet comprising a magnetic bead is typically attracted to a magnet. The movement of the first droplet is controlled by the relative movement of the magnet. Usually, if the first droplet is brought into contact with a second droplet a bilayer of amphipathic molecules simultaneously forms at the interface of the first and second droplets, which bilayer couples the droplets together. The second droplet does not necessarily comprise a magnetic material. Moving the first droplet also moves the second droplet. The movement of the second droplet may therefore also be controlled by the movement of the magnet, even though the second droplet may not comprise a magnetic material. Once the second droplet has been relocated, it may be decoupled from the droplet comprising the magnetic material. Two or more droplets may be coupled together and moved simultaneously.

Typically, in the levitation method, the droplet may be moved in any direction (e.g. left or right, backwards or forwards, up or down), and the step of (i) exposing a droplet to said magnetic field causes the droplet to move away from said first location and towards the magnet. Typically, each droplet moved using the levitation method comprises a magnetic material.

In some embodiments, the step of (i) exposing a droplet to said magnetic field comprises moving said magnet relative to the droplet which is situated at the first location, in a direction towards the droplet, and thereby causing the droplet to be attracted to said magnet by magnetic attraction. For instance, in both the levitation method and the carrier method the droplet is typically attracted to said magnet by magnetic attraction.

The skilled person will appreciate that the distance between the droplet and the magnet required for there to be a magnetic attraction between them will, of course, depend upon factors such as the size of magnetic field of the magnet and the magnetic material disposed in the aqueous medium of the droplet.

Usually, the levitation method uses the magnetic attraction of the droplet to the magnet to cause the droplet to move away from the first location towards the magnet. Therefore, in some embodiments, in the process of the invention, the step of (i) exposing a droplet to said magnetic field causes the droplet to move away from said first location and towards the magnet.

The magnetic force required to move away from said first location and towards the magnet will, for instance, depend upon the density of the medium through which the droplet is moved and the weight of the droplet. For instance, if the droplet is moved vertically through a medium that has a density of approximately 0.75 times the density of water, a force of approximately 0.25 times the weight of the droplet in air must usually be applied.

Typically, the droplet is disposed in a hydrophobic medium and the magnet is above the hydrophobic medium. When the magnet is a permanent magnet, the magnet is typically above the hydrophobic medium.

Alternatively, the droplet may be disposed in a hydrophobic medium and the magnet may also be in the hydrophobic medium. For instance, when the magnet is an electromagnet, the magnet may be above the hydrophobic medium or in the hydrophobic medium. The hydrophobic medium may, for instance, be as further defined herein.

Usually, the hydrophobic medium is contained by a container. A surface of the container that is in contact with the oil may be a rough surface or a smooth surface.

Typically, the droplet at the first location is disposed on a surface. The surface may be a rough surface or a smooth surface. Whether the surface is a rough surface or a smooth surface typically depends on factors such as whether or not the droplet should be able to move across the surface easily. For instance, in the carrier method, the droplet usually only moves the droplet within a single plane. This will typically mean that the droplet is moved across the bottom surface of the container, in any direction. A smooth surface will facilitate this movement. However, for the levitation method, the step of (i) exposing a droplet to said magnetic field causes the droplet to move away from said first location and towards the magnet. As the droplet is typically not being moved across the surface a smooth surface is not necessarily required. As an alternative to a smooth surface, the inventors have found that a patterned surface may be advantageous.

The use of a patterned surface may, for instance, help to position the droplet at a particular location. The use of a patterned surface may also help to maintain the position of other droplets that are not the droplet originally at the first location. For example, the use of a patterned surface may facilitate the disassembly of a droplet assembly. Such disassembly is discussed below.

Accordingly, the droplet at the first location is disposed on a patterned surface or a smooth surface. A patterned surface is typically a textured surface.

As discussed above, the droplet is usually disposed in a hydrophobic medium, which hydrophobic medium is contained by a container. Therefore, a surface of the container in contact with the droplet is usually a patterned surface or a smooth surface.

The patterned surface may be designed taking into account the dimensions of the droplet and/or other droplets that may be in contact with the surface. For example, the pattern may be designed to allow a droplet or droplets to rest within a dip in the surface.

The difference in height between the highest and lowest points of the patterned surface is typically equal to or greater than 0.05 mm, for instance equal to or greater than 0.1 mm. Usually, the difference in height between the highest and lowest points of the patterned surface is from 0.05 to 0.5 mm, for instance, from 0.1 to 0.4 mm. The difference in height between the highest and lowest points of the patterned surface may, for instance, be about 0.2 mm.

In some embodiments, the droplet is disposed on a surface comprising a pillar or a well. Typically, the droplet is disposed on a surface comprising two or more pillars or two or more wells.

Typically, the height of the pillar or the depth of the well is equal to or greater than 0.05 mm, for instance equal to or greater than 0.1 mm. Usually, the height of the pillar or the depth of the well from 0.05 to 0.5 mm, for instance, from 0.1 to 0.4 mm. The height of the pillar or the depth of the well may, for instance, be about 0.2 mm.

When the surface comprises two or more pillars, the distance between two pillars may, for instance, be from 0.25 mm to 1.25 mm, for instance from 0.5 mm to 1 mm. Typically, the distance between two pillars is about 0.7 mm. The distance between two pillars is measured from the centre of one pillar to the centre of the other.

When the surface comprises two or more wells, the distance between two wells may, for instance, be from 0.25 mm to 1.25 mm, for instance from 0.5 mm to 1 mm. Usually, distance between two wells is about 0.7 mm. The distance between two wells is measured from the centre of one well to the centre of the other.

The surface may be any suitable surface. For instance, the surface may comprise glass or plastic. Typically, the surface comprises a polymer, such as PDMS (poly(dimethylsiloxane)).

When the surface is a patterned surface, the patterning of the surface may be achieved by any suitable method. For instance, the surface may be etched or milled. Alternatively, the surface may be formed using a template, which template is produced using a process comprising techniques such as etching or milling. Molds may, for instance, comprise a polymer such as PMMA (poly(methyl methacrylate)).

In one embodiment, a PMMA chip is patterned with pillars, which pillars are micromachined on a CNC machine. Usually, the mold is used as a template to mold the surface.

In some embodiments, the step of (i) exposing a droplet to said magnetic field causes the droplet to rise to the top of the hydrophobic medium. Typically, the droplet will rise towards the magnet.

When the hydrophobic medium is in a container, this will mean that the droplet rises towards the top of the container. The depth of the hydrophobic medium may be adjusted so that, when the magnet is moved relative to the droplet, the magnetic field of the magnet is sufficient to attract the droplet and move the droplet away from the first location and towards the magnet. Usually, the field strength is insufficient for the droplet to overcome the surface tension of the hydrophobic medium. The droplet therefore usually remains immersed in the hydrophobic medium.

The movement of the magnet relative to the first location may, for instance, comprise moving the magnet using a micromanipulator.

The movement of the magnet relative to the first location may be automated.

Alternatively, the movement of the magnet relative to the first location may comprise moving the droplet using a micromanipulator. When the droplet is disposed in a hydrophobic medium, which is contained in a container, the movement of the magnet relative to the first location may comprise moving the container using a micromanipulator.

In some embodiments, the step of (ii) moving the magnet relative to the first location moves a single droplet. For instance, both the levitation method and the carrier method may be used to move a single droplet. In these embodiments the step of (i) exposing a droplet which is situated at a first location to a magnetic field of a magnet, causes a single droplet to be attracted to said magnet by magnetic attraction.

Typically, in the process of the invention, the step of (iii) disposing the droplet at said second location comprises ceasing to expose the droplet to said magnetic field at or near said second location.

For instance, the step of (iii) disposing the droplet at said second location may comprise ceasing to expose the droplet to said magnetic field near said second location and allowing the droplet to arrive at said second location.

The droplet may, for instance, arrive at said second location by falling through the hydrophobic medium under gravity.

As mentioned above, in some embodiments, in the process of the invention, the step of (i) exposing a droplet to said magnetic field causes the droplet to move away from said first location and towards the magnet. Typically, in these embodiments, the step of (iii) disposing the droplet at said second location comprises ceasing to expose the droplet to said magnetic field at or near said second location. Usually, the step of (iii) disposing the droplet at said second location may comprise ceasing to expose the droplet to said magnetic field near said second location and allowing the droplet to arrive at said second location. For instance, the droplet may arrive at said second location by falling through the hydrophobic medium under gravity.

Usually, the step of ceasing to expose the droplet to said magnetic field comprises moving the magnet away from the droplet. Typically the magnet is a permanent magnet and ceasing to expose the droplet to said magnetic field usually requires the magnet to be moved away from the droplet so that the droplet is no longer attracted to the magnet.

Alternatively, when the magnet is an electromagnet, the step of ceasing to expose the droplet to said magnetic field may comprise switching off the electromagnet. Typically, the electromagnet is switched off by stopping the currently from flowing through the wires of the electromagnet.

The process of the invention may, for instance, be used to bring the droplet into contact with another droplet. Typically, the other droplet comprises (a) an aqueous medium and (b) an outer layer of amphipathic molecules around the surface of the aqueous medium. In some embodiments, the other droplet may further comprise a magnetic material disposed in the aqueous medium. Typically, the magnetic material disposed in the aqueous medium of the droplet(s) comprises a paramagnetic or a superparamagnetic material, or a paramagnetic or a superparamagnetic metal, such as iron. In some embodiments, the magnetic material disposed in the aqueous medium of the droplet(s) comprises a magnetic bead. The magnetic bead may, for instance, comprise magnetic particles. Usually, the magnetic material disposed in the aqueous medium of the droplet(s) comprises a biocompatible magnetic material, such as a biocompatible magnetic bead. Any suitable magnetic bead may be used. For instance, magnetic beads commercially available from, for instance, Clontech, Promega, Invitrogen and NEB, may be used.

In some embodiments, the magnetic bead comprises magnetic particles with an organic group such as a metal-chelating group, such as nitrilotriacetic acid (NTA), attached. The organic component may, for instance, comprise a group selected from —C(═O)O—, —C—O—C—, —C(═O), —NH—, —C(═O)—NH, —C(═O)—$CH_2$—I, —S(═O)$_2$— and —S—. The organic component may comprise a metal chelating group, such as NTA (nitrilotriacetic acid). Usually, a metal such as nickel or cobalt is also attached to the metal-chelating group. Magnetic beads of this sort are commonly used for capturing His-tagged proteins, but are also suitable for use in the process and the produce of the present invention. Typically, the magnetic bead may comprises a Ni-NTA or a Co-NTA magnetic bead, for instance, a Ni-NTA magnetic bead.

Accordingly, in the process of the invention, the step of (iii) disposing the droplet at said second location comprises bringing the droplet into contact with another droplet so that a bilayer of amphipathic molecules is formed at an interface between contacting droplets.

The boundary that is shared between contracting droplets at the point of contact between the objects, is referred to herein as an interface. An interface is formed when part of the outer layer of the droplet contacts part of the outer layer of another droplet. When the droplet is brought into contact with the other droplet, a bilayer of amphipathic molecules will quickly from at the interface between the two objects. The bilayer comprises amphipathic molecules from the outer layer of amphipathic molecules around the surface of the aqueous medium of each droplet at the interface. The bilayer forms as it is an energetically more favourable configuration for the amphipathic molecules to adopt. The shape of the bilayer formed will be the shape with the lowest free surface energy.

The aqueous medium of the other droplet is typically an aqueous medium as defined herein.

The amphipathic molecules of the other droplet are usually amphipathic molecules as defined herein.

Typically, when the droplet is brought into contact with another droplet, a bilayer of amphipathic molecules is formed at an interface between each of the contacting droplets. Once at the second location the droplet may therefore be in contact with another droplet and a droplet assembly comprising two droplets has been formed.

In some embodiments, the other droplet may be in contact with one or more further droplets. There may, for instance, be a bilayer of amphipathic molecules at each interface between each of the contacting droplets.

At least one of said bilayers may further comprise a membrane protein. The membrane protein may be of any type. The use of integral membrane proteins has been demonstrated, but it is equally expected that peripheral membrane proteins could be used. The membrane protein may for instance be a membrane pump, channel and/or pore, to allow for precise control over the exchange of material, and electrical communication, between the droplet in the droplet assembly. When the droplet assembly forms part of a droplet encapsulate, the membrane protein allows for precise control over the exchange of material, and electrical communication, between the droplet assembly and an external solution. The membrane protein could for instance be an αHL pore. However, any suitable membrane protein can be used including the two major classes that is ß-barrels or α-helical bundles. An important application is a membrane protein which is a pore or a channel. Besides a protein pore or channel, further possible membrane proteins include, but not exclusively, a receptor, a transporter or a protein which effects cell recognition or a cell-to-cell interaction. The bilayer at an interface between contacting droplets, may comprise more than one membrane protein. For instance, a particular bilayer may contain multiple copies of the same membrane protein, or two or more different classes of membrane proteins. Where more than one class is present, the bilayer may contain multiple copies of each different class.

Suitable membrane proteins which allow for exchange of materials and electrical communication are known and readily available to the skilled person; many such proteins are either commercially available or can be prepared by known methods. For instance, WT αHL monomers can be prepared by in vitro transcription-translation (IVTT), and heptamerised by incubation with rabbit red blood cell membranes. The heptamers are typically purified by sodium dodecyl sulphate polyacrylamide gel electrophoresis (SDS-PAGE) (Maglia, G. et al. Method. Enzymol. 475, 591-623, 2010). Also, Bayley, H. et al. Droplet interface bilayers. Mol. BioSyst. 4, 1191-1208 (2008) lists several proteins that were tested for insertion into droplet interface bilayers made in bulk oil.

When a bilayer comprises a membrane protein, said bilayer will typically comprise two or more membrane proteins. The membrane proteins may be the same or different. As shown in FIGS. 15A-15D, the number of membrane proteins in a bilayer may be determined by analysing the conductivity within a droplet assembly.

When there are two or more bilayers, each bilayer may further comprise a membrane protein, wherein each of said membrane proteins is as herein defined. For instance, each bilayer may further comprise a membrane protein, wherein each of said membrane proteins is as herein defined.

Droplets can exchange chemical species with each other through membrane proteins incorporated in the bilayer between the droplets. Suitable membrane proteins include, but are not limited to, pumps, channels and/or pores, receptor proteins, transporter proteins, for instance an α-hemolysin (αHL) pore. Thus, a droplet assembly may be capable of trafficking materials such as chemical compounds through the network, from object to object, as well as to and from the external environment. Complex transport systems can be built up in this way. The transport system comprises a droplet assembly.

A droplet assembly may, for instance, act as a sensor module, capable of sensing the presence of a particular chemical in the external environment, for instance, or capable of sensing light. Thus, the droplet may comprise a sensor molecule. The sensor molecule can be present in the aqueous medium of the droplet or in the bilayer. The sensor molecule may be a molecule which is sensitive to the presence of a particular chemical (for instance a target analyte), or it may be a light-sensitive molecule.

Usually, the concentration of membrane proteins is equal to or greater than 10 ng $mL^{-1}$. For instance, the concentration of membrane proteins is equal to or greater than 50 ng $mL^{-1}$. Typically, the concentration of membrane proteins is from 10 ng $mL^{-1}$ to 2000 μg $mL^{-1}$, for instance from 50 ng $mL^{-1}$ to 1000 μg $mL^{-1}$. More typically, the concentration of membrane proteins is from 75 ng $mL^{-1}$ to 900 μg $mL^{-1}$, for instance from 80 ng $mL^{-1}$ to 85 μg $mL^{-1}$. In some embodiments, the concentration of membrane proteins is about 83 μg $mL^{-1}$. In other embodiments, the concentration of membrane proteins is about 830 ng $mL^{-1}$. In a further embodiment, the concentration of membrane proteins is about 83 ng $mL^{-1}$.

Typically, the concentration of membrane proteins is the concentration of membrane proteins in the aqueous medium of the droplet, when the droplet is formed. When a droplet comprising a membrane protein is contacted with another droplet (which may or may not comprise a membrane protein), a bilayer of amphipathic molecules if formed at the interface. That bilayer typically comprises a membrane protein. Therefore a membrane protein initially in the aqueous medium may move to the bilayer.

When the droplet is in contact with another droplet, the concentration of membrane proteins in the droplet and the other droplet may be the same or different. Further, when the droplet is part of a droplet assembly, the concentration of membrane proteins in each droplet of the droplet assembly may be the same or different.

When the membrane protein comprises αHL, at least one of bilayers may comprise a blocker of αHL such as γ-cyclodextrin (γCD).

Typically, the concentration of the blocker of αHL is equal to or greater than 10 μM, for instance equal to or greater than 25 μM. Usually, the concentration of the blocker of αHL is from 10 μM to 50 μM, for instance from 25 μM to 40 μM.

The droplet may, in some embodiments, comprise other materials, compounds or substances. For instance, the droplet may comprise a small molecule, such as a dye, or a magnet. Suitable dyes include, but are not limited to, xylene cyanol FF, orange G, pyranine, fluorescein and 5-cTAMRA (5-carboxytetramethylrhodamine). Alternatively, the droplet may comprise a sensor molecule, for instance a sensor molecule that it sensitive to a particular chemical or is a light-sensitive molecule. As a further alternative, the droplet may comprise a therapeutic agent, such as a prodrug, or a diagnostic agent, such as a contrast agent.

The amphipathic molecules may be any suitable amphipathic molecule. Usually, the amphipathic molecules will be ones which are capable, when present in a high enough concentration, of forming a bilayer at any one of said interfaces. The type of amphipathic molecule that is capable of forming a bilayer may, for instance, depend on additional components of the contacting droplets. For example, if the droplets are disposed in a hydrophobic medium, the amphipathic molecules may be, for instance, any suitable amphipathic molecules capable of forming a bilayer between contacting droplets, within a hydrophobic medium. The type of amphipathic molecules capable of forming a bilayer within the hydrophobic medium would typically depend on the nature of the hydrophobic medium and the aqueous medium of the droplets, but a wide range of amphipathic molecules is possible.

Amphipathic molecules are molecules which have both hydrophobic and hydrophilic groups. The outer layer of amphipathic molecules formed on at least part of the surface of the droplet usually comprises a monolayer of amphipathic molecules on said at least part of the surface of the droplet. The monolayer is typically formed and maintained naturally by the interaction of the hydrophobic and hydrophilic groups with the aqueous medium so that the molecules align on the surface of the droplet with the hydrophilic groups facing inwards towards the aqueous medium and the hydrophobic groups facing outwards, for instance towards a hydrophobic medium.

The amphipathic molecules may, for instance, be non-polymeric amphipathic molecules. Alternatively, the amphipathic molecules may be polymeric amphipathic molecules.

An important class of amphipathic molecules which can be used in the droplet assembly is lipid molecules. The lipid molecules may be any of the major classes of lipid, including phospholipids, fatty acids, fatty acyls, glycerolipids, glycerophospholipids, sphingolipids, sterol lipids, prenol lipids, saccharolipids and polyketides. Some important examples include phospholipids and fatty acids, for instance phospholipids. The lipid molecules may be naturally occurring or synthetic. Whilst the formation of a bilayer from lipid molecules has been demonstrated the method is expected to be appropriate for any amphipathic molecules.

A common class of hydrophobic group that may be present in an amphipathic molecule is a hydrocarbon group, as for instance in most lipids. However, another suitable kind of hydrophobic group that may be employed is a fluorocarbon group. Thus, a further important class of amphipathic molecule is an amphipathic molecule that comprises at least one fluorocarbon group. An example of such a molecule would be a lipid-like molecule which comprises a hydrophobic fluorocarbon tail and a hydrophilic head group.

The amphipathic molecules of the droplet need not be all of the same type. Rather, the amphipathic molecules may in some embodiments be a mixture of two or more different kinds of amphipathic molecule. Another example is that the amphipathic molecules in the respective outer layers of different droplets in a droplet assembly may be of different types so that, if bilayers are formed, the bilayer(s) formed between the different droplets may be asymmetric.

Typically, therefore, the amphipathic comprise lipid molecules. The lipid molecules need not be all of the same type. Thus, the amphipathic molecules may comprise a single type of lipid or a mixture of two or more different lipid molecules. Likewise, when the droplet is in contact with another droplet, the lipid compositions of the outer layers of the individual droplets may be the same as or different from one another. Lipid molecules are particularly advantageous because lipid bilayers, or more generally bilayers of amphipathic molecules, are models of cell membranes and the droplet assembly may therefore serve as an excellent platform for a range of experimental studies, including for instance as novel platforms for the fundamental study of membrane proteins, or as multi-compartment protocellular chassis for "bottom-up" synthetic biology.

Phospholipids are particularly preferred for reasons outlined above and also because they are a major component of all cell membranes, making droplets comprising phospholipids particularly suitable for synthetic biology applications, as well as for drug delivery.

Accordingly, the amphipathic molecules that form an outer layer on at least part of the surface of the aqueous medium typically comprise phospholipid molecules. The phospholipid molecules may be the same or different, i.e. the amphipathic molecules comprise a single kind of phospholipid, or a mixture of two or more different phospholipids. Phospholipids are well known to the skilled person and many are commercially available, from suppliers such as Avanti Polar Lipids. The phospholipid molecules may be glycerophospholipids or phosphosphingolipids or a mixture of the two. The phospholipid molecules may comprise anionic phospholipids, phospholipids comprising primary amines, choline-containing phospholipids and/or glycosphingoplipids. Usually, the amphipathic molecules comprise one or more glycerophospholipids. As the skilled person will appreciate, glycerophospholipids include, but are not limited to glycerophospholipids having a structure as defined in the following formula (I):

(I)

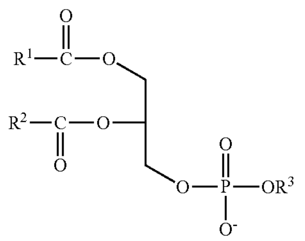

wherein:

- $R^1$ and $R^2$, which are the same or different, are selected from $C_{10}$-$C_{25}$ alkyl groups and $C_{10}$-$C_{25}$ alkylene groups;
- either $R^3$ is absent such that $OR^3$ is $O^-$, or $R^3$ is present and is H, $CH_2CH_2N(R^4)_3^+$, a sugar group, or an amino acid group; and
- each $R^4$, which is the same or different, is independently selected from H and unsubstituted $C_1$-$C_4$ alkyl.

Typically, when $R^3$ is $CH_2CH_2N(R^4)_3^+$, each $R^4$, which is the same or different, is selected from H and methyl. As the skilled person will appreciate, when each and every $R^4$ is methyl, the $R^3$ group is a choline group, and when each and every $R^4$ is H, the $R^3$ group is an ethanolamine group.

When $R^3$ is an amino acid group it may for instance be a serine group, i.e. $-CH_2CH(NH_2)(COOH)$. When $R^3$ is a sugar group, it may for instance be glycerol, i.e. $-CH_2CHOHCH_2OH$, or for instance inositol, i.e. $-CH(CHOH)_5$.

Typical examples of $R^1$ and $R^2$ groups are $C_{10}$-$C_{25}$ alkyl groups, including, but not limited to linear $C_{10}$-$C_{25}$ alkyl groups such as, for instance, $CH_3(CH_2)_{10}-$, $CH_3(CH_2)_{12}-$, $CH_3(CH_2)_{14}-$, $CH_3(CH_2)_{16}-$, $CH_3(CH_2)_{18}-$, $CH_3(CH_2)_{22}-$ and branched $C_{10}$-$C_{25}$ alkyl groups such as for instance $-CH_2-CH(CH_3)-(CH_2)_3-CH(CH_3)-(CH_2)_3-CH(CH_3)-(CH_2)_3-CH(CH_3)_2$.

Further typical examples of $R^1$ and $R^2$ groups are unsubstituted $C_{10}$-$C_{25}$ alkylene groups, including, but not limited to, $CH_3(CH_2)_5CH{=}CH(CH_2)_7-$, $CH_3(CH_2)-CH{=}CH(CH_2)_7-$, $CH_3(CH_2)+CH{=}CHCH_2CH-CH(CH_2)_7-$, $CH_3(CH_2)+(CH{=}CHCH_2)_3CH{=}CH(CH_2)_3-$, and $CH_3CH_2CH{=}CHCH_2CH{=}CHCH_2CH-CH(CH_2)_7-$.

As the skilled person will appreciate, the $O^-$ group in the phosphate group adjacent the $OR^3$ group may in some embodiments be protonated, or associated with a suitable cation, for instance a metal cation such as $Na^+$.

Thus, the amphipathic molecules may comprise one or more glycerophospholipids having the structure of formula (I) as defined above.

For instance, the amphipathic molecules may comprise any one or more of the following glycerophospholipids: 1,2-diphytanoyl-sn-glycero-3-phosphocholine (DPhPC), 1,2-distearoyl-sn-glycero-3-phosphocholine (DSPC), 1,2-dipalmitoyl-sn-glycero-3-phosphocholine (DPPC), or 1,2-dipalmitoyl-sn-glycero-3-[phospho-rac-(1-glycerol)] (DPPG), can be employed as the amphiphilic molecules in the droplet, or a mixture of one or more thereof. The glycerophospholipid 1,2-dioleoyl-sn-glycero-3-phosphoethanolamine (DOPE) may also be used, and may be used in combination with a pH-sensitive lipid, for instance a fatty acid.

Additionally or alternatively, the amphipathic molecules may comprise a steroid, which steroid comprises an alkyl side-chain. The amphipathic molecules may, for instance, comprise cholesterol, β-sitosterol and lanosterol.

In some embodiments, the amphipathic molecules comprise derivatives of phospholipids. For instance, the amphipathic molecules may comprise a phosphatidylcholine, such as POPC (1-Palmitoyl-2-oleoyl-sn-glycero-3-phosphocholine) or DPPC (1,2-Dipalmitoyl-sn-glycero-3-phosphocholine), or a phosphatidylglycerol, such as POPG (1-palmitoyl-2-oleoyl-sn-glycero-3-phosphoglycerol).

Preferably, the amphipathic molecules comprise DPhPC.

The amphipathic molecules may, for instance, comprise one or more fatty acids, e.g. oleic acid. Fatty acids are of course well known to the skilled person and a wide range of these are commercially available.

The amphipathic molecules may for instance comprise a mixture comprising: (a) one or more phospholipids, and (b) one or more fatty acids.

The droplet or droplet assemblies described herein may form part of an encapsulate, for instance a droplet encapsulate. Such a droplet encapsulate may be referred to as a "multisome". The encapsulate generally comprises: a volume (such as a drop) of a hydrophobic medium; a peripheral layer of amphipathic molecules around the surface of the volume of hydrophobic medium; and a droplet or droplet assembly within the peripheral layer, wherein the droplet or droplet assembly is as defined herein. Typically, the encapsulate is disposed in a bulk hydrophilic medium, and the peripheral layer of amphipathic molecules is at the interface between the bulk hydrophilic medium the hydrophilic medium. In some embodiments the droplet, or at least one of the droplets in the droplet assembly, comprises a magnetic material. The amphipathic molecules which form the peripheral layer of the encapsulate may, for instance, be provided in the hydrophobic medium or in the bulk hydrophile medium.

The droplet encapsulate, or "multisome", may, for example, communicate with the external environment through membrane proteins in the peripheral layer. In addition, membrane proteins may allow droplets within the same multisome to communicate with each other. This in principle allows multisomes to sense their environment, process information, and contingently deliver materials to the surroundings. The encapsulates may be produced by the methods described in GB patent application number 1119032.9 and U.S. patent application No. 61/592,062. The disclosures in GB 1119032.9 and U.S. 61/592,062 are incorporated herein by reference.

In addition to the amphipathic molecules, the droplet may further comprise a PEGylated lipid. PEGylated lipid may be particularly useful when the droplet forms part of a droplet encapsulate. The term "PEGylated lipid", as used herein, refers to a lipid which has been derivatised with poly (ethylene glycol). For instance, when the plurality of hydrogel objects is surrounded by a layer of amphipathic molecules, the layer surrounding the plurality of hydrogel objects may further comprise a PEGylated lipid.

The inclusion of one or more PEGylated lipids in the droplet assembly typically stabilises the droplet assembly in vivo, and in particular prolongs the plasma half-life of the droplet assembly. This means that, when the droplet assembly contains one or more therapeutic or diagnostic agents, for instance if it is being used as a drug-delivery vehicle, the inclusion of one or more PEGylated lipids may also have the useful effect of prolonging the plasma half-life of the agent within a droplet assembly. Such effects have been observed previously when PEGylated lipids are used in liposomal drug formulations. PEGylated lipids are known in the art and are commercially available from suppliers such as NOF Corporation, Japan (see http://www.phospholipid.jp/phospholipid_2-3.html). Any suitable PEGylated lipid may be employed, including, but not limited to, PEG-phospholipids, diacylglycerol-PEG, cholesterol-PEG derivatives, and mixtures thereof.

The poly(ethylene glycol) (PEG) component of the PEGylated lipid may have any one of several different geometries. Thus, it could be substantially linear PEG or branched PEG. The branched PEG may for instance have from three to ten PEG chains emanating from a central core group. Alternatively, the branched PEG could be a star PEG, having from 10 to 100 PEG chains emanating from a central core group. Alternatively, the PEG may be a comb PEG, having multiple PEG chains grafted to a polymer backbone.

The one or more PEGylated lipids employed may for instance comprise a PEG-phospholipid of the following formula (II)

(II)

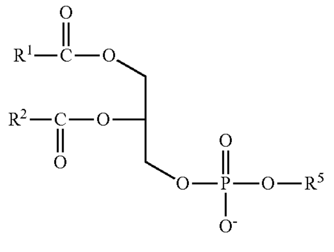

wherein $R^1$ and $R^2$ are as defined above for the glycerophospholipids of formula (I), and $R^5$ is a group which comprises poly(ethylene glycol).

The group which comprises poly(ethylene glycol) may for instance have the formula $-CH_2CH_2NHC(O)-X$, or for instance $-CH_2CH_2NHC(O)(CH_2)_3C(O)-X$ wherein X comprises said poly(ethylene glycol). The group X may for instance comprise substantially linear PEG, or for instance a branched PEG, having, for instance, from three to ten PEG chains emanating from a central core group. Alternatively, it can be a star PEG, having, for instance, from 10 to 100 PEG chains emanating from a central core group. Or for instance it may be a comb PEG, having multiple PEG chains grafted to a polymer backbone. Thus, $R^5$ may for instance be $-CH_2CH_2NHC(O)-(OCH_2CH_2)_qOCH_3$, $-CH_2CH_2NHC(O)(CH_2)_3C(O)-(OCH_2CH_2)_qOCH_3$, $-CH_2CH_2NHC(O)-(OCH_2CH_2)_qOH$, or $-CH_2CH_2NHC(O)(CH_2)_3C(O)-(OCH_2CH_2)_qOH$, wherein q is a positive integer. The integer q may for instance be from 5 to 10,000, or for instance from 10 to 1,000.

Alternatively, $R^5$ may be $-(CH_2CH_2O)_qCH_3$ or $-(CH_2CH_2O)_qH$, wherein q is a positive integer. The integer q may for instance be from 5 to 10,000, or for instance from 10 to 1,000.

Additionally or alternatively, the one or more PEGylated lipids may comprise a diacylglycerol-PEG of formula (III)

(III)

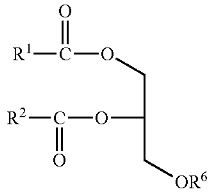

wherein $R^1$ and $R^2$ are as defined above for the glycerophospholipids of formula (I), and $R^6$ is a group which comprises poly(ethylene glycol).

The poly(ethylene glycol) may for instance comprise substantially linear PEG, or for instance a branched PEG, having, for instance, from three to ten PEG chains emanating from a central core group. Alternatively, it can be a star PEG, having, for instance, from 10 to 100 PEG chains emanating from a central core group. Or for instance it may be a comb PEG, having multiple PEG chains grafted to a polymer backbone.

$R^6$ may for instance be $-(CH_2CH_2O)_qCH_3$, $-(CH_2CH_2O)_qH$, $-CH_2CH_2NHC(O)-(OCH_2CH_2)_qOCH_3$, $-CH_2CH_2NHC(O)-(OCH_2CH_2)_qOH$, $-CH_2CH_2NHC(O)(CH_2)_3C(O)-(OCH_2CH_2)OCH_3$ or $-CH_2CH_2NHC(O)(CH_2)_3C(O)-(OCH_2CH_2)_qOH$ wherein q is a positive integer. The integer q may for instance be from 5 to 10,000, or for instance from 10 to 1,000.

Additionally or alternatively, the one or more PEGylated lipids may comprise a cholesterol-PEG derivative of formula (IV)

(IV)

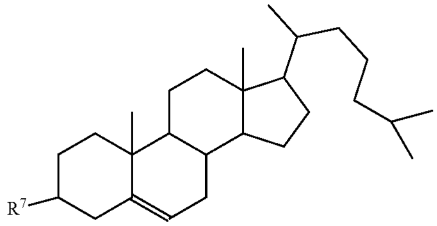

wherein $R^7$ is a group which comprises poly(ethylene glycol).

Again, the poly(ethylene glycol) may comprise substantially linear PEG, or for instance a branched PEG, having, for instance, from three to ten PEG chains emanating from a central core group. Alternatively, it can be a star PEG, having, for instance, from 10 to 100 PEG chains emanating from a central core group. Or for instance it may be a comb PEG, having multiple PEG chains grafted to a polymer backbone.

$R^7$ may for instance be —$(OCH_2CH_2)_qOH$ or —$(OCH_2CH_2)_qOCH_3$ wherein q is a positive integer. The integer q may for instance be from 5 to 10,000, or for instance from 10 to 1,000.

Polyglycerine may be used instead of poly(ethylene glycol).

The concentration of amphipathic molecules may be any suitable concentration.

Typically, the concentration of amphipathic molecules is less than or equal to 15 mg $mL^{-1}$. For instance, the concentration of amphipathic molecules may be from greater than 0 to 10 mg $mL^{-1}$. Usually, the concentration of amphipathic molecules is from 0.25 mg $mL^{-1}$ to 10 mg $mL^{-1}$, for instance, from 0.25 mg $mL^{-1}$ to 5 mg $mL^{-1}$. More typically, the concentration of amphipathic molecules is from 0.25 mg $mL^{-1}$ to 2.5 mg $mL^{-1}$, for instance, from 0.25 mg $mL^{-1}$ to 1.5 mg $mL^{-1}$.

In some embodiments, the concentration of amphipathic molecules is about 1 mg $mL^{-1}$.

Typically, the droplet is disposed in a hydrophobic medium and the concentration of amphipathic molecules is the concentration of amphipathic molecules in the hydrophobic medium.

Additionally or alternatively, when the droplets are formed, the aqueous medium of the droplets may comprise amphipathic molecules. The concentration of amphipathic molecules may therefore be the concentration of amphipathic molecules in the aqueous medium.

The hydrophobic medium may be selected from a wide range of materials. The hydrophobic medium may comprise a single hydrophobic compound. Alternatively, it may comprise a mixture of two or more different hydrophobic compounds. The hydrophobic medium may, for instance, be selected to affect the buoyancy of the droplet and the speed of formation of the layer of amphipathic molecules around at least part of the droplet after the droplet is first introduced into the hydrophobic medium.

The hydrophobic medium is typically an oil. The oil may be a single, pure, compound, or the oil may comprise a mixture of two or more compounds. It is usually desirable that the oil does not significantly destabilize any bilayers formed.

The oil may for instance comprise silicone oil (for instance poly phenyl methyl siloxane). The oil may consist of a single silicone oil, for instance poly phenyl methyl siloxane. Alternatively, the oil may comprise a mixture of two or more different silicone oils.

Any suitable silicone oil may be used. For instance, the oil may comprise silicon oil DC200 (a polymer comprising monomer units of —O—$Si(CH_3)_2$—), poly(dimethylsiloxane) (PDMS), hydroxy terminated, or PDMS 200.

Additionally or alternatively, the oil may comprise a hydrocarbon. When the oil comprises a hydrocarbon it may comprise a single hydrocarbon compound, or a mixture of two or more hydrocarbons.

In some embodiments, the oil is a mixture comprising: (a) one or more hydrocarbons, and (b) one or more silicone oils. The hydrocarbon may, for instance, be any suitable liquid hydrocarbon. Whether a particular hydrocarbon is liquid will depend upon the temperature of the hydrophobic medium. Thus the term liquid hydrocarbon refers to a hydrocarbon that is a liquid at the temperature that the hydrophobic medium is at. Typically, the hydrophobic medium will be at room temperature. However, in some embodiments, the hydrophobic medium may be above or below room temperature.

In some embodiments, the oil may comprise a solid. A solid hydrocarbon may, for instance, be used in combination with a silicone oil. The oil may, for instance, be a mixture of solids that dissolve to form a liquid.

When the oil comprises a hydrocarbon, the hydrocarbon may be branched or unbranched, for example a hydrocarbon having from 5 to 40 carbon atoms, or from 5 to 30 carbon atoms (although hydrocarbons of lower molecular weight would require control of evaporation). Preferably, the hydrocarbon is a liquid at the operating temperature of the droplet used in the invention. Suitable examples include alkanes or alkenes, such as hexadecane, decane, pentane or squalene. Usually, the oil comprises a hydrocarbon.

Typically the hydrocarbon is an unsubstituted $C_{10}$-$C_{20}$ alkane, for instance hexadecane.

Shorter alkanes may be suitable, for instance, in assemblies for which buoyancy effects are less important and whose outer layer of amphipathic molecules, on at least part of the surface of the droplet, may form more quickly.

In some embodiments the hydrocarbon is a longer-chain hydrocarbon, such as an unsubstituted $C_{15}$-$C_{40}$ alkane. For instance, an unsubstituted $C_{16}$-$C_{30}$ alkane chain, such as squalene.

In one embodiment, the hydrophobic medium comprises an unsubstituted $C_{10}$-$C_{20}$ alkane and the amphipathic molecules comprise one or more glycerophospholipids. For instance, the hydrophobic medium may comprise hexadecane and the outer layer of amphipathic molecules may comprise DPhPC.

Other types of oil are possible. For example the oil may be a fluorocarbon. This might be useful for the study of some systems, for example to minimise loss of a particular membrane protein or analyte from the droplet assembly or to control gas content such as oxygen. Because fluorocarbons can be both hydrophobic and lipophobic, an oil phase that comprises fluorocarbons can usefully prevent the adhesion of droplet assembly to surfaces.

In another embodiment, the hydrocarbon is a bromo-substituted $C_{10}$-$C_{30}$ alkane, or for instance a bromo-substituted $C_{10}$-$C_{20}$ alkane, e.g. bromododecane. Although bromododecane was found to require long incubation times for the formation of an outer layer of amphipathic molecules, on at least part of the surface of the droplet, this oil should be more suitable for other droplets whose outer layer of amphipathic molecules, on at least part of the surface of the droplet, may incubate more quickly.

Typically, the oil comprises silicone oil or a hydrocarbon. Any suitable silicone oil may be employed. Usually, the silicone oil is as herein defined.

Silicone oil is advantageous on account of its density being close to that of water, which ensures that the droplet is approximately neutrally buoyant in water. The silicone oil may for instance be poly phenyl methyl siloxane, which has a density of about 1 $g \cdot cm^{-3}$.

The hydrocarbon typically has from 5 to 30 carbon atoms (a $C_5$-$C_{30}$ hydrocarbon), more typically from 10 to 30 carbon atoms (a $C_{10}$-$C_{30}$ hydrocarbon). Typically, it is an alkane or an alkene. Thus, the hydrocarbon may be a $C_5$-$C_{30}$ alkane, or a $C_{10}$-$C_{20}$ alkane. In another embodiment, the hydrocarbon may be a $C_5$-$C_{20}$ alkene, or a $C_{10}$-$C_{20}$ alkene. The hydrocarbon is typically unsubstituted. In one embodiment it is squalene. In a preferred embodiment, the hydrocarbon is an unsubstituted $C_5$-$C_{20}$ alkane, preferably an unsubstituted $C_{10}$-$C_{20}$ alkane. The hydrocarbon may for instance be squalene, hexadecane or decane. However, in some embodiments the hydrocarbon may be substituted with a halogen atom, for instance bromine.

In some embodiments, the hydrophobic medium comprises a mixture of silicone oil and a hydrocarbon. Such mixtures have been found to provide advantageously low incubation times for stable droplets to be formed. The silicone oil and hydrocarbon in the mixture may be as further defined above. Typically, the hydrocarbon is an unsubstituted $C_{10}$-$C_{20}$ alkane, preferably hexadecane. The silicone oil and hydrocarbon mixture typically has a density close to that of water, to ensure the droplet has approximately neutral buoyancy in aqueous media; it may for instance be poly phenyl methyl siloxane. Usually, the volume ratio of the silicone oil to the hydrocarbon is equal or greater than 0.5:1. The volume ratio of the silicone oil to the hydrocarbon may for instance be from 0.5:1 to 5:1, for instance about 1:1. In some embodiments, the volume ratio of the silicone oil to the hydrocarbon is equal or greater than 5:1.

The hydrophobic medium employed may, for instance, have a density close to that of water, for instance a density of about 1 $g \cdot cm^{-3}$, such that the droplet is approximately neutrally buoyant in water.

In one embodiment, the hydrophobic medium comprises both silicone oil and hexadecane. Typically the silicone oil is poly phenyl methyl siloxane. The volume ratio of the silicone oil to the hexadecane is typically equal or greater than 0.5:1, for instance from 0.5:1 to 5:1. It may for instance be about 1:1. In some embodiments, the volume ratio of the silicone oil to the hydrocarbon is equal or greater than 5:1.

Preferably, the hydrophobic medium comprises hexadecane. In some embodiments, the hydrophobic medium further comprise silicone oil.

Typically, the hydrophobic medium comprises hexadecane and the amphipathic molecules comprise DPhPC. More typically, the hydrophobic medium comprises hexadecane, the amphipathic molecules comprise DPhPC and the aqueous medium comprises an aqueous buffer solution.

Usually, the hydrophobic medium comprises hexadecane, the amphipathic molecules comprise DPhPC, the aqueous medium comprises an aqueous buffer solution and the magnetic material comprises nickel.

Typically, the droplet has a volume of less than or equal to 1500 nL. More typically, the droplet has a volume of from 100 nL to 1500 nL. For instance, the droplet may have a volume of from 300 nL to 900 nL. Usually, the droplet has a volume of from 300 nL to 900 nL for instance, from 400 nL to 800 nL. For instance, the droplet may have a volume of about 400 nL or about 800 nL.

When the droplet is in contact with another droplet, the volume of the droplet and the other droplet may be the same or different. For instance, each droplet may have a volume of less than or equal to 1500 nL. Typically, each droplet has a volume of from 100 nL to 1500 nL. For instance, each droplet may have a volume of from 300 nL to 900 nL. Usually, each droplet has a volume of from 300 nL to 900 nL for instance, from 400 nL to 800 nL. For instance, each droplet may have a volume of about 400 nL or about 800 nL.

If the droplet forms part of a droplet assembly, the droplets in the droplet assembly may be of the same volume or may be of different volumes. Typically, each droplet has a volume of less than or equal to 1500 nL. More typically, each droplet has a volume of from 100 nL to 1500 nL. For instance, each droplet may have a volume of from 300 nL to 900 nL. Usually, each droplet has a volume of from 300 nL to 900 nL for instance, from 400 nL to 800 nL. For instance, each droplet may have a volume of about 400 nL or about 800 nL.

The inventors have found that the process of the invention may be used to assemble a droplet assembly. The droplet assembly may be a 2D or 3D assembly of droplets. The droplet assembly may, for instance, be a droplet assembly as defined herein for the droplet assembly of the invention.

An advantage of the present invention is that it allows complex 3D structures to be created in a controlled manner. Information may, for example, be passed from one droplet to another within the droplet assembly, for instance, via membrane proteins. By moving from a 2D assembly to a 3D assembly, the number of intercommunicating droplets can be increased. As discussed in Example 5, the Manhattan distance between the furthest spaced droplets in an N droplet 2D network can be increased from $\sqrt{N}$ in a 2D assembly to $\sqrt[3]{N}$ in a 3D assembly.

The process of the invention may be used to build up an assembly of droplets.

There are number of different ways in which the process of the invention may be used to assemble a droplet assembly. The Examples section demonstrates some of the ways in which the process of the invention may be used to assemble a droplet assembly.

Example 1, for instance, demonstrates the use of the levitation method to form a droplet assembly. By repeating the process of the invention, each repetition moving at least one droplet comprising a magnetic material, a droplet assembly may be assembled. For example, each repetition of the process may move a single droplet. Alternatively, at least one of the repetitions of process may move two or more droplets.

Further, Example 3 shows how the carrier method may be used to form a droplet assembly. For instance, the step (iii) disposing the droplet at said second location may bring the droplet into contact with another droplet. The other droplet may or may not comprise a magnetic material. Typically a bilayer forms at the interface between the droplet and the other droplet. The process of the invention may be repeated. The first repetition may, for example, bring the two droplets connected by a bilayer into contact with a third droplet. Thus the repetition of the process moves more than one droplet.

An assembly may be assembled using a combination of the levitation method and the carrier method.

The inventors have also found that the process of the invention may be used to disassemble a droplet assembly. Both the levitation method and the carrier method may be used to disassemble a droplet assembly. When the process is used to disassemble a 2D or 3D structure comprising droplets, the droplet at the first location is initially in contact with another droplet. The droplet may, for instance, form a bilayer with the other droplet.

The use of the process of the invention to disassemble a droplet assembly is illustrated in Examples 2 and 4.

Example 2 illustrates the use of the levitation method to disassemble a droplet assembly. The droplet at the first location is a droplet in the droplet assembly. As mentioned above, typically when the levitation method is used the droplet, when at the first location, will be disposed on a patterned surface. At least one of the other droplets in the droplet assembly will also be disposed on a patterned surface. As discussed in Example 2, the patterned surface helps to hold the other droplets in place so that only the droplet is moved in the process. As the skilled person will appreciate, as the number of droplets in the droplet assembly decreases, it typically becomes more difficult to remove further droplets.

Disassembly is illustrated in Example 4. In this method the droplet is fused to a droplet in the droplet assembly, thus the droplet at the first location is not a droplet in the droplet assembly. The inventors have found that fusion of the droplet with another droplet typically becomes easier when the concentration of amphipathic molecules is reduced. Fusion may, for instance, take less than or equal to 120 seconds, for instance from 3 to 29 seconds.

The droplet assembly may form part of an encapsulate, for instance a droplet encapsulate. The droplet encapsulate generally comprises: a volume (such as a drop) of a hydrophobic medium; a peripheral layer of amphipathic molecules around the surface of the volume; and a droplet assembly within the peripheral layer, wherein the droplet assembly is as defined herein. The amphipathic molecules which form the peripheral layer of the encapsulate may, in the process of the invention, be provided in the hydrophobic medium or in the bulk hydrophilic medium.

In some embodiments, the droplet at the first location forms a bilayer with another droplet and the step of (i) exposing a droplet to said magnetic field causes the droplet to move away from the other droplet.

As mentioned above, when two droplets are brought together, a bilayer of amphipathic molecules will spontaneously from at the interface between the two objects. When the droplet moves away from the other droplet, both droplets retain their outer layer of amphipathic molecules on at least part of the surface of the aqueous medium but the bilayer that was present at the interface is not maintained.

Typically, therefore, when the droplet moves away from the second droplet, the bilayer between the droplet and the other droplet separates.

The other droplet may comprise a magnetic material. Typically, the magnetic material disposed in the aqueous medium of the droplet(s) comprises a paramagnetic or a superparamagnetic material, or a paramagnetic or a superparamagnetic metal, such as iron. In some embodiments, the magnetic material disposed in the aqueous medium of the droplet(s) comprises a magnetic bead. The magnetic bead may, for instance, comprise magnetic particles. Usually, the magnetic material disposed in the aqueous medium of the droplet(s) comprises a biocompatible magnetic material, such as a biocompatible magnetic bead. Any suitable magnetic bead may be used. For instance, magnetic beads commercially available from, for instance, Clontech, Promega, Invitrogen and NEB, may be used.

In some embodiments, the magnetic bead comprises magnetic particles with an organic group such as a metal-chelating group, such as nitrilotriacetic acid (NTA), attached. The organic component may, for instance, comprise a group selected from —C(═O)O—, —C—O—C—, —C(═O), —NH—, —C(═O)—NH, —C(═O)—$CH_2$—I, —S(═O)$_2$— and —S—. The organic component may comprise a metal chelating group, such as NTA (nitrilotriacetic acid). Usually, a metal such as nickel or cobalt is also attached to the metal-chelating group. Magnetic beads of this sort are commonly used for capturing His-tagged proteins, but are also suitable for use in the process and the produce of the present invention. Typically, the magnetic bead may comprise a Ni-NTA or a Co-NTA magnetic bead, for instance, a Ni-NTA magnetic bead.

In some embodiments, the droplet at the first location forms a bilayer with each of two or more other droplets and the step of (i) exposing a droplet to said magnetic field causes the droplet to move away from the other droplets. For instance, the droplet at the first location may form a bilayer with each of two, three or four other droplets and the step of (i) exposing a droplet to said magnetic field causes the droplet to move away from the other droplets.

Usually, when the droplet moves away from the other droplets, each bilayer between the droplet and the other droplets separates.

The other droplets may each independently comprise a magnetic material. The magnetic material may, for instance, be as defined herein.

Typically, the step of (ii) moving the magnet relative to the first location comprises moving the magnet using a micromanipulator.

The movement of the magnet relative to the first location may be automated.

Alternatively, the movement of the magnet relative to the first location may comprise moving the droplet using a micromanipulator. When the droplet is disposed in a hydrophobic medium, which is contained in a container, the movement of the magnet relative to the first location may comprise moving the container using a micromanipulator.

In some embodiments, the step of (ii) moving the magnet relative to the first location moves a single droplet. In these embodiments the step of (i) exposing a droplet which is situated at a first location to a magnetic field of a magnet, causes a single droplet to be attracted to said magnet by magnetic attraction.

Usually, in the process of the invention, the step of (iii) disposing the droplet at said second location comprises ceasing to expose the droplet to said magnetic field at or near said second location.

For instance, the step of (iii) disposing the droplet at said second location may comprise ceasing to expose the droplet to said magnetic field near said second location and allowing the droplet to arrive at said second location. The droplet may, for instance, arrive at said second location by falling through the hydrophobic medium under gravity.

As mentioned above, in some embodiments, in the process of the invention, the step of (i) exposing a droplet to said magnetic field causes the droplet to move away from said first location and towards the magnet. Typically, in these embodiments, the step of (iii) disposing the droplet at said second location comprises ceasing to expose the droplet to said magnetic field at or near said second location. Usually, the step of (iii) disposing the droplet at said second location may comprise ceasing to expose the droplet to said magnetic field near said second location and allowing the droplet to arrive at said second location. For instance, the droplet may arrive at said second location by falling through the hydrophobic medium under gravity.

Usually, the step of ceasing to expose the droplet to said magnetic field comprises moving the magnet away from the droplet. Typically the magnet is a permanent magnet and ceasing to expose the droplet to said magnetic field usually requires the magnet to be moved away from the droplet so that the droplet is no longer attracted to the magnet.

Alternatively, when the magnet is an electromagnet, the step of ceasing to expose the droplet to said magnetic field may comprise switching off the electromagnet. Typically, the electromagnet is switched off by stopping the current from flowing through the wires of the electromagnet.

The aqueous medium may be any suitable aqueous medium. For instance, the aqueous medium may be as defined herein.

As mentioned above, when two droplets are in contact with each other, a bilayer forms at the interface between the contacting droplets. By controlling the aqueous medium of the droplets and the concentration of amphipathic molecules on the surface of the droplet it is possible to fuse together two contacting droplets. The inventors have found that droplets may be fused together when the concentration of amphipathic molecules is relatively low. Typically, the droplets can be fused together when the concentration of amphipathic molecules is from 0.1 mg $mL^{-1}$ to 1 mg $mL^{-1}$, for instance 0.1 mg $mL^{-1}$ to 0.75 mg $mL^{-1}$. Usually, the droplets can be fused together when the concentration of amphipathic molecules is about 0.5 mg $mL^{-1}$.

Accordingly, in some embodiments, the step of (iii) disposing the droplet at said second location comprises contacting the droplet with a second droplet and fusing the droplet with the second droplet to form a new droplet from the first and second droplets.

The second droplet may or may not comprise a magnetic material. Typically, when the step of (iii) disposing the droplet at said second location comprises contacting the droplet with a second droplet and fusing the droplet with the second droplet to form a new droplet from the first and second droplets, the second does not comprise a magnetic material.

Usually, when the new droplet is formed, the process of the invention further comprises a step of moving the magnet relative to the second location in a direction away from the second location whilst maintaining said magnetic attraction, and thereby causing the droplet to move away from said second location and towards a third location.

The third location may be the same location as the first location, or it may be a different location.

Typically, the step of moving the magnet relative to the second location, causing the droplet to move away from said second location and towards a third location, comprises moving the magnet using a micromanipulator.

The movement of the magnet relative to the second location may be automated.

Alternatively, the movement of the magnet relative to the first location may comprise moving the droplet using a micromanipulator. When the droplet is disposed in a hydrophobic medium, which is contained in a container, the movement of the magnet relative to the first location may comprise moving the container using a micromanipulator.

Usually, the step of moving the magnet relative to the second location moves the new droplet formed from the first and second droplets.

The step of fusing the droplet with the second droplet to form a new droplet is typically used in the carrier method but may also be used in the levitation method. The second droplet may, for instance, be in contact with one or more other droplets. The process may, for instance, be used to separate the second droplet from the other droplet(s).

Accordingly, typically, the new droplet formed from the first and second droplets contacts a third droplet through a bilayer (i.e. the new droplet formed from the first and second droplets forms a bilayer with a third droplet) and the step of moving the magnet relative to the second location causes the new droplet to move away from the third droplet. As the new droplets moves away from the third droplet the bilayer breaks.

When the process of the invention further comprises a step of moving the magnet relative to the second location, the process usually also further comprises disposing the droplet at said third location.

Typically, the step of disposing the droplet at said third location comprises ceasing to expose the droplet to said magnetic field at or near said third location.

Usually, the step of ceasing to expose the droplet to said magnetic field comprises moving the magnet away from the droplet. Typically the magnet is a permanent magnet and ceasing to expose the droplet to said magnetic field usually requires the magnet to be moved away from the droplet so that the droplet is no longer attracted to the magnet.

Alternatively, when the magnet is an electromagnet, the step of ceasing to expose the droplet to said magnetic field may comprise switching off the electromagnet. Typically, the electromagnet is switched off by stopping the current from flowing through the wires of the electromagnet.

The use of the process of the invention to assemble and disassemble a droplet assembly has been discussed above. As the skilled person will appreciate, the process of the invention may also be used to rearrange a droplet assembly. This may, for example, comprise removal of a droplet or droplets from the assembly, moving the droplet or droplets and disposing the droplet or droplets so that the droplet or droplets make contact with a different droplet within the assembly. This is illustrated in FIGS. 9A-9H.

Alternatively, the process of the invention may be used to move a plurality of droplets from a first location to a second location simultaneously. The movement of a plurality of droplets (without levitation) is illustrated in FIGS. 11A-11G. The inventors have found, during transport of an entire assembly, the shape of the assembly and any bilayer connections can be retained.

The process of the invention may be used to move a single droplet from the first location to the second location. The process of the invention may also be used to move the droplet and one or more other droplets from the first location to the second location. Typically, each interface between the contacting droplets being moved comprises a bilayer of amphipathic molecules. As the skilled person will appreciate, when moving more than one droplet, the forces holding the droplets together (e.g. the interaction strength between the two monolayers forming the bilayer at an interface) must be stronger than those forces pulling the droplets apart. This typically means that the bilayer strength must be greater than the drag force. FIGS. 21A-21C outline the forces acting on the droplet and the other droplet it is in contact with, using the carrier method.

In some embodiments, the droplet at the first location forms a bilayer with a second droplet and the step of (i) exposing a droplet to said magnetic field causes the droplet and the second droplet to rise to the top of the hydrophobic medium and move towards the magnet.

Typically, the second droplet comprises a magnetic material. Usually, the magnetic material is as defined herein.

Usually, when the step of (i) exposing a droplet to said magnetic field causes the droplet and the second droplet to rise to the top of the hydrophobic medium and move towards the magnet, the step of (ii) moving the magnet relative to the first location moves the first droplet and the second droplet.

Typically, the step of (iii) disposing the droplet at said second location comprises ceasing to expose the droplet to said magnetic field at or near said second location.

When the step of (i) exposing a droplet to said magnetic field causes the droplet and the second droplet to rise to the top of the hydrophobic medium and move towards the magnet, usually, the step of (iii) disposing the droplet at said second location comprises ceasing to expose the droplet to said magnetic field near said second location and allowing the droplet to arrive at said second location.

For instance, the droplet may arrive at said second location by falling through the hydrophobic medium under gravity.

Usually, the step of ceasing to expose the droplet to said magnetic field comprises moving the magnet away from the droplet. Typically the magnet is a permanent magnet and ceasing to expose the droplet to said magnetic field usually requires the magnet to be moved away from the droplet so that the droplet is no longer attracted to the magnet.

Alternatively, when the magnet is an electromagnet, the step of ceasing to expose the droplet to said magnetic field may comprise switching off the electromagnet. Typically, the electromagnet is switched off by stopping the current from flowing through the wires of the electromagnet.

The process of the invention may further comprise recovering said droplet.

Also provided by the invention is a droplet assembly which is obtainable by a process as defined herein.

As mentioned above, the process of the invention may be used in the production of a droplet assembly. The droplet assembly is typically in a hydrophobic medium. The hydrophobic medium may, for instance, be a hydrophobic medium as defined herein.

The droplet assembly may form part of an encapsulate, for instance a droplet encapsulate. The process of the invention may be used in a process to form an encapsulate comprising a droplet assembly. The encapsulate may, for instance, comprise: a volume (such as a drop) of a hydrophobic medium; a peripheral layer of amphipathic molecules around the surface of the volume; and a droplet assembly within the peripheral layer, wherein the droplet assembly is as defined herein.

A volume of said hydrophobic medium, with the droplet assembly disposed therein, may, for instance, be introduced into a bulk hydrophilic medium, such as an aqueous medium. The volume of said hydrophobic medium may be a drop of said hydrophobic medium.

The amphipathic molecules which form the peripheral layer of the encapsulate may, for instance, be provided in the hydrophobic medium or in the bulk hydrophilic medium. The encapsulate may, for example, be used when the hydrogel network is for use in a biological system.

The invention further provides a droplet assembly comprising a plurality of droplets wherein each droplet comprises an aqueous medium and an outer layer of amphipathic molecules around the surface of the aqueous medium, and wherein at least one of the plurality of droplets comprises a magnetic material disposed in the aqueous medium.

The magnetic material may be as further defined hereinabove for the process of the invention. Thus, typically, the magnetic material disposed in the aqueous medium of the droplet(s) comprises a paramagnetic or a superparamagnetic material, or a paramagnetic or a superparamagnetic metal, such as iron.

In some embodiments, the magnetic material disposed in the aqueous medium of the droplet(s) comprises a magnetic bead. The magnetic bead may, for instance, comprise magnetic particles.

Usually, the magnetic material disposed in the aqueous medium of the droplet(s) comprises a biocompatible magnetic material, such as a biocompatible magnetic bead.

Any suitable magnetic bead may be used. For instance, magnetic beads commercially available from, for instance, Clontech, Promega, Invitrogen and NEB, may be used.

In some embodiments, the magnetic bead comprises magnetic particles with an organic group such as a metal-chelating group, such as nitrilotriacetic acid (NTA), attached. The organic component may, for instance, comprise a group selected from $-C(=O)O-$, $-C-O-C-$, $-C(=O)$, $-NH-$, $-C(=O)-NH$, $-C(=O)-CH_2-I$, $-S(=O)_2-$ and $-S-$. The organic component may comprise a metal chelating group, such as NTA (nitrilotriacetic acid). Usually, a metal such as nickel or cobalt is also attached to the metal-chelating group. Magnetic beads of this sort are commonly used for capturing His-tagged proteins, but are also suitable for use in the process and the produce of the present invention.

Typically, the magnetic bead may comprises a Ni-NTA or a Co-NTA magnetic bead, for instance, a Ni-NTA magnetic bead.

In some embodiments, the magnetic material is other than FeCo. Thus, the magnetic material may not comprise Fe. In some embodiments, the magnetic material does not comprise Fe and does not comprise Co.

Each droplet in the plurality of droplets will be in contact with at least one other droplet in the plurality of droplets. As discussed for the process of the invention, the boundary that is shared between contacting droplets at the point of contact between the objects, is referred to herein as an interface. Typically, a bilayer of amphipathic molecules is formed at an interface between contacting droplet. More typically, a bilayer of amphipathic molecules is formed at an interface between each of the contacting droplets in the plurality of droplets.

The droplet assembly may, for instance, comprise at least n of said droplets, and at least n−1 of said interfaces between contacting droplets, wherein n is equal to or greater than 2. The integer n may be equal to or greater than 3. More typically, n is equal to or greater than 4.

The integer n can in principle be very high, for instance in the order of millions. This is because the droplets may be very small and there is no upper limit on the size of the droplet assembly. Such assemblies, which can in principle comprise millions of droplets, may, for instance, be useful for preparing prototissue (i.e. an aggregate of protocells). In some embodiments, therefore, the integer n may be as high as several million, for instance up to about 10,000,000, or for instance up to about 5,000,000.

In other embodiments, n may be several hundred, for instance up to about 500, or for instance up to about 400. The integer n may for instance be an integer of from 2 to 500, or an integer of from 3 to 500. n may be an integer of from 2 to 400. In other embodiments, n may be an integer of from 2 to 300, or an integer of from 3 to 200. More typically n is from 2 to 200. In other embodiments, however, n is an integer of from 2 to 50, or an integer of from 3 to 50. n may for instance be from 2 to 20, or from 2 to 15.

Typically, the plurality of droplets comprises three or more droplets.

The magnetic assembly process defined herein may be automated. For example, for large droplet assemblies, such as when n is equal to or greater than 1000, or even equal to or greater than 5000, the magnetic assembly process defined herein would typically be automated. Any suitable method of automation may be used. The movement of the magnet may, for instance, be automated.

Usually, in the droplet assembly of the invention at least two of said plurality of droplets comprise a membrane protein and at least one of said plurality of droplets does not comprise a membrane protein.

The membrane protein may, for instance, be a membrane protein as defined herein for the process of the invention.

In some embodiments, the plurality of droplets comprises five or more droplets, for instance, from 5 to 50 droplets. The plurality of droplets may comprise nine or more droplets, for instance, from 9 to 20 droplets. For instance, the plurality of droplets may comprise from 9 to 14 droplets.

Typically, at least two of said plurality of droplets comprise a membrane protein. For instance, from 2 to 50 of said plurality of droplets comprise a membrane protein. In some embodiments, from 2 to 10 of said plurality of droplets comprise a membrane protein. For instance, from 2 to 8 of said plurality of droplets comprise a membrane protein.

In some embodiments, in the droplet assembly of the invention, at least one of said plurality of droplets comprises αHL and at least one of said plurality of droplets comprises a blocker of αHL. For instance, when the membrane protein comprises αHL, at least one of said plurality of droplets comprises a blocker of αHL, such as γ-cyclodextrin (γCD). Typically, the concentration of the blocker of αHL is equal to or greater than 10 μM, for instance equal to or greater than 25 μM. Usually, the concentration of the blocker of αHL is from 10 μM to 50 μM, for instance from 25 μM to 40 μM.

The droplet assembly may be a 2D assembly or a 3D assembly. Thus, the droplet assembly may comprise one or more layers of droplets. For instance, the droplet assembly may comprise from 1 to 10 layers of droplets. Typically, the droplet assembly comprises from 1 to 5 layers of droplets, for instance, one, two or three layers of droplets.

In some embodiments, the droplet assembly is a 3D assembly.

When the process of magnetic manipulation is automated (for instance when the movement of the magnet is automated) the number of layers of droplets may be even larger. For example, the droplet assembly may comprise from 1 to 10000 layers of droplets, for instance, from 1 to 1000 layers.

Usually, the droplet assembly of the invention comprises at least two layers of droplets. For instance, the droplet assembly may comprise two or three layers of droplets.

Typically, at least one of said plurality of droplets has a volume of less than or equal to 1500 nL. More typically, at least one of said plurality of droplets has a volume of from 100 nL to 1500 nL. For instance, at least one of said plurality of droplets may have a volume of from 300 nL to 900 nL. Usually, at least one of said plurality of droplets has a volume of from 300 nL to 900 nL for instance, from 400 nL to 800 nL. For instance, at least one of said plurality of droplets may have a volume of about 400 nL or about 800 nL.

In some embodiments, two or more of said plurality of droplets has a volume of less than or equal to 1500 nL. Typically, two or more of said plurality of droplets has a volume of from 100 nL to 1500 nL. For instance, two or more of said plurality of droplets may have a volume of from 300 nL to 900 nL. Usually, two or more of said plurality of droplets has a volume of from 300 nL to 900 nL for instance, from 400 nL to 800 nL. For instance, two or more of said plurality of droplets may have a volume of about 400 nL or about 800 nL.

Typically, each of said plurality of droplets has a volume of less than or equal to 1500 nL. More typically, each of said plurality of droplets has a volume of from 100 nL to 1500 nL. For instance, each of said plurality of droplets may have a volume of from 300 nL to 900 nL. Usually, each of said plurality of droplets has a volume of from 300 nL to 900 nL for instance, from 400 nL to 800 nL. For instance, each of said plurality of droplets may have a volume of about 400 nL or about 800 nL.

Figures 13A, 13B, 13C:
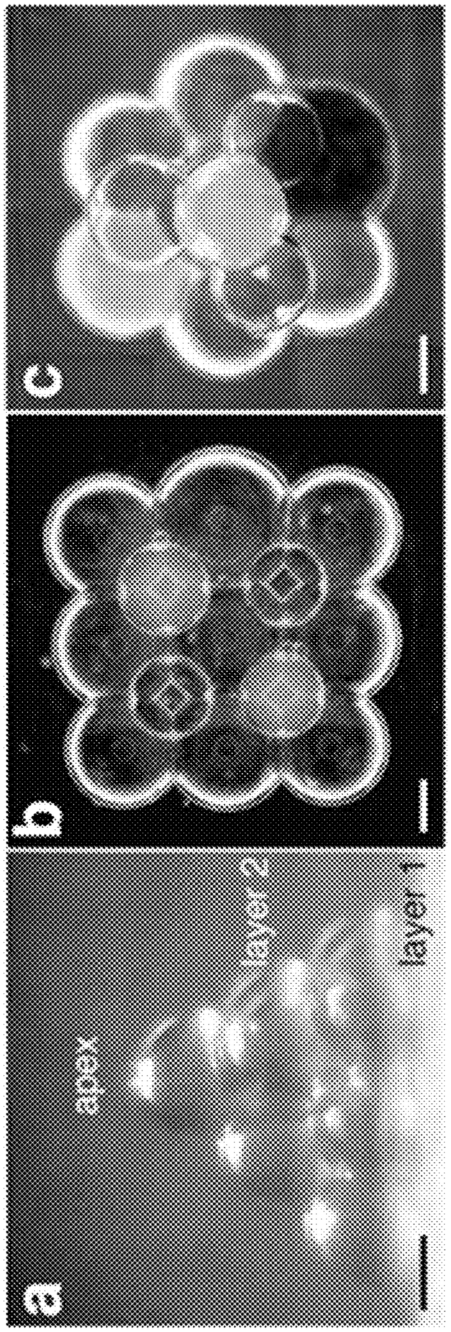
FIGS. 13A-13C demonstrate the packing droplets in different arrangements.
Figures 14A, 14B, 14C, 14D, 14E, 14F, 14G, 14H:
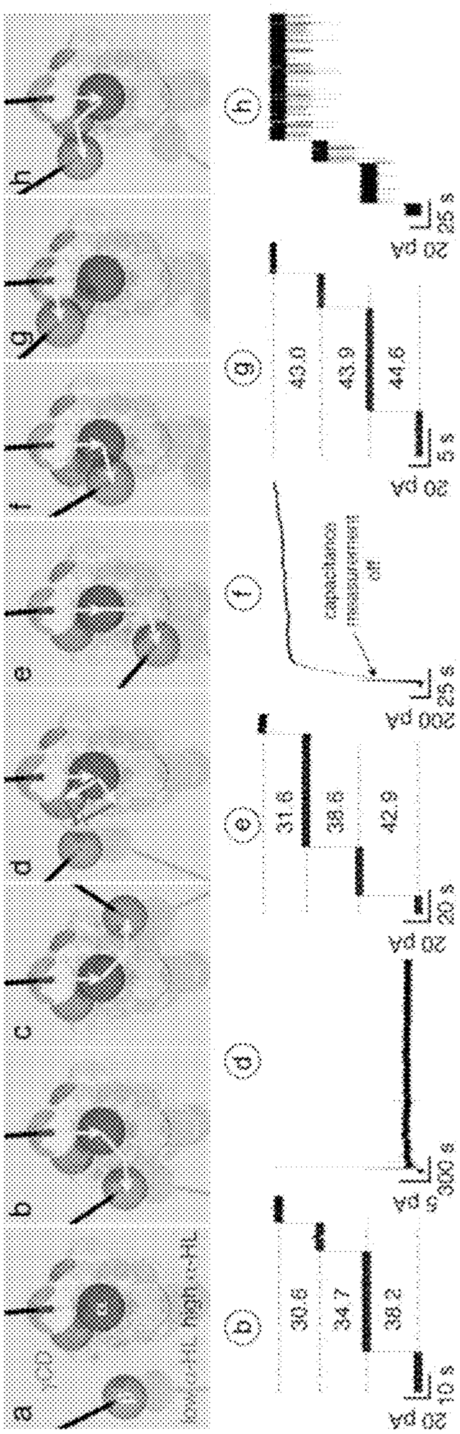
FIGS. 14A-14H illustrate directed communication between compartments of a 3D network. A 10-droplet pyramid was assembled layer-by-layer by injecting droplets into a 1:1 (v/v) mixture of hexadecane/silicone oil containing DPhPC (1 mg $mL^{-1}$). The droplets contained DPhPC liposomes (1 mg $mL^{-1}$) in 1 M KCl, 10 mM Tris·HCl, pH 7.0. The upper panel shows cartoon representations of the 3D droplet network.
Figure 15A:
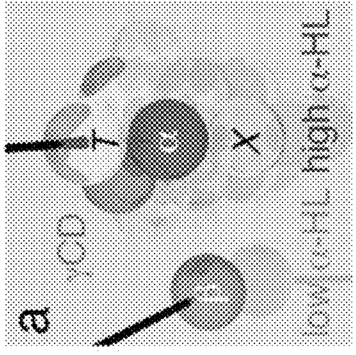
FIGS. 15A-15D show an electrical analysis of a conduction pathway in a 3D assembly.
Figure 15B:
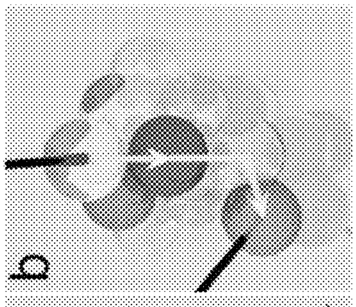
Figure 15C:
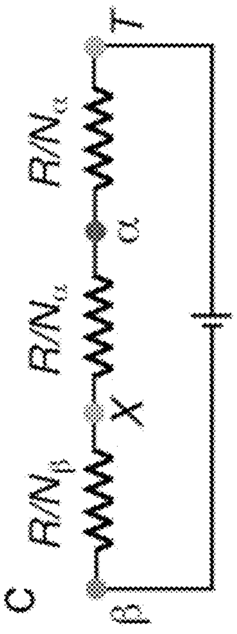
Figure 15D:
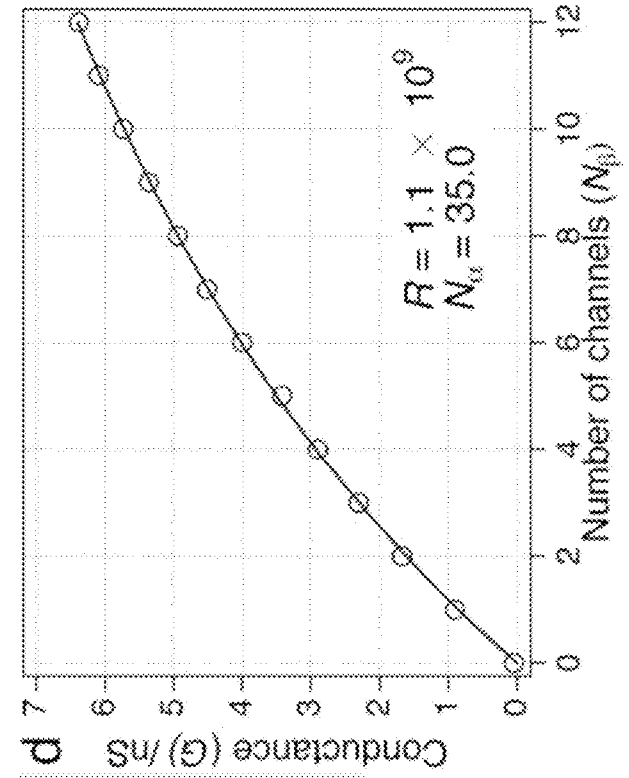

The droplets in the droplet assembly may be of the same volume or may be of different volumes. For instance, when the droplet assembly comprises two or more layers, the droplets in one layer of the droplet assembly may be a first volume and the droplets in another layer of the droplet assembly may be a second volume, wherein the first and second volumes are the same or different. If the droplet assembly comprises droplets of different volumes, this may have an effect on whether or not the neighbouring droplets are in contact with each other and thus whether or not there is an interface between the neighbouring droplets. If there is no interface, no bilayer is formed. This is illustrated in FIGS. 13A-13C.

Accordingly, in some embodiments the droplet assembly of the invention comprises a first droplet of a first volume and a second droplet of a second volume, wherein the first and second volumes are different. Typically, the first droplet is in a first layer and the second droplet is in a second layer.

The droplets in the droplet assembly may be packed by any suitable packing arrangement. Suitable packing arrangements include, by are not limited to, cubic close packing and hexagonal close packing (as illustrated in FIGS. 13A-13C).

The plurality of droplets may be of any shape. For instance, the plurality of droplets may form a parallelpiped shape, such as a cuboid, a flower shape or a pyramidal shape. In some embodiments, the plurality of droplets forms a pyramidal shape.

In some embodiments, the droplet assembly comprises a first plurality of droplets and a second plurality of droplets wherein: (a) the aqueous medium of the droplets of the first plurality of droplets comprises a membrane protein; and (b) the aqueous medium of the droplets of the second plurality of droplets does not comprise a membrane protein. The membrane protein is typically a membrane protein as defined herein for the process of the invention.

The aqueous medium of the droplets in the first plurality of droplets may, for instance, comprise a concentration of at equal to or greater than 10 ng $mL^{-1}$ of a membrane protein, for instance, equal to or greater than 50 ng $mL^{-1}$ of a membrane protein. Typically, the aqueous medium of the droplets in the first plurality of droplets comprises from 10 ng $mL^{-1}$ to 2000 μg $mL^{-1}$ of a membrane protein, for instance, from 50 ng $mL^{-1}$ to 1000 μg $mL^{-1}$. More typically, the aqueous medium of the droplets in the first plurality of droplets comprises from 75 ng $mL^{-1}$ to 900 μg $mL^{-1}$.

In another embodiment, the droplet assembly comprises a first plurality of droplets and a second plurality of droplets wherein: (a) the aqueous medium of the droplets of the first plurality of droplets comprises a first concentration of a membrane protein; and (b) the aqueous medium of the droplets of the second plurality of droplets comprises a second concentration of the membrane protein, wherein the first concentration is greater than the second concentration.

In some embodiments, the droplet assembly comprises a first plurality of droplets and a second plurality of droplets wherein: (a) the aqueous medium of the droplets of the first plurality of droplets comprises a concentration of at least 50 ng $mL^{-1}$ of a membrane protein; and (b) the aqueous medium of the droplets of the second plurality of droplets comprises a concentration of less than 50 ng $mL^{-1}$ of the membrane protein. Usually, the membrane protein is a membrane protein as defined herein for the process of the invention.

For instance, the droplet assembly may comprise a first plurality of droplets and a second plurality of droplets wherein: (a) the aqueous medium of the droplets of the first plurality of droplets comprises a concentration of at least 50 ng $mL^{-1}$ of a membrane protein, for instance, at least 100 ng $mL^{-1}$; and (b) the aqueous medium of the droplets of the second plurality of droplets comprises a concentration of less than 5 ng $mL^{-1}$ of the membrane protein, for instance, less than 1 ng $mL^{-1}$.

In some embodiments, the droplet assembly comprises a first plurality of droplets and a second plurality of droplets wherein: (a) a bilayer of amphipathic molecules is formed at an interface between each of the contacting droplets in the first plurality of droplets and each bilayer between each of the contacting droplets in the first plurality of droplets comprise a membrane protein; and (b) a bilayer of amphipathic molecules is formed at an interface between each of the contacting droplets in the second plurality of droplets and none of the bilayers between each of the contacting droplets in the second plurality of droplets comprise the membrane protein.

Typically, the droplet assembly comprises a first plurality of droplets and a second plurality of droplets wherein: (a) a bilayer of amphipathic molecules is formed at an interface between each of the contacting droplets in the first plurality of droplets and each bilayer between each of the contacting droplets in the first plurality of droplets comprise a membrane protein; and (b) a bilayer of amphipathic molecules is formed at an interface between each of the contacting droplets in the second plurality of droplets and none of the bilayers between each of the contacting droplets in the second plurality of droplets comprise a membrane protein.

In another embodiment, the droplet assembly comprises a first plurality of droplets and a second plurality of droplets wherein: (a) a bilayer of amphipathic molecules is formed at an interface between each of the contacting droplets in the first plurality of droplets and the bilayers between the contacting droplets in the first plurality of droplets comprise a first concentration of the membrane protein; and (b) a bilayer of amphipathic molecules is formed at an interface between each of the contacting droplets in the second plurality of droplets and the bilayers between the contacting droplets in the second plurality of droplets comprise a second concentration of the membrane protein, wherein the first concentration is greater than the second concentration.

Droplets can exchange chemical species with each other through membrane proteins incorporated in the bilayer between the droplets. Suitable membrane proteins include, but are not limited to, pumps, channels and/or pores, receptor proteins, transporter proteins, for instance an α-hemolysin (αHL) pore. Thus, a droplet assembly may be capable of trafficking materials such as chemical compounds through the network, from object to object, as well as to and from the external environment. Complex transport systems can be built up in this way.

A droplet assembly may, for instance, act as a sensor module, capable of sensing the presence of a particular chemical in the external environment, for instance, or capable of sensing light. Thus, the droplet may in some embodiments comprise a sensor molecule. The sensor molecule can be present in the aqueous medium of the droplet or in the bilayer. The sensor molecule may be a molecule which is sensitive to the presence of a particular chemical (for instance a target analyte), or it may be a light-sensitive molecule.

In some embodiments, the droplet assembly comprises a first plurality of droplets and a second plurality of droplets, wherein the droplets in the first plurality of droplets are in communication with one another via the membrane proteins.

Usually, the droplet assembly comprises a first plurality of droplets and a second plurality of droplets, wherein the droplets in the first plurality of droplets are in communication with one another via the membrane proteins and the droplets in the second plurality of droplets are not in communication with one another via the membrane proteins.

The droplet assembly may, for instance, be a 3D assembly. Such a functional 3D assembly, capable of transmitting electrical signals along defined paths, is analogous to a tissue, and can form the basis of a model system with a higher number of droplets mimicking a neuronal tissue.

At least one of the droplets in the first plurality of droplets and/or the second plurality of droplets may, in some embodiments, comprise other materials, compounds or substances. For instance, at least one of the droplets in the first plurality of droplets and/or the second plurality of droplets may comprise a small molecule, such as a dye, or a magnet. Suitable dyes include, but are not limited to, xylene cyanol FF, orange G, pyranine, fluorescein and 5-cTAMRA (5-carboxytetramethylrhodamine). Alternatively, the droplet may comprise a sensor molecule, for instance a sensor molecule that is sensitive to a particular chemical or is a light-sensitive molecule. As a further alternative, at least one of the droplets in the first plurality of droplets and/or the second plurality of droplets may comprise a therapeutic agent, such as a prodrug, or a diagnostic agent, such as a contrast agent.

By using 3D networks of droplets containing different molecules to perform specific functions, akin to the differentiated cells of biological tissues, the droplet assemblies of the invention may be used in the building of functional synthetic minimal tissues. The ability to switch rapidly between droplet configurations, afforded by the present invention, does not occur naturally, and will add to the versatility of synthetic minimal tissues.

The droplet assembly of the invention is typically stable for at least one day, for instance at least two days. The droplet assembly may, for instance, be stable for at least 3 or at least 4 days.

The droplets of the droplet assembly may be produced by any suitable method or a combination of suitable methods. For instance, the droplets may be produced by injecting or pipetting a composition comprising the aqueous medium into a suitable medium, such as a hydrophobic medium.

In some embodiments, the droplets of the droplet assembly are produced using a microfluidic device. A microfluidic device may, for instance, be used to produce at least n of said droplets, wherein n is equal to or greater than 2. The integer n may be equal to or greater than 3. More typically, n is equal to or greater than 4. As discussed above n can, in principle, be very high. In some embodiments, therefore, the integer n may be as high as several million, for instance up to about 10,000,000, or for instance up to about 5,000,000. In other embodiments, n may be several hundred, for instance up to about 500, or for instance up to about 400. The integer n may for instance be an integer of from 2 to 500, or an integer of from 3 to 500. n may be an integer of from 2 to 400. In other embodiments, n may be an integer of from 2 to 300, or an integer of from 3 to 200. More typically n is from 2 to 200. In other embodiments, however, n is an integer of from 2 to 50, or an integer of from 3 to 50. In may for instance be from 2 to 20, or from 2 to 15.

Techniques such as soft-lithography may be used to produce one or more of the droplets of the droplet assembly. One or more droplets may, for instance, be molded. In some embodiments, PMMA molds may be used to produce one or more droplets. Soft-lithography may, for instance, be used to produce one of more droplets comprising a hydrogel. Mold may, for instance, be used when the droplet comprises a hydrogel.

One or more droplets of the droplet assembly may be produced using photolithograph. A photomask may, for instance, be used to define a pattern through which the light (such as UV light) can pass. Photolithography may, for instance, be used to produce one of more droplets comprising a photocurable polymer. Photolithography may, for instance, be used when the droplet comprises a hydrogel.

At least one of the plurality of droplets in the droplet assembly comprises a magnetic material disposed in an aqueous material. In some embodiments at least a quarter of the droplets in the droplet assembly comprise a magnetic material, for instance, at least half of the droplets in the droplet assembly may comprise a magnetic material. In some embodiments, all of the droplet in the droplet assembly comprise a magnetic material. The number of droplets in the droplet assembly that comprise a magnetic material may, for instance, depend on the process used to produce the droplet assembly. For instance, if the levitation method is used to produce the droplet assembly at least half of the droplets may comprise a magnetic material, for instance, all of the droplets may comprise a magnetic material.

The droplet assembly of the invention may form part of a droplet encapsulate. The encapsulate may, for instance, comprise: a volume (for instance a drop) of a hydrophobic medium; a peripheral layer of amphipathic molecules around the surface of the volume; and a droplet assembly within the peripheral layer, wherein the droplet assembly is a droplet assembly as defined herein. The volume of hydrophobic medium, with the droplet assembly disposed therein, may be provided in a bulk hydrophilic medium, such as an aqueous medium. The volume of hydrophobic medium may be a drop of said hydrophobic medium.

Typically, the hydrophilic medium is an aqueous medium.

The invention also provides the use of a droplet assembly as defined herein in synthetic biology.

Further provided is the use of a droplet assembly as defined herein in preparing a protocell or an aggregate of protocells.

Also provided by the invention is the use of a droplet assembly as defined herein as a communication network or as part of a communication network.

For instance, the droplet assembly may comprise a first plurality of droplets and a second plurality of droplets, wherein the droplets in the first plurality of droplets are in communication with one another via the membrane proteins. Typically, the droplets in the second plurality of droplets are not in communication with one another via the membrane proteins.

The invention also provides the use of a droplet assembly as defined herein to store energy.

The present invention is further illustrated in the Examples which follow:

EXAMPLES

General Methods

Wild-Type (WT) αHL Heptamer Preparation

The WT-αHL heptamer was produced by purifying spontaneously oligomerized αHL from *Staphylococcus aureus* Wood 46 cultures as described elsewhere (Maglia, M. et al, Nano Lett 9, 3831-3836 (2009)). In brief, αHL was precipitated from the culture supernatant with ammonium sulfate. The dialyzed protein was fractionated on S-Sepharose FF, followed by Superdex 200. The heptamer was further purified by preparative SDS polyacrylamide gel electrophoresis and stored at 0.83 mg $mL^{-1}$ in 20 mM sodium phosphate buffer, 150 mM NaCl, 0.3% (w/v) SDS, pH 8.0 at −80° C. The protein was diluted 10 to 10,000-fold for incorporation into the droplet networks.

Droplet Interface Bilayer

Liposomes were prepared from 1,2-diphytanoyl-sn-glycero-3-phosphocholine (DPhPC) (Avanti Polar Lipids, USA) by extruding a hydrated lipid suspension (25 mg mL; 1) in 1 M KCl, 10 mM Tris·HCl, pH 7.0, through a polycarbonate membrane (pore size 0.1 μm). The liposomes were diluted in the same buffer to 1 mg $mL^{-1}$ lipid. Submicroliter droplets (400 to 800 nL) of the diluted liposomes were injected into oil, pure hexadecane (≥99%) (Sigma-Aldrich, UK), or hexadecane/silicone oil AR20 (Aldrich, UK) (1:1 v/v). Depending on the lipid concentration in the oil phase, and the type of oil used, the droplets were incubated from ~5 min to 30 min. During this period, they became encased in a lipid monolayer. On bringing two lipid-encased droplets together, a bilayer formed at the interface. Aqueous droplets in the hexadecane/silicone oil mixture (1:1 v/v) needed less time (5-10 min) to form a monolayer than they did in pure hexadecane (≥ 30 min) as judged by their ability to form stable bilayers.

Electrical Recordings

An Ag/AgCl electrode, the cis electrode, was inserted into one droplet, and attached to the grounded end of a patch-clamp headstage (Axon Instruments, USA). A second Ag/AgCl electrode (trans) inserted in another droplet was connected to the active end. A positive potential causes the flow of anions from the cis to the trans electrode and of cations from trans to cis. The current was amplified by using a patchclamp amplifier (Axopatch 200B, Axon Instruments, USA), filtered with a low-pass Bessel filter (80 dB/decade) with a corner frequency of 1 kHz, and digitized with a Digidata 1322 A/D converter (Axon Instruments) at a sampling frequency of 20 kHz. Post-acquisition, the data were low-pass filtered at 100 Hz to 400 Hz. The droplet assembly, electrodes, and the headstage were enclosed in a metal box to minimize electrical noise.

Set-Up for Droplet Manipulation

A Nd magnet (1.2 mm×1.2 mm×1.2 mm) (Magnet Expert Ltd., UK) was stuck to the end of a glass capillary (O.D 0.5 mm) (FIGS. 2A and 2B), which was attached to a micromanipulator (World Precision Instruments, UK). The capillary was used to manipulate the droplets. Ni-NTA magnetic beads (MagneHis™ Ni-particles, Promega, USA) were mixed with buffer (1 M KCl, 10 mM Tris·HCl, pH 7.0) containing liposomes (1 mg $mL^{-1}$ DPhPC) in a ratio of 1:2 (v/v). Droplets (400 nL) were formed by injecting this mixture into hexadecane or hexadecane/silicone oil containing DPhPC (1 mg $mL^{-1}$). The lipid concentration in the aqueous and oil phases was the same in all experiments, unless stated otherwise.

Patterned Surface Features

Small pillars were patterned in a hexagonal array on a PDMS surface and used to keep droplets stationary (FIGS. 2A and 2B). The dimensions of the pillars were 0.4 mm×0.2 mm (diameter×height), and the center-to-center distance was 0.7 mm. The patterned PDMS was made by pouring Sylgard 184 silicone elastomer (Dow Corning, USA) onto a poly(methyl methacrylate) (PMMA) mold in a polystyrene Petri dish, and heating the dish at 80° ° C. to 90° C. to induce polymerization. To form droplet networks, the PDMS was covered with oil at a depth 1 to 3 times the height of the droplets. The droplets sat on the patterned surface so that adjacent droplets were in contact with each other. As the magnet was brought close to the droplets, the force on the target droplet was sufficient to lift it over the pillars. The droplets on either side experienced a smaller magnetic force insufficient to overcome the pillar barriers. Therefore, this method allowed droplets to be individually extracted from a network.

Levitating Droplet Technique

The density of hexadecane is ~0.75 times the density of water. Therefore, to lift a droplet in hexadecane an upward force ~0.25 times the droplet's weight in air must be applied. When a magnetic force was applied, the droplets rose closer to the magnet and experienced a progressively increasing force. The depth of the oil was adjusted so that the magnet did not touch the surface, and the field strength at the oil/air interface was insufficient for the droplet to overcome the surface tension. Therefore, the droplet remained fully immersed. An elevated droplet traveled with the magnet when it was moved with the xyz manipulator, while a negligible force was exerted on the droplets resting beneath. By lifting the magnet, the elevated droplet could be dropped at a desired location. By this means, a droplet could be inserted into a network with good spatial resolution without disturbing the neighboring droplets.

Carrier Droplet Technique

A droplet (400 nL or 800 nL) containing magnetic beads was used to pull several smaller non-magnetic droplets (400 nL) connected by interface bilayers (FIG. 7A-7M). The magnetic droplet could be detached from the other droplets by pulling it quickly (on a flat unpatterned surface) to break the bilayer. To move droplets on a surface, friction was minimized by using a hydrophobic PDMS surface or the surface of a new polystyrene Petri plate.

3D Network Formation

To form robust 3D droplet networks, bilayers stable for hours to days were required. Different ratios of silicone oil AR20 and hexadecane were tested. A composition was deemed suitable if it promoted the fast formation of bilayers upon bringing two droplets together (as determined by monitoring an increase in the capacitance), and if the bilayers were stable with and without an applied potential (up to +200 mV). To form 3D networks, a 1:1 (v/v) mixture of hexadecane and silicone oil AR20 containing 1 mg $mL^{-1}$ DPhPC lipids was used. The aqueous droplets contained DPhPC liposomes (1 mg $mL^{-1}$) in 1 M KCl, 10 mM Tris·HCl, pH 7.0. Magnetic beads were present in the droplets at a ratio of 1:2 (v/v) (magnetic beads/buffer). The bottom layer of droplets contained no magnetic beads and magnetic droplets were placed on the bottom layer by levitation. Dye diffusion experiments were performed with droplets containing 10 mM pyranine (8-hydroxypyrene-1,3,6-trisulfonic acid) (Invitrogen) and 100 mM xylene cyanol FF (Sigma-Aldrich) dissolved in 1 M KCl, 10 mM Tris·HCl, pH 7.0, containing DPhPC liposomes (1 mg $mL^{-1}$). In the experiments demonstrating dye diffusion, 3D droplet networks were constructed without any magnetic beads to enable easy visualization of the colour during dye diffusion. Aqueous droplets were pipetted in oil and placed close to each other to form a 2D base layer. Droplets were pipetted on the base layer to obtain a multilayered 3D network.

Results

As discussed in the Examples presented below, the inventors have demonstrated that lipid-coated droplets can be manipulated with submillimeter precision by a magnet to form 2D and 3D droplet networks.

Example 1 Assembling a Droplet Assembly Using the Levitation Method

Figure 1A:
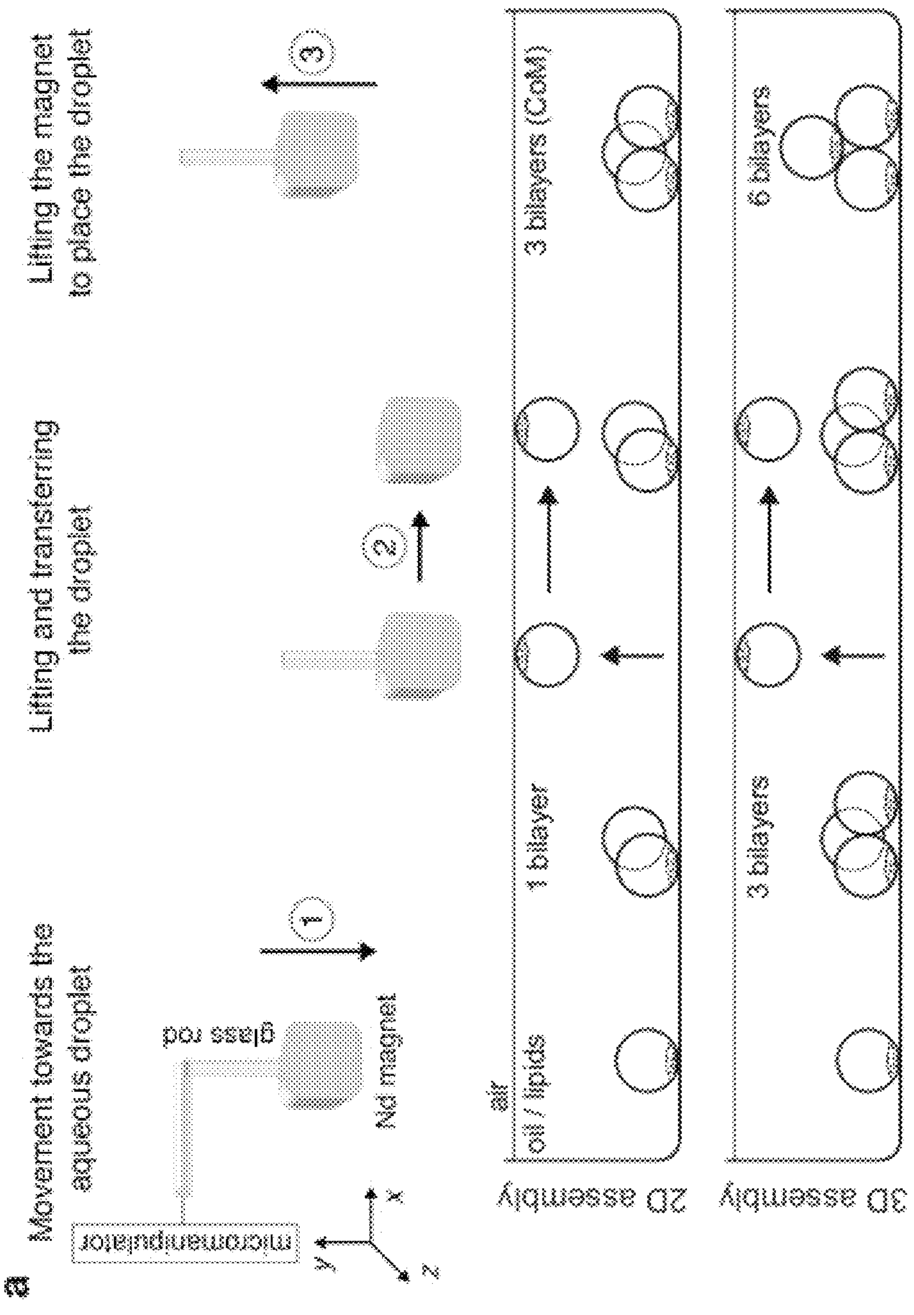
FIGS. 1A-1I show the construction of bilayer networks by droplet levitation.
Figures 1B, 1C, 1D, 1E, 1F, 1G, 1H, 1I:
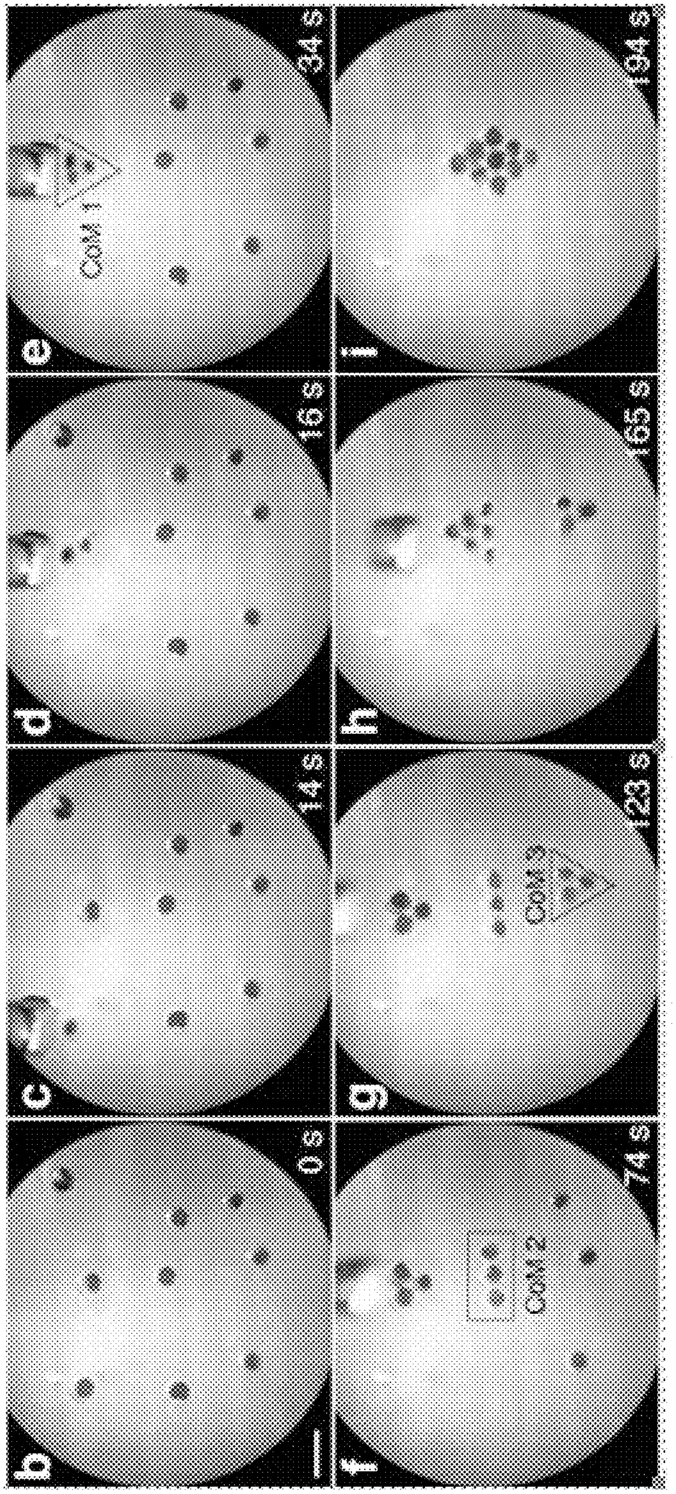

The set-up comprises a neodymium (Nd) magnet fixed at the end of a thin glass rod controlled by a xyz-micromanipulator (FIG. 1A, FIGS. 2A and 2B). The inventors have developed a levitation method to control the movement of a droplet with minimal disturbance to its neighbors. Lipid-coated droplets, loaded with magnetic beads, were strewn on a polydimethylsiloxane (PDMS) surface patterned with pillars to facilitate the precise arrangement of a first layer of droplets (FIGS. 2A and 2B). The depth of the oil was adjusted such that the magnet, when brought close to the oil/air interface, produced a field just sufficient to lift one of the droplets to the interface. The levitated droplet was released by lifting the magnet away from the interface, and thereby placed wherever desired on the patterned surface, or on top of an existing 2D network to build a 3D structure (FIG. 1A).

By using the levitation technique, the inventors first demonstrated the construction of a 2D network in which all the lipid-coated droplets contained magnetic beads. Three droplets (~400 nL) were moved separately with the magnetic rod and assembled in a triangular pattern. A flattened contact area between two droplets was a good indication of bilayer formation (Holden, M. A., et al, J Am Chem Soc 129, 8650-8655 (2007) and Heron, A. J., et al, J Am Chem Soc 129, 16042-16047 (2007)). The assembly of droplets in such a manner yielded stable construction modules (CoM). In one example, three 3-droplet CoMs were assembled to form a larger 9-droplet assembly (FIGS. 1B-1I). Next, the inventors demonstrated the ease of transporting a complete droplet assembly (FIGS. 3A-3F). Seven droplets (~400 nL each) arranged in a floral pattern on a hexagonal dimpled surface were levitated and moved under a magnetic field. During transport, the network's shape and bilayer connections were retained.

Example 2—Disassembling a Droplet Assembly Using the Levitation Method

Figures 6A, 6B, 6C, 6D, 6E, 6F, 6G, 6H, 6I, 6J, 6K, 6L, 6M, 6N, 6O, 6P, 6Q, 6R:
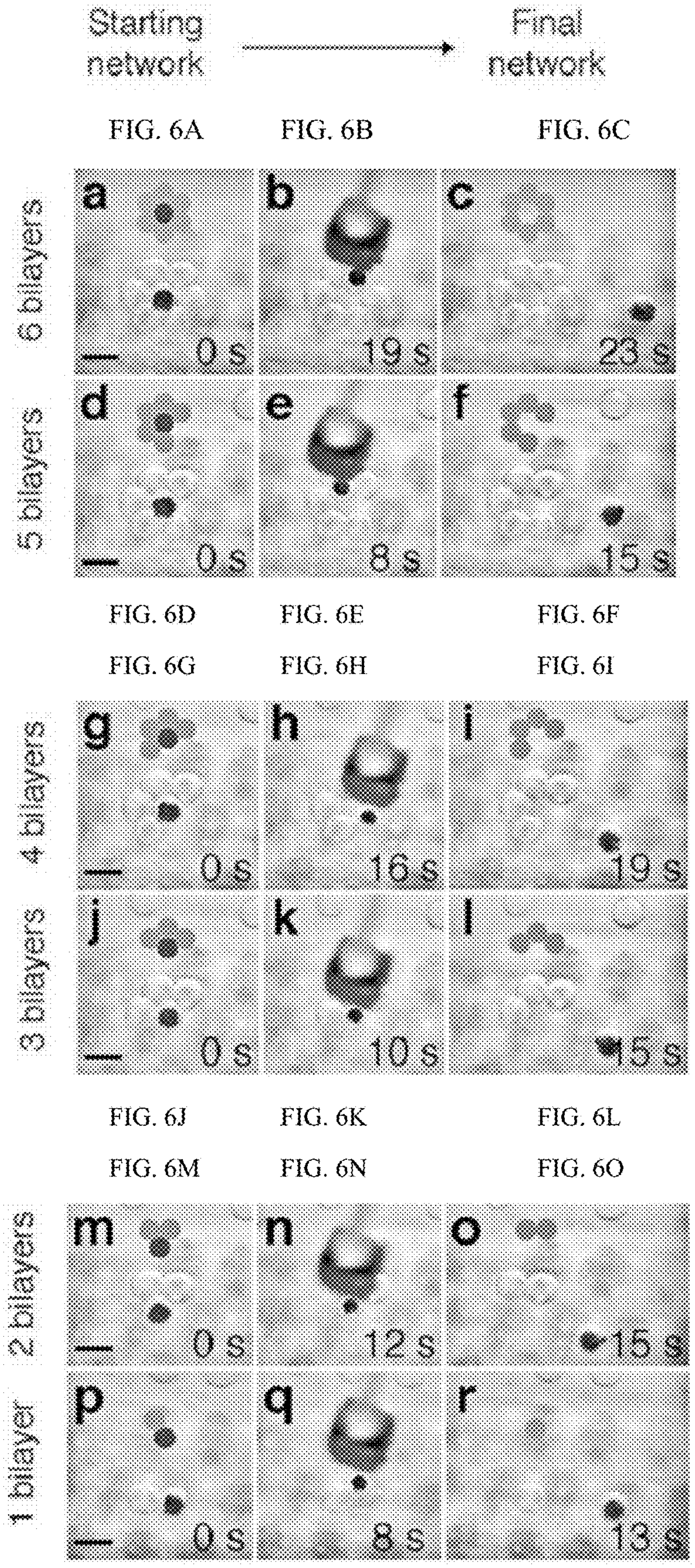
FIGS. 6A-6R illustrate the detachment a droplet anchored by 1 to 6 bilayers. The number of bilayers required to prevent the detachment of a droplet was tested systematically. Six 2D networks were formed from one droplet containing magnetic beads and 6, 5, 4, 3, 2 and 1 empty droplets. The magnetic droplet was able to overcome the resistance of the bilayers in every case. The experiments were performed with buffer droplets injected into hexadecane containing DPhPC (1 mg $mL^{-1}$). The empty and magnetic droplets contained the same concentration of lipids (1 mg $mL^{-1}$). Droplets were incubated in hexadecane for >20 min prior to forming bilayer networks. Similar results were obtained when detachment tests were performed in a 1:1 mixture of hexadecane/silicone oil with DPhPC (1 mg $mL^{-1}$). The scale bars (same for all panels) represent 1 mm.

The combined use of small, strong Nd magnets, a patterned surface, and adjustment of the height of the oil phase offers a way to remove specific droplets from a network and transfer them to another network (FIGS. 4A-4H). For example, the magnet was used to pull on a droplet using the PDMS pillars to produce resistance from the rest of an assembly. With this approach, the inventors demonstrated the disassembly of a 2D network into its constituents (FIGS. 5A-5J). Droplets were peeled off starting with the outer ring. As the network size shrank, the decreasing resistance made disassembly of the last droplets difficult and they were left as a 3-droplet COM (FIGS. 5A-5J). The inventors also established that the maximum number of bilayers to which a droplet could be attached and still be removed from a 2D network was six (FIG. 6A-6C).

Example 3—Assembling a Droplet Assembly Using the Carrier Method

The inventors next constructed a 2D network of droplets devoid of magnetic beads using the carrier droplet technique (see General Methods). In brief, a droplet containing magnetic beads, used as the carrier droplet, was attached to an empty droplet through an interface bilayer (DIB). The two droplets were then connected to another empty droplet, and subsequently to a third (FIGS. 7A-7F). To move the droplets with ease, a flat Petri dish surface was used instead of a patterned PDMS surface. Since no patterned pillars were present to offer resistance in this case, the carrier droplet could be detached from the linear COM by moving the magnet quickly, such that $F_{drag}>F_{bilayer}$, where $F_{drag}$ is the drag force on the carrier droplet in oil, and $F_{bilayer}$ is the interaction force between the lipid monolayer of the carrier droplet and the droplet attached to it (See FIGS. 21A-21C).

Figure 7A:
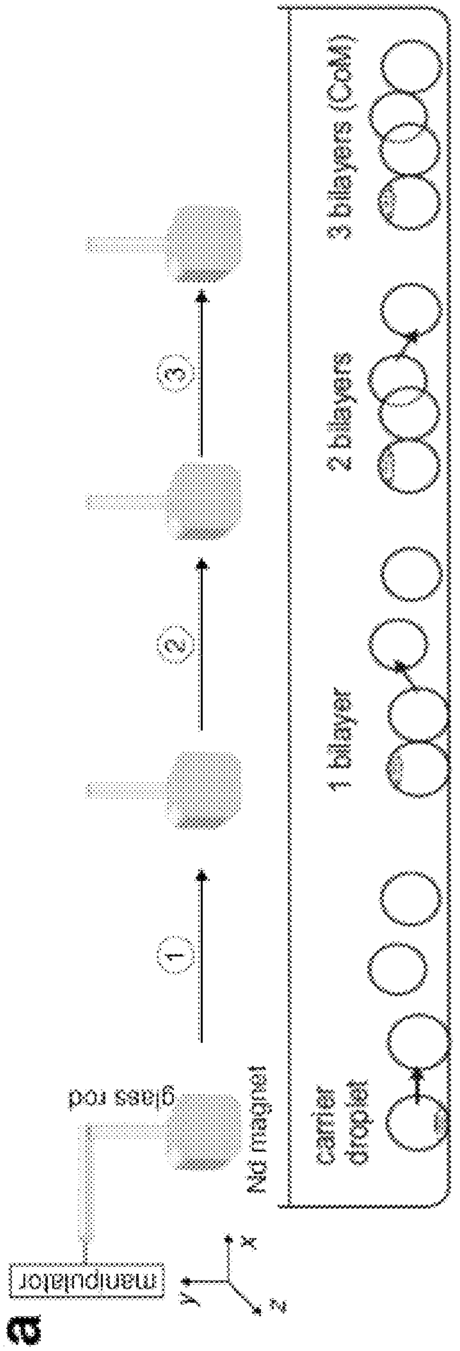
FIGS. 7A-7M illustrate the formation of a 2D network of empty droplets.
Figure 7B:
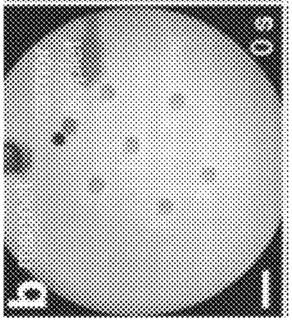
Figure 7C:
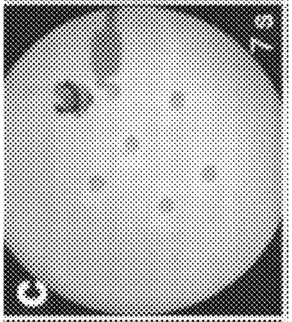
Figure 7D:
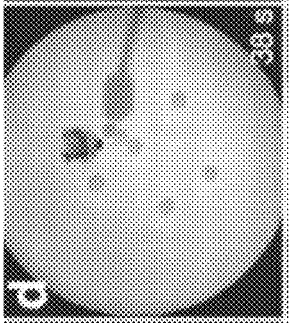
Figure 7E:
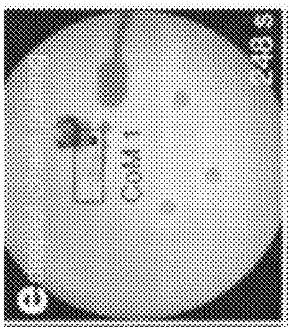
Figure 7F:
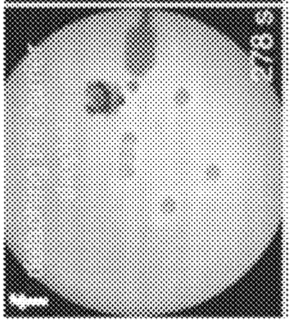
Figure 7G:
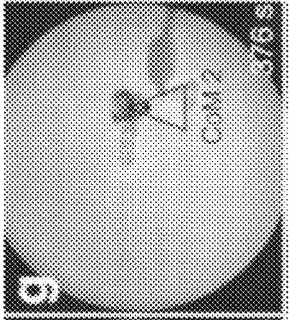
Figure 7H:
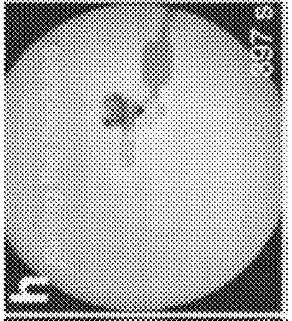
Figure 7I:
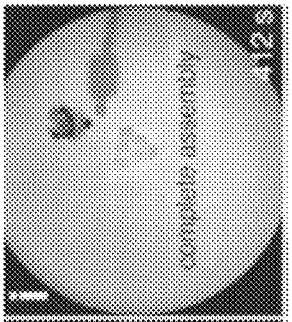
Figure 7J:
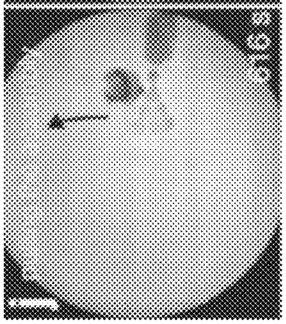
Figure 7K:
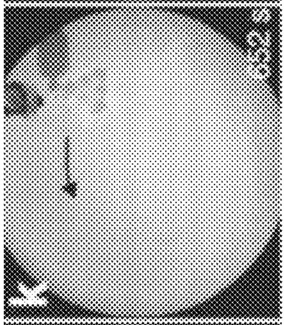
Figure 7L:
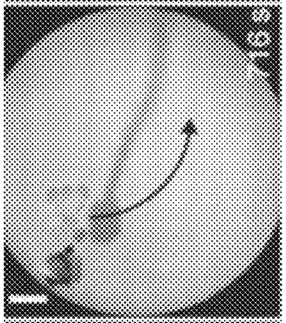
Figure 7M:
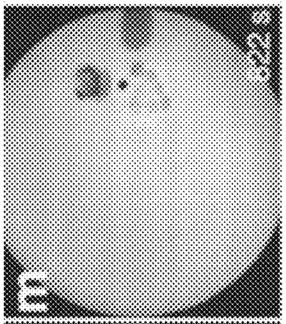
Figures 12A, 12B, 12C, 12D, 12E:
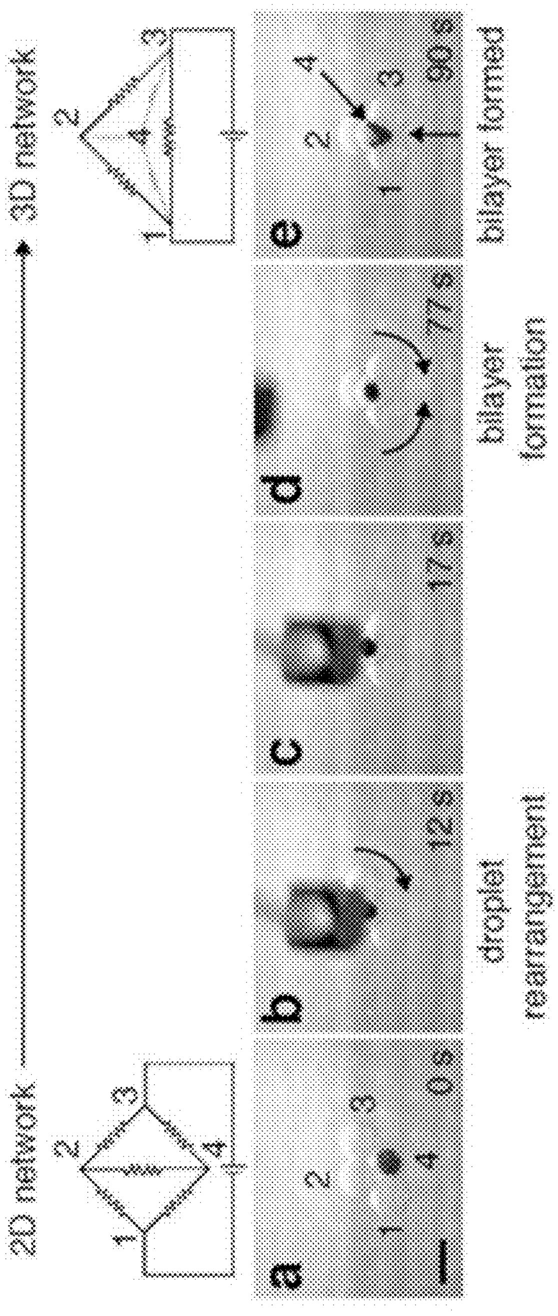
FIGS. 12A-12E illustrate switchable circuits made of droplet networks.

Similarly, three droplets were arranged in a triangular pattern to give a second COM, which was connected to a linear module to build a 2D 6-droplet triangle (FIGS. 7G-7I). The bilayer between the carrier droplet and the apex of the triangle withstood the drag force when the carrier droplet was used to move the entire assembly slowly (FIGS. 7J-7M).

Example 4—Disassembling a Droplet Assembly Using the Carrier Method

A network of empty droplets could be disassembled by fusing a droplet containing magnetic beads with an empty droplet, and pulling it away from the rest of the assembly (FIGS. 8A-8J). To achieve fusion, lipids were absent from within the droplet containing the magnetic beads, and the concentration of lipids in the hexadecane was reduced to 0.5 mg $mL^{-1}$.

Example 5—3D Droplet Assemblies Capable of Internal Communication

The next goal was to build 3D droplet networks capable of internal communication, i.e., the transmission of chemical and electrical signals between droplets. The 3D tissue morphologies found in nature are more spatially economical than their 2D counterparts, affording shorter and quicker communication paths between cells. In a droplet network, the Manhattan distance between the furthest spaced droplets in an N droplet 2D network scales as $\sqrt{N}$. By assembling networks in 3D, the number of intercommunicating droplets can be increased, and the Manhattan distance scales as $\sqrt[3]{N}$.

In a first approach, a 3D network was constructed by assembling a 2D network of droplets containing magnetic particles, and then placing additional magnetic droplets on the assembled 2D network by levitation (FIG. 1A, FIGS. 9A-9H). In a second approach, a three-layered 3D network was constructed with the bottom layer comprising empty droplets (made with the carrier droplet method), while the upper two droplet layers contained magnetic beads (assembled with the levitation technique) (FIGS. 10A-10H). In the construction of the 3D networks, a mixture of silicone oil and hexadecane (1:1 (v/v), see Methods) was used to increase the bilayer stability and thereby prevent droplet fusion, and avoid the slippage of upper droplets during translational motion of the networks (FIGS. 11A-11G). A 2D network can be converted to a 3D network by magnetically lifting a droplet and placing it on the top of the rearranged bottom layer (FIGS. 12A-12E). By changing droplet topology in this way, it is possible to change the electrical properties of a network.

Droplets can be arranged in various 3D geometries to form electrical networks (FIGS. 13A-13C). A 10-droplet pyramidal network with specific signalling pathways was constructed (FIGS. 14A-14H). One droplet (a) contained a high concentration of wildtype α-hemolysin (WT αHL) heptamer and another droplet contained γ-cyclodextrin (γCD). A 'probe' droplet (β) with a lower concentration of αHL was suspended from the end of an Ag/AgCl electrode. The probe droplet was touched to different droplets in each of the three layers. Ion flow was detected through droplet bilayers connected by αHL pores, but not when bilayers without pores interrupted the path (FIGS. 14A-14H, FIGS. 15A-15D).

The magnitude of the total ionic current depended on the concentration of αHL pores in the droplets, and whether intervening bilayers were present between droplets a and β which contained αHL. When the probe droplet was directly connected to droplet α, an exponential rise in the ionic current was observed (FIG. 14F. If the probe droplet was then connected to a droplet without αHL or to droplet α through one intervening droplet, a quantized increase in the ionic current was measured (cf. FIG. 4F and FIG. 4G, and FIGS. 4F and 4B, 4E, respectively). The ionic current was intermittently interrupted when the probe droplet was connected to droplet α through a γCD containing droplet (FIG. 4H). Such a functional 3D lipid-droplet network, capable of transmitting electrical signals along defined paths, is analogous to a tissue, and can form the basis of a model system with a higher number of droplets mimicking a neuronal tissue.

Finally, chemical communication along predetermined pathways in a 3D network was demonstrated by diffusion of the fluorescent dye pyranine. The four droplets at the vertices of a 3×3 base layer contained αHL heptamers. Four droplets containing αHL were placed on top of this layer, and finally a pyranine-containing droplet was positioned on top of the entire structure (FIG. 16A). Pyranine diffusion was observed from top to bottom, only through droplets containing αHL (FIGS. 16B-16D). The four base layer droplets containing αHL were manually removed one-by-one without compromising the integrity of the remaining droplet assembly. Droplets excised in this way might be used for downstream applications. In a similar example, a droplet pyramid comprised six droplets in the bottom layer, with one droplet containing pyranine, two containing αHL heptamers, and three empty droplets (FIGS. 17A-17D). Two droplets containing αHL and one empty droplet were placed on top of the first layer, and a single droplet containing pyranine was again placed on top. Droplets containing αHL turned green (light grey in the figure provided), whereas the empty droplets were unchanged. Current recordings confirmed that pyranine did not compromise bilayer stability (FIGS. 18A-18D), nor did it interfere with the assembly of αHL into the lipid bilayer (FIGS. 19A and 19B).

In a final experiment the inventors formed a 10-droplet network with a hexagonal base layer, three droplets in the second layer and one droplet forming the apex of the network (FIGS. 20A-20F). Two droplets, one containing pyranine (10 mM) and the other xylene cyanol (100 mM), both with αHL (~83 μg $mL^{-1}$), were placed at two opposing vertices of the base. The remaining four droplets in the base layer did not contain dye or αHL. In layer two, one droplet (labeled 4, FIGS. 20A-20F) contained αHL (~83 μg $mL^{-1}$). The apex droplet contained pyranine and αHL (~83 μg $mL^{-1}$). Pyranine diffusion was fastest into droplet 4 from the apex droplet; both the apex droplet and droplet 4 contained αHL. Pyranine diffusion from the vertex droplet into droplets 1 and 2 was slower, in this case; only the vertex droplet contained αHL (FIGS. 20A-20F). Droplet 3 which formed a bilayer interface with the black droplet did not show any transfer of xylene cyanol.

CONCLUSIONS

The Examples presented demonstrate that the movement of a droplet comprising a magnetic material can be controlled precisely using magnetic manipulation. The results show that the process of moving a droplet can be used in the assembly and disassembly of a droplet assembly and in the rearrangement of droplets within a droplet assembly, and to move a droplet assembly from one location to another.

The experiments demonstrate the construction of designed 3D droplet networks in which each droplet can contain different proteins or small molecules. The assemblies are functional units capable of internal and external communication. Microfluidics approaches have been used to form droplets and sort them (Whitesides, G. M. Nature 442, 368-373 (2006), Weibel, D. B. & Whitesides, Curr Opin Chem Biol 10, 584-591 (2006) and Theberge, A. B. et al. Angew Chem Int Ed Engl 49, 5846-5868 (2010)), and droplet pairs (Bai, Y. et al. Lab Chip 10, 1281-1285 (2010)) and multi-layered droplets (Stanley, C. E. et al. Chem Commun (Camb) 46, 1620-1622 (2010)) have been prepared in this way. However, microfluidics or electrodynamic techniques (Velev, O. D., et al, Nature 426, 515-516 (2003) and Aghdaei, S., et al, Lab Chip 8, 1617-1620 (2008)) cannot be used to pick a specific droplet from a palette and move it to a selected location in a 3D network as the inventors have done here.

By using 3D networks of droplets containing different molecules to perform specific functions, akin to the differentiated cells of biological tissues, the droplet assemblies of the invention may be used in the building functional synthetic minimal tissues. The combination of different functional modules will allow the formation of minimal tissues that accept inputs, process them and give a variety of outputs (Astier, Y., et al, Curr Opin Chem Biol 9, 576-584 (2005) and Maglia, G. et al. Nat Nanotechnol 4, 437-440 (2009)). These materials may find applications in medicine because they can be controlled electronically (Maglia, G. et al. Nat Nanotechnol 4, 437-440 (2009)), with light, or a magnetic field. To build more elaborate synthetic tissues, programmed assembly is desirable (Gijs, M. A., et al, Chem Rev 110, 1518-1563 (2010)), and magnetic actuation as demonstrated here is a promising approach. The ability to switch rapidly between droplet configurations does not occur naturally, and will add to the versatility of synthetic minimal tissues. The 3D droplet networks might be integrated with living tissues to repair them or enhance their properties.

The work leading to this invention has received funding from the European Union Seventh Framework Programme (FP7/2007 to 2013) under grant agreement no. 236250.

The invention claimed is:

1. A droplet assembly comprising a plurality of contacting droplets wherein each droplet in said plurality is in contact with at least one other droplet in said plurality, wherein each droplet in said plurality comprises an aqueous medium and an outer layer of amphipathic molecules around a surface of the aqueous medium, and wherein at least one of the plurality of contacting droplets comprises a magnetic material disposed in the aqueous medium; and wherein a bilayer of amphipathic molecules is formed at an interface between contacting droplets in said plurality of contacting droplets.

2. A droplet assembly according to claim 1 wherein the magnetic material comprises a paramagnetic or a superparamagnetic material.

3. A droplet assembly according to claim 1 wherein the magnetic material comprises a metal-containing magnetic bead.

4. A droplet assembly according to claim 3 wherein the magnetic bead contains a paramagnetic or superparamagnetic metal.

5. A droplet assembly according to claim 1 wherein the magnetic material further comprises an organic component.

6. A droplet assembly according to claim 1 wherein a bilayer of amphipathic molecules is formed at an interface between each of the contacting droplets in the plurality of contacting droplets.

7. A droplet assembly according to claim 1 wherein the magnetic material comprises nickel nitrilotriacetate.

8. A droplet assembly according to claim 1 wherein the plurality of contacting droplets comprises three or more droplets.

9. A droplet assembly according to claim 8 wherein the aqueous medium of at least two of said plurality of contacting droplets comprises a membrane protein and the aqueous medium of at least one of said plurality of contacting droplets does not comprise a membrane protein.

10. A droplet assembly according to claim 8 wherein the plurality of contacting droplets comprises four or more droplets.

11. A droplet assembly according to claim 10 wherein the aqueous medium of at least two of said plurality of contacting droplets comprises a membrane protein.

12. A droplet assembly according to claim 1 wherein the plurality of contacting droplets comprises at least two layers of droplets.

13. A droplet assembly according to claim 1 wherein at least one of said plurality of contacting droplets has a volume of less than or equal to 1500 nL.

14. A droplet assembly according to claim 1 wherein said plurality of contacting droplets is a first plurality of contacting droplets and the droplet assembly further comprises a second plurality of contacting droplets wherein each droplet in said second plurality comprises an aqueous medium and an outer layer of amphipathic molecules around a surface of the aqueous medium and wherein each droplet in said second plurality is in contact with at least one other droplet in said second plurality, wherein:

(a) the aqueous medium of the droplets of the first plurality of contacting droplets comprises a membrane protein; and (b) the aqueous medium of the droplets of the second plurality of contacting droplets does not comprise a membrane protein.

15. A droplet assembly according to claim 1 wherein said plurality of contacting droplets is a first plurality of contacting droplets and the droplet assembly further comprises a second plurality of contacting droplets wherein each droplet in said second plurality comprises an aqueous medium and an outer layer of amphipathic molecules around a surface of the aqueous medium and wherein each droplet in said second plurality is in contact with at least one other droplet in said second plurality, wherein:

(a) the aqueous medium of the droplets of the first plurality of contacting droplets comprises a first concentration of a membrane protein; and (b) the aqueous medium of the droplets of the second plurality of contacting droplets comprises a second concentration of the membrane protein, wherein the first concentration is greater than the second concentration.

16. A droplet assembly according to claim 1 wherein said plurality of contacting droplets is a first plurality of contacting droplets and the droplet assembly further comprises a second plurality of contacting droplets wherein each droplet in said second plurality comprises an aqueous medium and an outer layer of amphipathic molecules around a surface of the aqueous medium and wherein each droplet in said second plurality is in contact with at least one other droplet in said second plurality, wherein:

(a) the aqueous medium of the droplets of the first plurality of contacting droplets comprises a concentration of at least 50 ng $mL^{-1}$ of a membrane protein; and (b) the aqueous medium of the droplets of the second plurality of contacting droplets comprises a concentration of less than 50 ng $mL^{-1}$ of the membrane protein.

17. A droplet assembly according to claim 1 wherein said plurality of contacting droplets is a first plurality of contacting droplets and the droplet assembly further comprises a second plurality of contacting droplets wherein each droplet in said second plurality comprises an aqueous medium and an outer layer of amphipathic molecules around a surface of the aqueous medium and wherein each droplet in said second plurality is in contact with at least one other droplet in said second plurality, wherein:

(a) a bilayer of amphipathic molecules is formed at an interface between each of the contacting droplets in the first plurality of contacting droplets and each bilayer between each of the contacting droplets in the first plurality of contacting droplets comprises a membrane protein; and (b) a bilayer of amphipathic molecules is formed at an interface between each of the contacting droplets in the second plurality of contacting droplets and none of the bilayers between the contacting droplets in the second plurality of contacting droplets comprises the membrane protein.

18. A droplet assembly according to claim 1 wherein said plurality of contacting droplets is a first plurality of contacting droplets and the droplet assembly further comprises a second plurality of contacting droplets wherein each droplet in said second plurality comprises an aqueous medium and an outer layer of amphipathic molecules around a surface of the aqueous medium and wherein each droplet in said second plurality is in contact with at least one other droplet in said second plurality, wherein:

(a) a bilayer of amphipathic molecules is formed at an interface between each of the contacting droplets in the first plurality of contacting droplets and the bilayers between the contacting droplets in the first plurality of contacting droplets comprise a first concentration of a membrane protein; and (b) a bilayer of amphipathic molecules is formed at an interface between each of the contacting droplets in the second plurality of contacting droplets and the bilayers between the contacting droplets in the second plurality of contacting droplets comprise a second concentration of the membrane protein, wherein the first concentration is greater than the second concentration.

19. A droplet assembly according to claim 17, wherein the droplets in the first plurality of contacting droplets are in communication with one another via the membrane proteins.

20. A droplet assembly according to claim 18, wherein the droplets in the first plurality of contacting droplets are in communication with one another via the membrane proteins and the droplets in the second plurality of contacting droplets are not in communication with one another via the membrane proteins.

21. A droplet assembly according to claim 1, wherein the bilayer comprises a membrane protein.

22. A droplet assembly according to claim 21, wherein the membrane protein is a pump, channel, pore, receptor or transporter protein.

23. A droplet assembly according to claim 21, wherein the membrane protein is an $\alpha$-hemolysin ($\alpha$HL) pore protein.

* * * * *